United States Patent
Johnson et al.

(10) Patent No.: US 10,318,903 B2
(45) Date of Patent: Jun. 11, 2019

(54) CONSTRAINED CASH COMPUTING SYSTEM TO OPTIMALLY SCHEDULE AIRCRAFT REPAIR CAPACITY WITH CLOSED LOOP DYNAMIC PHYSICAL STATE AND ASSET UTILIZATION ATTAINMENT CONTROL

(71) Applicant: General Electric Company, Schenectady, NY (US)

(72) Inventors: Christopher Donald Johnson, Niskayuna, NY (US); David S. Toledano, Niskayuna, NY (US); Victor Manuel Perez, Clifton Park, NY (US); Garry Marchment, Treharris (GB); Reejo Mathew, Pittsfield, MA (US); Nitish Umang, Schenectady, NY (US); Adam Rasheed, Glenville, NY (US); Aristotelis E. Thanos, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 15/346,595

(22) Filed: Nov. 8, 2016

(65) Prior Publication Data
US 2017/0323403 A1 Nov. 9, 2017

Related U.S. Application Data
(60) Provisional application No. 62/333,097, filed on May 6, 2016.

(51) Int. Cl.
*G06Q 10/00* (2012.01)
*G06Q 10/06* (2012.01)
(Continued)

(52) U.S. Cl.
CPC ....... *G06Q 10/06315* (2013.01); *G06Q 10/04* (2013.01); *G06Q 10/067* (2013.01);
(Continued)

(58) Field of Classification Search
CPC .......................................... G06Q 10/00–50/00
(Continued)

(56) References Cited

U.S. PATENT DOCUMENTS 3,556,442 A 1/1971 Arnekull
3,559,929 A 2/1971 Lindsay, Jr.
(Continued)

FOREIGN PATENT DOCUMENTS

| EP | 2056179 | 5/2009 | |
|---|---|---|---|
| EP | 2628574 | 8/2013 | |
| WO | WO-2016141138 A1 * | 9/2016 | ............. G07C 5/008 |

OTHER PUBLICATIONS

Sriram, Chellappan, and Ali Haghani. "An optimization model for aircraft maintenance scheduling and re-assignment." Transportation Research Part A: Policy and Practice 37.1 (2003): 29-48. (Year: 2003).*

(Continued)

*Primary Examiner* — Alan S Miller
(74) *Attorney, Agent, or Firm* — Fitch, Even, Tabin & Flannery LLP

(57) ABSTRACT

A method of providing a first set of computer systems with access to a recommendation pertaining to operation of one or more assets based on the one or more assets being in revenue service or in repair is disclosed. Operations data and inspection data is collected at the first set of computer systems. The operations data and inspection data pertains to operating asset states of one or more fleets of aircraft over a time period. The operations data and the inspection data is stored in one or more databases of a second set of computer (Continued)

systems. Assumptions of control input values are derived for use by the first set of computer systems based on the operations data and the inspection data. A financial objective and constraints analysis is performed with a simulation system for one or more assets of the one or more fleets of aircraft. The cost savings analysis includes identifying a modification of at least one of a set of the control input values. An estimated reduction of forecast error related to operating and service costs is computed for the one or more assets over one or more time periods. The identifying is based on comparisons of a first subset of the operations data and the inspection data with a second subset of the operations data and the inspection data. The first set of computer systems is provided with access to the recommendation pertaining to operation of the one or more assets.

20 Claims, 23 Drawing Sheets

(51) Int. Cl.
 *G06Q 30/00* (2012.01)
 *G06Q 50/14* (2012.01)
 *G06Q 10/04* (2012.01)
 *G06Q 10/08* (2012.01)
 *G06Q 10/10* (2012.01)
 *G07C 5/08* (2006.01)

(52) U.S. Cl.
 CPC ... *G06Q 10/0635* (2013.01); *G06Q 10/06313* (2013.01); *G06Q 10/06314* (2013.01); *G06Q 10/087* (2013.01); *G06Q 10/1093* (2013.01); *G06Q 10/20* (2013.01); *G06Q 30/018* (2013.01); *G06Q 50/14* (2013.01); *G07C 5/0841* (2013.01); *Y02P 90/86* (2015.11)

(58) Field of Classification Search
 USPC .................................................. 705/7.11–7.42
 See application file for complete search history.

(56) References Cited

U.S. PATENT DOCUMENTS

| | | |
|---|---|---|
| 3,572,611 A | 3/1971 | Oulton |
| 3,575,365 A | 4/1971 | Austin |
| 3,589,379 A | 6/1971 | Daues |
| 3,589,651 A | 6/1971 | Niemkiewicz |
| 3,598,215 A | 8/1971 | Summer |
| 3,609,750 A | 9/1971 | Budd |
| 3,612,837 A | 10/1971 | Brandau |
| 3,614,401 A | 10/1971 | Lode |
| 3,617,020 A | 11/1971 | Gerstine |
| 3,656,163 A | 4/1972 | Rogers |
| 3,670,464 A | 6/1972 | Cutter |
| 3,674,987 A | 7/1972 | Addabbo |
| 3,679,157 A | 7/1972 | Roberts |
| 3,679,956 A | 7/1972 | Redmond |
| 3,680,230 A | 8/1972 | Thompson |
| 3,686,639 A | 8/1972 | Fletcher |
| 3,691,987 A | 9/1972 | Strock |
| 3,692,238 A | 9/1972 | Boyd |
| 3,707,270 A | 12/1972 | Laimins |
| 3,713,159 A | 1/1973 | Hoffman |
| 3,714,651 A | 1/1973 | Lyon |
| 3,738,597 A | 6/1973 | Earl |
| 3,739,376 A | 6/1973 | Keledy |
| 3,746,279 A | 7/1973 | Maciolek |
| 3,757,337 A | 9/1973 | Litchford |
| 3,768,427 A | 10/1973 | Stephens |
| 3,771,747 A | 11/1973 | Mednikow |
| 3,779,129 A | 12/1973 | Lauro |
| 3,781,888 A | 12/1973 | Bail |
| 3,790,938 A | 2/1974 | Holley |
| 3,793,662 A | 2/1974 | Gacs |
| 3,810,689 A | 5/1974 | Moodie |
| 3,819,135 A | 6/1974 | Foxworthy |
| 3,823,898 A | 7/1974 | Eickmann |
| 3,830,951 A | 8/1974 | Rumstein |
| 3,833,138 A | 9/1974 | Dean |
| 3,858,172 A | 12/1974 | Henry |
| 3,860,921 A | 1/1975 | Fletcher |
| 3,885,761 A | 5/1975 | Pendergast |
| 3,887,147 A | 6/1975 | Grieb |
| 3,897,861 A | 8/1975 | Miller |
| 3,906,308 A | 9/1975 | Amason |
| 3,906,643 A | 9/1975 | McClung |
| 3,911,438 A | 10/1975 | Banks |
| 3,916,410 A | 10/1975 | Elwood |
| 3,917,193 A | 11/1975 | Runnels, Jr. |
| 3,921,146 A | 11/1975 | Danco |
| 3,935,754 A | 2/1976 | Comollo |
| 3,950,058 A | 4/1976 | Cronin |
| 3,958,107 A | 5/1976 | Edelson |
| 3,981,464 A | 9/1976 | Dudley |
| 3,997,131 A | 12/1976 | Kling |
| 4,018,422 A | 4/1977 | Bozeman, Jr. |
| 4,063,218 A | 12/1977 | Basov |
| 4,137,062 A | 1/1979 | Mullerheim |
| 4,137,531 A | 1/1979 | Pell |
| 4,212,440 A | 7/1980 | Ferris |
| 4,247,066 A | 1/1981 | Frost |
| 4,247,194 A | 1/1981 | Kubota |
| 4,250,207 A | 2/1981 | Hanai |
| 4,252,300 A | 2/1981 | Herder |
| 4,254,439 A | 3/1981 | Fowler |
| 4,259,035 A | 3/1981 | De Coene |
| 4,259,658 A | 3/1981 | Basov |
| 4,259,838 A | 4/1981 | McCollum, Jr. |
| 4,259,930 A | 4/1981 | Hofbauer |
| 4,260,280 A | 4/1981 | Hirn |
| 4,261,486 A | 4/1981 | Bush |
| 4,262,703 A | 4/1981 | Moore |
| 4,263,006 A | 4/1981 | Shinozaki |
| 4,263,911 A | 4/1981 | McCormack |
| 4,264,788 A | 4/1981 | Keidel |
| 4,265,149 A | 5/1981 | Wittkopp |
| 4,268,819 A | 5/1981 | Wakayama |
| 4,269,715 A | 5/1981 | Barraque |
| 4,274,096 A | 6/1981 | Dennison |
| 4,276,806 A | 7/1981 | Morel |
| 4,279,248 A | 7/1981 | Gabbay |
| 4,284,847 A | 8/1981 | Besserman |
| 4,284,991 A | 8/1981 | Dupressoir |
| 4,287,558 A | 9/1981 | Nishitani |
| 4,293,920 A | 10/1981 | Merola |
| 4,293,932 A | 10/1981 | McAdams |
| 4,294,122 A | 10/1981 | Couchman |
| 4,295,643 A | 10/1981 | De La Vega |
| 4,296,281 A | 10/1981 | Udayasekaran |
| 4,296,897 A | 10/1981 | Thompson |
| 4,297,869 A | 11/1981 | Oldford |
| 4,298,177 A | 11/1981 | Berlongieri |
| 4,300,628 A | 11/1981 | Melnyk |
| 4,305,093 A | 12/1981 | Nasu |
| 4,316,921 A | 2/1982 | Taylor |
| 4,317,177 A | 2/1982 | Burnworth |
| 4,322,651 A | 3/1982 | Inoue |
| 4,325,990 A | 4/1982 | Ferrier |
| 4,326,263 A | 4/1982 | Given |
| 4,327,713 A | 5/1982 | Okazaki |
| 4,330,177 A | 5/1982 | Miller |
| 4,331,435 A | 5/1982 | Nowacki |
| 4,331,834 A | 5/1982 | Ganz |
| 4,332,032 A | 5/1982 | Daniel |
| 4,332,068 A | 6/1982 | Melnyk |
| 4,333,362 A | 6/1982 | Sugioka |
| 4,346,869 A | 8/1982 | MacNeill |
| 4,348,213 A | 9/1982 | Armond |
| 4,354,345 A | 10/1982 | Dreisbach, Jr. |
| 4,356,829 A | 11/1982 | Furuya |
| 4,358,907 A | 11/1982 | Moreau |

(56) References Cited

U.S. PATENT DOCUMENTS

| | | |
|---|---|---|
| 4,359,319 A | 11/1982 | Greco |
| 4,364,299 A | 12/1982 | Nakada |
| 4,364,309 A | 12/1982 | Gorbatov |
| 4,365,311 A | 12/1982 | Fukunaga |
| 4,365,583 A | 12/1982 | Hisashi |
| 4,366,128 A | 12/1982 | Weir |
| 4,366,559 A | 12/1982 | Misaizu |
| 4,371,095 A | 2/1983 | Montgomery |
| 4,371,925 A | 2/1983 | Carberry |
| 4,376,937 A | 3/1983 | Cohen |
| 4,381,555 A | 4/1983 | Heinle |
| 4,388,624 A | 6/1983 | Dupressoir |
| 4,390,966 A | 6/1983 | Kawashima |
| 4,392,338 A | 7/1983 | Fox |
| 4,399,505 A | 8/1983 | Druke |
| 4,399,517 A | 8/1983 | Niehaus |
| 4,406,485 A | 9/1983 | Giebeler |
| 4,407,562 A | 10/1983 | Young |
| 4,408,834 A | 10/1983 | Miller |
| 4,413,140 A | 11/1983 | Fozzard |
| 4,415,044 A | 11/1983 | Davis |
| 4,419,448 A | 12/1983 | Kretz |
| 4,424,017 A | 1/1984 | Okigami |
| 4,425,499 A | 1/1984 | Newton |
| 4,432,056 A | 2/1984 | Aimura |
| 4,436,470 A | 3/1984 | Spletzer |
| 4,440,265 A | 4/1984 | Spagnoli |
| 4,440,361 A | 4/1984 | McGann |
| 4,441,377 A | 4/1984 | Nowacki |
| 4,456,830 A | 6/1984 | Cronin |
| 4,457,387 A | 7/1984 | Taylor |
| 4,461,077 A | 7/1984 | Hargis |
| 4,463,355 A | 7/1984 | Schultz |
| 4,463,679 A | 8/1984 | Billard |
| 4,464,120 A | 8/1984 | Jensen |
| 4,468,559 A | 8/1984 | Hurst |
| 4,470,109 A | 9/1984 | McNally |
| 4,474,701 A | 10/1984 | Teichmueller |
| 4,477,895 A | 10/1984 | Casper |
| 4,480,211 A | 10/1984 | Eggers |
| 4,480,894 A | 11/1984 | Miller |
| 4,482,805 A | 11/1984 | Palmer |
| 4,484,272 A | 11/1984 | Green |
| 4,484,776 A | 11/1984 | Gokimoto |
| 4,486,850 A | 12/1984 | Hyatt |
| 4,496,142 A | 1/1985 | Iwasaki |
| 4,500,948 A | 2/1985 | Blaisdell |
| 4,502,112 A | 2/1985 | Fujiwara |
| 4,502,279 A | 3/1985 | Fuehrer |
| 4,507,656 A | 3/1985 | Morey |
| 4,509,777 A | 4/1985 | Walker |
| 4,510,689 A | 4/1985 | Lorince |
| 4,517,698 A | 5/1985 | Lamp |
| 4,518,135 A | 5/1985 | Gebeke |
| 4,518,964 A | 5/1985 | Hetyei |
| 4,521,114 A | 6/1985 | Van Peski |
| 4,524,269 A | 6/1985 | Ezawa |
| 4,524,485 A | 6/1985 | Harris |
| 4,524,665 A | 6/1985 | Bione |
| 4,528,057 A | 7/1985 | Challenger |
| 4,529,017 A | 7/1985 | Suzuki |
| 4,529,152 A | 7/1985 | Bernard |
| 4,531,839 A | 7/1985 | Cunisse |
| 4,531,925 A | 7/1985 | Moreau |
| 4,532,330 A | 7/1985 | Cole |
| 4,534,538 A | 8/1985 | Buckley |
| 4,542,455 A | 9/1985 | Demeure |
| 4,548,025 A | 10/1985 | Heisler |
| 4,549,489 A | 10/1985 | Billard |
| 4,554,545 A | 11/1985 | Lowe |
| 4,555,756 A | 11/1985 | Yamanaka |
| 4,555,777 A | 11/1985 | Poteet |
| 4,559,110 A | 12/1985 | Swearingen |
| 4,559,538 A | 12/1985 | Hetyei |
| 4,561,337 A | 12/1985 | Wachi |
| 4,561,817 A | 12/1985 | Spletzer |
| 4,562,474 A | 12/1985 | Nishizawa |
| 4,565,244 A | 1/1986 | O'Connor |
| 4,566,831 A | 1/1986 | Groth |
| 4,569,331 A | 2/1986 | Tani |
| 4,575,757 A | 3/1986 | Aschwanden |
| 4,576,416 A | 3/1986 | Mueller |
| 4,578,776 A | 3/1986 | Takemae |
| 4,579,009 A | 4/1986 | Carmichael |
| 4,579,159 A | 4/1986 | Platt |
| 4,580,234 A | 4/1986 | Fujitani |
| 4,580,608 A | 4/1986 | Rampl |
| 4,580,982 A | 4/1986 | Ruppert |
| 4,591,865 A | 5/1986 | Canal |
| 4,601,017 A | 7/1986 | Mochizuki |
| 4,602,883 A | 7/1986 | Ozawa |
| 4,608,782 A | 9/1986 | Chylinski |
| 4,613,102 A | 9/1986 | Kageorge |
| 4,617,569 A | 10/1986 | Letoquart |
| 4,621,317 A | 11/1986 | Kudo |
| 4,621,333 A | 11/1986 | Watanabe |
| 4,621,879 A | 11/1986 | Schneider |
| 4,622,598 A | 11/1986 | Doi |
| 4,622,632 A | 11/1986 | Tanimoto |
| 4,623,774 A | 11/1986 | Ford |
| 4,627,085 A | 12/1986 | Yuen |
| 4,627,656 A | 12/1986 | Gokimoto |
| 4,628,380 A | 12/1986 | Quackenbush |
| 4,630,341 A | 12/1986 | Rohmer |
| 4,631,592 A | 12/1986 | Nishizawa |
| 4,631,639 A | 12/1986 | Biraud |
| 4,631,823 A | 12/1986 | Collier |
| 4,632,347 A | 12/1986 | Jurgich |
| 4,645,143 A | 2/1987 | Coffy |
| 4,657,228 A | 4/1987 | Lautzenhiser |
| 4,664,155 A | 5/1987 | Archung |
| 4,674,711 A | 6/1987 | Reid |
| 4,675,823 A | 6/1987 | Noland |
| 4,723,732 A | 2/1988 | Gorges |
| 4,736,910 A | 4/1988 | O'Quinn |
| 4,757,320 A | 7/1988 | Letoquart |
| H000500 H | 8/1988 | Stogner |
| 4,765,404 A | 8/1988 | Bailey |
| 4,765,658 A | 8/1988 | Reche |
| 4,765,776 A | 8/1988 | Howson |
| 4,767,196 A | 8/1988 | Jewell |
| 4,769,648 A | 9/1988 | Kishino |
| 4,770,534 A | 9/1988 | Matsuki |
| 4,773,045 A | 9/1988 | Ogawa |
| 4,776,027 A | 10/1988 | Hisano |
| 4,779,181 A | 10/1988 | Traver |
| 4,783,904 A | 11/1988 | Kimura |
| 4,787,042 A | 11/1988 | Burns |
| 4,789,259 A | 12/1988 | Katayanagi |
| 4,792,192 A | 12/1988 | Tveitane |
| 4,797,854 A | 1/1989 | Nakazaki |
| 4,802,355 A | 2/1989 | Ezell |
| 4,806,951 A | 2/1989 | Arimoto |
| 4,809,334 A | 2/1989 | Bhaskar |
| 4,811,172 A | 3/1989 | Davenport |
| 4,811,793 A | 3/1989 | Lokken |
| 4,813,300 A | 3/1989 | Ohkubo |
| 4,826,106 A | 5/1989 | Anderson |
| 4,827,248 A | 5/1989 | Crudden |
| 4,829,596 A | 5/1989 | Barina |
| 4,839,573 A | 6/1989 | Wise |
| 4,841,831 A | 6/1989 | Bender |
| 4,855,722 A | 8/1989 | Mostyn |
| 4,860,097 A | 8/1989 | Hartnack |
| 4,862,341 A | 8/1989 | Cook |
| 4,870,347 A | 9/1989 | Cicerone |
| 4,873,210 A | 10/1989 | Hsieh |
| 4,876,963 A | 10/1989 | Deffayet |
| 4,882,702 A | 11/1989 | Struger |
| 4,893,280 A | 1/1990 | Gelsomini |
| 4,897,816 A | 1/1990 | Kogan |
| 4,908,767 A | 3/1990 | Scholl |
| 4,913,000 A | 4/1990 | Wyllie |
| 4,916,375 A | 4/1990 | Kurakake |

(56) References Cited

U.S. PATENT DOCUMENTS

| | | |
|---|---|---|
| 4,916,699 A | 4/1990 | Ohashi |
| 4,918,601 A | 4/1990 | Vermesse |
| 4,922,101 A | 5/1990 | Hashiue |
| 4,923,039 A | 5/1990 | Russ |
| 4,931,849 A | 6/1990 | Tajima |
| 4,935,885 A | 6/1990 | McHale |
| 4,937,578 A | 6/1990 | Shioda |
| 4,942,550 A | 7/1990 | Murray |
| 4,943,965 A | 7/1990 | Machida |
| 4,945,938 A | 8/1990 | Ponsford |
| 4,953,355 A | 9/1990 | Poulain |
| 4,953,795 A | 9/1990 | Bielagus |
| 4,954,761 A | 9/1990 | Kimura |
| 4,957,034 A | 9/1990 | Tasdemiroglu |
| 4,979,700 A | 12/1990 | Tiedeman |
| 4,980,835 A | 12/1990 | Lawrence |
| 4,993,919 A | 2/1991 | Schneider |
| 4,995,597 A | 2/1991 | Hatton |
| 4,996,666 A | 2/1991 | Duluk, Jr. |
| 4,997,233 A | 3/1991 | Sharon |
| 5,004,527 A | 4/1991 | Millet |
| 5,012,423 A | 4/1991 | Osder |
| 5,015,188 A | 5/1991 | Pellosie, Jr. |
| 5,016,019 A | 5/1991 | Hawkes |
| 5,016,066 A | 5/1991 | Takahashi |
| 5,022,494 A | 6/1991 | Yamakage |
| 5,025,541 A | 6/1991 | Frizot |
| 5,042,752 A | 8/1991 | Surauer |
| 5,044,822 A | 9/1991 | Moss |
| 5,050,081 A | 9/1991 | Abbott |
| 5,056,647 A | 10/1991 | Rosenbaum |
| 5,065,630 A | 11/1991 | Hadcock |
| 5,083,727 A | 1/1992 | Pompei |
| 5,086,821 A | 2/1992 | Russell |
| 5,123,615 A | 6/1992 | Wagner |
| 5,143,326 A | 9/1992 | Parks |
| 5,166,681 A | 11/1992 | Bottesch |
| 5,174,719 A | 12/1992 | Walsh |
| 5,182,902 A | 2/1993 | Mima |
| 5,183,041 A | 2/1993 | Toriu |
| 5,189,420 A | 2/1993 | Eddy |
| 5,191,635 A | 3/1993 | Fujimoto |
| 5,199,538 A | 4/1993 | Fischer |
| 5,200,582 A | 4/1993 | Kraai, Jr. |
| 5,204,597 A | 4/1993 | Yamauchi |
| 5,208,683 A | 5/1993 | Okada |
| 5,208,743 A | 5/1993 | Nishikawa |
| 5,208,938 A | 5/1993 | Webb |
| 5,209,661 A | 5/1993 | Hildreth |
| 5,222,026 A | 6/1993 | Nakamoto |
| 5,222,693 A | 6/1993 | Slutzkin |
| 5,222,699 A | 6/1993 | Albach |
| RE34,318 E | 7/1993 | Davenport et al. |
| 5,226,015 A | 7/1993 | Gotou |
| 5,229,538 A | 7/1993 | McGlynn |
| 5,233,252 A | 8/1993 | Denk |
| 5,242,131 A | 9/1993 | Watts |
| 5,249,267 A | 9/1993 | Osaki |
| 5,258,945 A | 11/1993 | Lee |
| 5,260,906 A | 11/1993 | Mizukami |
| 5,261,012 A | 11/1993 | Hardy |
| 5,262,763 A | 11/1993 | Okuyama |
| 5,265,259 A | 11/1993 | Satou |
| 5,272,558 A | 12/1993 | Canestri |
| 5,276,274 A | 1/1994 | Morokuma |
| 5,287,318 A | 2/1994 | Kuki |
| 5,295,187 A | 3/1994 | Miyoshi |
| 5,295,212 A | 3/1994 | Morton |
| 5,295,227 A | 3/1994 | Yokono |
| 5,299,255 A | 3/1994 | Iwaki |
| 5,302,953 A | 4/1994 | Pierre |
| RE34,612 E | 5/1994 | Bender et al. |
| 5,312,925 A | 5/1994 | Allen |
| 5,314,287 A | 5/1994 | Wichert |
| 5,318,248 A | 6/1994 | Zielonka |
| 5,331,614 A | 7/1994 | Ogawa |
| 5,334,987 A | 8/1994 | Teach |
| 5,341,644 A | 8/1994 | Nelson |
| 5,343,540 A | 8/1994 | Mitani |
| 5,348,594 A | 9/1994 | Hanamura |
| 5,348,595 A | 9/1994 | Hanamura |
| 5,351,097 A | 9/1994 | Brooke |
| 5,367,873 A | 11/1994 | Barcza |
| 5,368,257 A | 11/1994 | Novinger |
| 5,370,340 A | 12/1994 | Pla |
| 5,375,972 A | 12/1994 | Gray |
| 5,377,109 A | 12/1994 | Baker |
| 5,381,506 A | 1/1995 | Amick |
| 5,384,584 A | 1/1995 | Yoshida |
| 5,388,051 A | 2/1995 | Seki |
| 5,392,424 A | 2/1995 | Cook |
| 5,394,513 A | 2/1995 | Sgarbi |
| 5,402,965 A | 4/1995 | Cervisi |
| 5,406,488 A | 4/1995 | Booth |
| 5,408,601 A | 4/1995 | Nakamura |
| 5,409,184 A | 4/1995 | Udall |
| 5,420,588 A | 5/1995 | Bushman |
| 5,426,964 A | 6/1995 | Sieger |
| 5,429,208 A | 7/1995 | Largillier |
| 5,436,856 A | 7/1995 | Sauvage |
| 5,441,217 A | 8/1995 | Novinger |
| 5,444,608 A | 8/1995 | Jain |
| 5,446,839 A | 8/1995 | Dea |
| 5,449,226 A | 9/1995 | Fujita |
| 5,450,136 A | 9/1995 | Cirineo |
| 5,452,201 A | 9/1995 | Pieronek |
| 5,455,777 A | 10/1995 | Fujiyama |
| 5,457,583 A | 10/1995 | Kaneko |
| 5,460,474 A | 10/1995 | Iles |
| 5,465,862 A | 11/1995 | Devlin |
| 5,467,402 A | 11/1995 | Okuyama |
| 5,469,208 A | 11/1995 | Dea |
| 5,477,246 A | 12/1995 | Hirabayashi |
| 5,477,597 A | 12/1995 | Catania |
| 5,488,372 A | 1/1996 | Fischer |
| 5,488,522 A | 1/1996 | Peace |
| 5,493,461 A | 2/1996 | Peace |
| 5,495,608 A | 2/1996 | Antoshenkov |
| 5,497,156 A | 3/1996 | Bushman |
| 5,497,183 A | 3/1996 | Yoshida |
| 5,498,943 A | 3/1996 | Kimoto |
| 5,504,902 A | 4/1996 | McGrath |
| 5,505,237 A | 4/1996 | Magne |
| 5,513,350 A | 4/1996 | Griffin |
| 5,524,178 A | 6/1996 | Yokono |
| 5,526,139 A | 6/1996 | Nakajima |
| 5,528,528 A | 6/1996 | Bui |
| 5,529,126 A | 6/1996 | Edwards |
| 5,530,643 A | 6/1996 | Hodorowski |
| 5,535,964 A | 7/1996 | Ahlsten |
| 5,537,119 A | 7/1996 | Poore, Jr. |
| 5,539,528 A | 7/1996 | Tawa |
| 5,548,515 A | 8/1996 | Pilley |
| 5,551,478 A | 9/1996 | Veilleux, Jr. |
| 5,552,984 A | 9/1996 | Crandall |
| 5,554,990 A | 9/1996 | McKinney |
| 5,555,179 A | 9/1996 | Koyama |
| 5,563,601 A | 10/1996 | Cataldo |
| 5,563,830 A | 10/1996 | Ishida |
| 5,566,073 A | 10/1996 | Margolin |
| 5,566,102 A | 10/1996 | Kubo |
| 5,566,787 A | 10/1996 | An |
| 5,572,218 A | 11/1996 | Cohen |
| 5,572,694 A | 11/1996 | Uchino |
| 5,579,011 A | 11/1996 | Smrek |
| 5,582,390 A | 12/1996 | Russ |
| 5,583,777 A | 12/1996 | Power |
| 5,586,615 A | 12/1996 | Hammer |
| 5,590,265 A | 12/1996 | Nakazawa |
| 5,590,743 A | 1/1997 | Houmard |
| 5,592,399 A | 1/1997 | Keith |
| 5,593,114 A | 1/1997 | Ruhl |
| 5,596,348 A | 1/1997 | Hayakawa |
| 5,599,603 A | 2/1997 | Evans |

(56) References Cited

U.S. PATENT DOCUMENTS

| | | |
|---|---|---|
| 5,606,795 A | 3/1997 | Ohba |
| 5,610,822 A | 3/1997 | Murphy |
| 5,611,661 A | 3/1997 | Jenkinson |
| 5,612,934 A | 3/1997 | Dang |
| 5,624,264 A | 4/1997 | Houlberg |
| 5,629,709 A | 5/1997 | Yamashita |
| 5,640,596 A | 6/1997 | Takamoto |
| 5,644,304 A | 7/1997 | Pavarotti |
| 5,644,487 A | 7/1997 | Duff |
| 5,647,111 A | 7/1997 | Zienkiewicz |
| 5,651,513 A | 7/1997 | Arena |
| 5,654,851 A | 8/1997 | Tucker |
| 5,654,859 A | 8/1997 | Shi |
| 5,659,503 A | 8/1997 | Sudo |
| 5,659,949 A | 8/1997 | Ohba |
| 5,661,486 A | 8/1997 | Faivre |
| 5,661,892 A | 9/1997 | Catania |
| 5,668,716 A | 9/1997 | Otomo |
| 5,670,768 A | 9/1997 | Modiano |
| 5,673,274 A | 9/1997 | Yoshida |
| 5,674,381 A | 10/1997 | Den Dekker |
| 5,676,334 A | 10/1997 | Cotton |
| 5,678,052 A | 10/1997 | Brisson |
| 5,679,135 A | 10/1997 | Carl |
| 5,680,325 A | 10/1997 | Rohner |
| 5,684,534 A | 11/1997 | Harney |
| 5,686,718 A | 11/1997 | Iwai |
| 5,709,532 A | 1/1998 | Giamati |
| 5,710,731 A | 1/1998 | Ciraula |
| 5,719,479 A | 2/1998 | Kato |
| 5,722,616 A | 3/1998 | Durand |
| 5,726,663 A | 3/1998 | Moyer |
| 5,732,384 A | 3/1998 | Ellert |
| 5,732,387 A | 3/1998 | Armbruster |
| 5,737,196 A | 4/1998 | Hughes |
| 5,737,227 A | 4/1998 | Greenfield |
| 5,745,101 A | 4/1998 | Yamamoto |
| 5,745,580 A | 4/1998 | Southward |
| 5,745,780 A | 4/1998 | Phillips |
| 5,751,236 A | 5/1998 | Vorenkamp |
| 5,764,866 A | 6/1998 | Maniwa |
| 5,765,783 A | 6/1998 | Albion |
| 5,768,286 A | 6/1998 | Hsu |
| 5,770,053 A | 6/1998 | Chotel |
| 5,770,834 A | 6/1998 | Davis |
| 5,774,689 A | 6/1998 | Curtis |
| 5,778,159 A | 7/1998 | Ito |
| 5,781,148 A | 7/1998 | Severwright |
| 5,784,238 A | 7/1998 | Nering |
| 5,784,696 A | 7/1998 | Melnikoff |
| 5,785,282 A | 7/1998 | Wake |
| 5,785,597 A | 7/1998 | Shinohara |
| 5,786,995 A | 7/1998 | Coleman |
| 5,788,191 A | 8/1998 | Wake |
| 5,790,137 A | 8/1998 | Derby |
| 5,791,596 A | 8/1998 | Gautier |
| 5,793,647 A | 8/1998 | Hageniers |
| 5,796,609 A | 8/1998 | Tao |
| 5,801,460 A | 9/1998 | Diemer |
| 5,804,700 A | 9/1998 | Kwon |
| 5,805,828 A | 9/1998 | Lee |
| 5,810,117 A | 9/1998 | Wood |
| 5,818,434 A | 10/1998 | Yamamoto |
| 5,828,397 A | 10/1998 | Goto |
| 5,832,101 A | 11/1998 | Hwang |
| 5,835,234 A | 11/1998 | Takaki |
| 5,839,690 A | 11/1998 | Blanchette |
| 5,842,668 A | 12/1998 | Spencer |
| 5,845,236 A | 12/1998 | Jolly |
| 5,845,530 A | 12/1998 | Brockmeyer |
| 5,846,035 A | 12/1998 | Karafillis |
| 5,847,673 A | 12/1998 | Debell |
| 5,852,447 A | 12/1998 | Hosoya |
| 5,860,283 A | 1/1999 | Coleman |
| 5,862,062 A | 1/1999 | Smyrl |
| 5,875,994 A | 3/1999 | McCrory |
| 5,894,891 A | 4/1999 | Rosenstock |
| 5,896,138 A | 4/1999 | Riley |
| 5,905,722 A | 5/1999 | Kim |
| 5,905,989 A | 5/1999 | Biggs |
| 5,912,627 A | 6/1999 | Alexander |
| 5,916,314 A | 6/1999 | Berg |
| 5,921,629 A | 7/1999 | Koch |
| 5,921,670 A | 7/1999 | Schumacher |
| 5,923,486 A | 7/1999 | Sugiyama |
| 5,933,099 A | 8/1999 | Mahon |
| 5,936,318 A | 8/1999 | Weiler |
| 5,937,349 A | 8/1999 | Andresen |
| 5,938,149 A | 8/1999 | Terwesten |
| 5,943,253 A | 8/1999 | Matsumiya |
| 5,943,281 A | 8/1999 | Izumi |
| 5,948,101 A | 9/1999 | David |
| 5,953,241 A | 9/1999 | Hansen |
| 5,955,887 A | 9/1999 | Codner |
| 5,956,166 A | 9/1999 | Ogata |
| 5,959,637 A | 9/1999 | Mills |
| 5,963,007 A | 10/1999 | Toyozawa |
| 5,966,442 A | 10/1999 | Sachdev |
| 5,966,532 A | 10/1999 | McDonald |
| 5,969,642 A | 10/1999 | Runyon |
| 5,971,274 A | 10/1999 | Milchman |
| 5,974,525 A | 10/1999 | Lin |
| 5,975,464 A | 11/1999 | Rutan |
| 5,982,415 A | 11/1999 | Sakata |
| 5,987,651 A | 11/1999 | Tanaka |
| 5,988,200 A | 11/1999 | Rude |
| 5,988,645 A | 11/1999 | Downing |
| 5,995,833 A | 11/1999 | Zicker |
| 5,996,463 A | 12/1999 | Gyre |
| 5,998,772 A | 12/1999 | Kirma |
| 6,002,778 A | 12/1999 | Rossetti |
| 6,002,929 A | 12/1999 | Bishop, Jr. |
| 6,003,814 A | 12/1999 | Pike |
| 6,006,350 A | 12/1999 | Tsujii |
| 6,007,024 A | 12/1999 | Stephan |
| 6,007,174 A | 12/1999 | Hirabayashi |
| 6,008,758 A | 12/1999 | Campbell |
| 6,009,454 A | 12/1999 | Dummermuth |
| 6,011,510 A | 1/2000 | Yee |
| 6,026,024 A | 2/2000 | Odani |
| 6,032,901 A | 3/2000 | Carimali |
| 6,035,394 A | 3/2000 | Ray |
| 6,038,396 A | 3/2000 | Iwata |
| 6,039,538 A | 3/2000 | Bansemir |
| 6,041,959 A | 3/2000 | Domanico |
| 6,042,052 A | 3/2000 | Smith |
| 6,045,091 A | 4/2000 | Baudu |
| 6,048,324 A | 4/2000 | Socci |
| 6,052,604 A | 4/2000 | Bishop, Jr. |
| 6,053,951 A | 4/2000 | McDonald |
| 6,055,634 A | 4/2000 | Severwright |
| 6,067,486 A | 5/2000 | Aragones |
| 6,081,891 A | 6/2000 | Park |
| 6,094,163 A | 7/2000 | Chang |
| 6,097,382 A | 8/2000 | Rosen |
| 6,100,739 A | 8/2000 | Ansel |
| 6,104,190 A | 8/2000 | Buess |
| 6,112,140 A | 8/2000 | Hayes |
| 6,114,990 A | 9/2000 | Bergljung |
| 6,122,569 A | 9/2000 | Ebert |
| 6,126,483 A | 10/2000 | Kirma |
| 6,129,026 A | 10/2000 | Lecroy |
| 6,134,161 A | 10/2000 | Taniguchi |
| 6,134,500 A * | 10/2000 | Tang ............... G06Q 10/047 701/10 |
| 6,137,521 A | 10/2000 | Matsui |
| 6,148,085 A | 11/2000 | Jung |
| 6,149,264 A | 11/2000 | Hirabayashi |
| 6,161,800 A | 12/2000 | Liu |
| 6,163,583 A | 12/2000 | Lin |
| 6,173,438 B1 | 1/2001 | Kodosky |
| 6,183,388 B1 | 2/2001 | Hawkins |
| 6,185,115 B1 | 2/2001 | Sul |
| 6,186,445 B1 | 2/2001 | Batcho |

(56) References Cited

U.S. PATENT DOCUMENTS

| | | | |
|---|---|---|---|
| 6,204,805 B1 | 3/2001 | Hager | |
| 6,211,809 B1 | 4/2001 | Stiles | |
| 6,213,433 B1 | 4/2001 | Gruensfelder | |
| 6,217,753 B1 | 4/2001 | Takigawa | |
| 6,219,466 B1 | 4/2001 | Kyo | |
| 6,219,628 B1 | 4/2001 | Kodosky | |
| 6,220,543 B1 | 4/2001 | Uskolovsky | |
| 6,220,545 B1 | 4/2001 | Fenny | |
| 6,222,480 B1 | 4/2001 | Kuntman | |
| 6,239,720 B1 | 5/2001 | Kim | |
| RE37,256 E | 7/2001 | Cohen et al. | |
| 6,262,740 B1 | 7/2001 | Lauer | |
| 6,267,329 B1 | 7/2001 | Chethik | |
| 6,267,331 B1 | 7/2001 | Wygnanski | |
| 6,268,853 B1 | 7/2001 | Hoskins | |
| 6,275,284 B1 | 8/2001 | Kiel | |
| 6,281,164 B1 | 8/2001 | Demmel | |
| 6,282,699 B1 | 8/2001 | Zhang | |
| 6,285,878 B1 | 9/2001 | Lai | |
| 6,286,876 B1 | 9/2001 | Jasperse | |
| 6,290,179 B1 | 9/2001 | Kerns | |
| 6,292,830 B1 | 9/2001 | Taylor | |
| 6,302,358 B1 | 10/2001 | Emsters | |
| 6,314,361 B1* | 11/2001 | Yu | G06O 10/02 701/117 |
| 6,314,362 B1 | 11/2001 | Erzberger | |
| 6,317,659 B1 | 11/2001 | Lindsley | |
| 6,319,340 B1 | 11/2001 | Takeuchi | |
| 6,326,962 B1 | 12/2001 | Szabo | |
| 6,328,256 B1 | 12/2001 | Ryan | |
| 6,328,261 B1 | 12/2001 | Wollaston | |
| 6,335,445 B1 | 1/2002 | Chabrier De Lassauniere | |
| 6,335,694 B1 | 1/2002 | Beksa | |
| 6,341,090 B1 | 1/2002 | Hiraki | |
| 6,341,287 B1 | 1/2002 | Sziklai | |
| 6,343,815 B1 | 2/2002 | Poe | |
| 6,344,135 B1 | 2/2002 | Benazzi | |
| 6,347,302 B1 | 2/2002 | Joao | |
| 6,347,567 B1 | 2/2002 | Eckstein | |
| 6,349,441 B1 | 2/2002 | Kosuch | |
| 6,353,794 B1 | 3/2002 | Davis | |
| 6,356,228 B1 | 3/2002 | Tomita | |
| 6,362,135 B1 | 3/2002 | Greer | |
| 6,362,261 B1 | 3/2002 | Lange | |
| 6,370,371 B1 | 4/2002 | Sorrells | |
| 6,371,681 B1 | 4/2002 | Covington | |
| 6,380,869 B1 | 4/2002 | Simon | |
| 6,382,559 B1 | 5/2002 | Sutterfield | |
| 6,385,434 B1 | 5/2002 | Chuprun | |
| 6,385,513 B1 | 5/2002 | Murray | |
| 6,389,826 B2 | 5/2002 | Buchholz | |
| 6,394,788 B1 | 5/2002 | Early | |
| 6,405,132 B1 | 6/2002 | Breed | |
| 6,405,977 B1 | 6/2002 | Ash | |
| 6,406,249 B1 | 6/2002 | McAdams | |
| 6,408,180 B1 | 6/2002 | McKenna | |
| 6,421,571 B1 | 7/2002 | Spriggs | |
| 6,437,805 B1 | 8/2002 | Sojoodi | |
| 6,439,751 B1 | 8/2002 | Jones | |
| 6,448,907 B1 | 9/2002 | Naclerio | |
| 6,453,303 B1 | 9/2002 | Li | |
| 6,459,411 B2 | 10/2002 | Frazier | |
| 6,461,106 B1 | 10/2002 | Rahier | |
| 6,473,675 B2 | 10/2002 | Sample | |
| 6,474,604 B1 | 11/2002 | Carlow | |
| 6,474,927 B1 | 11/2002 | McAdams | |
| 6,481,669 B1 | 11/2002 | Griffin | |
| 6,499,421 B1 | 12/2002 | Honigsbaum | |
| 6,505,106 B1* | 1/2003 | Lawrence | G01M 15/05 342/357.31 |
| 6,513,761 B2 | 2/2003 | Huenecke | |
| 6,520,452 B1 | 2/2003 | Crist | |
| 6,527,227 B1 | 3/2003 | Lambiaso | |
| 6,529,483 B1 | 3/2003 | Itjeshorst | |
| 6,536,714 B2 | 3/2003 | Gleine | |
| 6,567,729 B2* | 5/2003 | Betters | G01C 23/005 701/31.5 |
| 6,581,045 B1 | 6/2003 | Watson | |
| 6,584,601 B1 | 6/2003 | Kodosky | |
| 6,600,165 B1 | 7/2003 | Doe | |
| 6,608,638 B1 | 8/2003 | Kodosky | |
| 6,609,036 B1 | 8/2003 | Bickford | |
| 6,650,898 B2 | 11/2003 | Jochim | |
| 6,651,034 B1 | 11/2003 | Hedlund | |
| 6,662,194 B1 | 12/2003 | Joao | |
| 6,690,981 B1 | 2/2004 | Kawachi | |
| 6,715,139 B1 | 3/2004 | Kodosky | |
| 6,721,714 B1 | 4/2004 | Baiada | |
| 6,725,035 B2 | 4/2004 | Jochim | |
| 6,728,610 B1 | 4/2004 | Marshall | |
| 6,732,027 B2* | 5/2004 | Betters | G01C 23/005 701/29.4 |
| 6,748,597 B1 | 6/2004 | Frisco | |
| 6,760,778 B1 | 7/2004 | Nelson | |
| 6,763,515 B1 | 7/2004 | Vazquez | |
| 6,775,576 B2 | 8/2004 | Spriggs | |
| 6,799,154 B1* | 9/2004 | Aragones | G06Q 10/06 703/22 |
| 6,802,053 B1 | 10/2004 | Dye | |
| 6,834,159 B1 | 12/2004 | Schramm | |
| 6,839,689 B2 | 1/2005 | Aieta | |
| 6,874,148 B1 | 3/2005 | Richardson | |
| 6,889,096 B2 | 5/2005 | Spriggs | |
| 6,892,988 B2 | 5/2005 | Hugues | |
| 6,895,291 B2 | 5/2005 | Arnaud | |
| 6,904,377 B2 | 6/2005 | Liu | |
| 6,934,667 B2 | 8/2005 | Kodosky | |
| 6,934,668 B2 | 8/2005 | Kodosky | |
| 6,944,536 B2 | 9/2005 | Singleton | |
| 6,952,680 B1 | 10/2005 | Melby | |
| 6,954,724 B2 | 10/2005 | Kodosky | |
| 6,961,686 B2 | 11/2005 | Kodosky | |
| 6,971,021 B1 | 11/2005 | Daspit | |
| 6,971,066 B2 | 11/2005 | Schultz | |
| 6,976,222 B2 | 12/2005 | Sojoodi | |
| 6,983,228 B2 | 1/2006 | Kodosky | |
| 6,993,466 B2 | 1/2006 | Kodosky | |
| 7,003,481 B2 | 2/2006 | Banka | |
| 7,008,357 B2 | 3/2006 | Winkler | |
| 7,010,470 B2 | 3/2006 | Kodosky | |
| 7,024,631 B1 | 4/2006 | Hudson | |
| 7,043,696 B2 | 5/2006 | Santori | |
| 7,062,268 B2 | 6/2006 | McKenna | |
| 7,069,093 B2 | 6/2006 | Thackston | |
| 7,076,411 B2 | 7/2006 | Santori | |
| 7,076,740 B2 | 7/2006 | Santori | |
| 7,113,780 B2 | 9/2006 | McKenna | |
| 7,134,086 B2 | 11/2006 | Kodosky | |
| 7,149,713 B2 | 12/2006 | Bove | |
| 7,168,072 B2 | 1/2007 | Shah | |
| 7,177,786 B2 | 2/2007 | Kodosky | |
| 7,185,287 B2 | 2/2007 | Ghercioiu | |
| 7,194,529 B2 | 3/2007 | Kupiec | |
| 7,200,448 B2 | 4/2007 | Cachat | |
| 7,213,207 B2 | 5/2007 | Rogers | |
| 7,216,099 B2 | 5/2007 | Chen | |
| 7,275,715 B2 | 10/2007 | McCoskey | |
| 7,277,010 B2 | 10/2007 | Joao | |
| 7,302,675 B2 | 11/2007 | Rogers | |
| 7,308,410 B2 | 12/2007 | Bowe, Jr. | |
| 7,328,128 B2 | 2/2008 | Bonanni | |
| 7,339,477 B2 | 3/2008 | Puzio | |
| 7,340,737 B2 | 3/2008 | Ghercioiu | |
| 7,346,518 B1 | 3/2008 | Frank | |
| 7,356,383 B2 | 4/2008 | Pechtl | |
| 7,370,009 B1 | 5/2008 | Notani | |
| 7,383,218 B1 | 6/2008 | Oros | |
| 7,383,239 B2 | 6/2008 | Bonissone | |
| 7,395,275 B1 | 7/2008 | Parent | |
| 7,406,425 B1 | 7/2008 | Frank | |
| 7,409,663 B2 | 8/2008 | Rouch | |
| 7,440,926 B2 | 10/2008 | Harrington | |
| 7,457,786 B2* | 11/2008 | Aragones | G06N 3/126 706/13 |

(56) References Cited

U.S. PATENT DOCUMENTS

| | | | |
|---|---|---|---|
| 7,478,352 B2 | 1/2009 | Chaplin | |
| 7,480,906 B2 | 1/2009 | Joffrain | |
| 7,490,086 B2 | 2/2009 | Joao | |
| 7,552,079 B2 | 6/2009 | Bove | |
| 7,558,711 B2 | 7/2009 | Kodosky | |
| 7,578,469 B2 | 8/2009 | McCoskey | |
| 7,624,422 B2 | 11/2009 | Williams | |
| 7,647,179 B2 | 1/2010 | Goldstein | |
| 7,647,562 B2 | 1/2010 | Ghercioiu | |
| 7,649,464 B2 | 1/2010 | Puzio | |
| 7,650,264 B2 | 1/2010 | Kodosky | |
| 7,650,267 B1* | 1/2010 | Sturrock | G06F 9/5027 703/13 |
| 7,669,133 B2 | 2/2010 | Chikirivao | |
| 7,672,758 B2 | 3/2010 | Astruc | |
| 7,689,493 B1 | 3/2010 | Sullivan | |
| RE41,228 E | 4/2010 | Kodosky et al. | |
| 7,707,014 B2 | 4/2010 | Kodosky | |
| 7,707,093 B2 | 4/2010 | O'Shaughnessy | |
| 7,715,930 B2 | 5/2010 | Bush | |
| 7,730,041 B2 | 6/2010 | Purdy | |
| 7,743,335 B2 | 6/2010 | Rogers | |
| 7,751,815 B2 | 7/2010 | McKenna | |
| 7,761,200 B2* | 7/2010 | Avery | G06Q 10/06 701/29.3 |
| 7,765,278 B2 | 7/2010 | Dove | |
| 7,783,507 B2 | 8/2010 | Schick | |
| 7,793,850 B1 | 9/2010 | Ho | |
| 7,797,062 B2 | 9/2010 | Discenzo | |
| 7,822,671 B1 | 10/2010 | Oros | |
| 7,840,498 B2 | 11/2010 | Frank | |
| 7,840,607 B2 | 11/2010 | Henigman | |
| 7,891,250 B2 | 2/2011 | Parias | |
| 7,898,153 B2 | 3/2011 | Barrett | |
| 7,908,304 B2 | 3/2011 | Chao | |
| 7,913,170 B2 | 3/2011 | Rogers | |
| 7,949,592 B1 | 5/2011 | Oros | |
| 7,954,097 B2 | 5/2011 | Joffrain | |
| 7,962,050 B2 | 6/2011 | Shustef | |
| 7,979,298 B2* | 7/2011 | Cheng | G06Q 10/0631 705/7.28 |
| 7,983,809 B2* | 7/2011 | Kell | G06Q 10/0875 701/29.3 |
| 8,019,777 B2 | 9/2011 | Hauser | |
| 8,032,135 B1 | 10/2011 | Redford | |
| 8,036,987 B1 | 10/2011 | Grbac | |
| 8,046,464 B2 | 10/2011 | Wang | |
| 8,050,998 B2 | 11/2011 | Bolivar | |
| 8,068,829 B2 | 11/2011 | Lemond | |
| 8,074,201 B2 | 12/2011 | Ghercioiu | |
| 8,074,203 B2 | 12/2011 | Dye | |
| 8,121,042 B2 | 2/2012 | Wang | |
| 8,131,656 B2* | 3/2012 | Goldberg | G06N 3/126 706/13 |
| 8,136,767 B2 | 3/2012 | Cueman | |
| 8,166,506 B2 | 4/2012 | Callahan | |
| 8,189,305 B2 | 5/2012 | Newman | |
| 8,195,535 B2 | 6/2012 | Nagalla | |
| 8,200,561 B1 | 6/2012 | Scott | |
| 8,201,257 B1 | 6/2012 | Andres | |
| 8,207,867 B2 | 6/2012 | Ghalebsaz Jeddi | |
| 8,229,791 B2* | 7/2012 | Bradley | G06Q 10/06 235/385 |
| 8,239,526 B2 | 8/2012 | Simpson | |
| 8,239,848 B2 | 8/2012 | Ghercioiu | |
| 8,244,549 B1 | 8/2012 | Stener | |
| 8,251,317 B2 | 8/2012 | Pitt | |
| 8,264,196 B2* | 9/2012 | Mera | B60L 58/12 320/104 |
| 8,266,066 B1* | 9/2012 | Wezter | G06Q 10/10 703/20 |
| 8,277,658 B2 | 10/2012 | Amir | |
| 8,290,827 B2 | 10/2012 | Piepenbrink | |
| 8,301,422 B2 | 10/2012 | Baccou | |
| 8,332,084 B1 | 12/2012 | Bailey | |
| 8,333,078 B2 | 12/2012 | Kelnhofer | |
| 8,340,854 B2* | 12/2012 | Doulatshahi | G06Q 10/06 701/29.1 |
| 8,364,449 B2 | 1/2013 | Baccou | |
| 8,370,224 B2 | 2/2013 | Grewal | |
| 8,380,548 B2 | 2/2013 | Ng | |
| 8,401,726 B2* | 3/2013 | Bouvier | G06Q 10/00 701/29.1 |
| 8,412,641 B2 | 4/2013 | Zeisset | |
| 8,417,360 B2 | 4/2013 | Sustaeta | |
| 8,439,533 B2 | 5/2013 | Heym | |
| 8,442,889 B2 | 5/2013 | Farrow | |
| 8,443,336 B2 | 5/2013 | Vieira | |
| 8,448,070 B2 | 5/2013 | Dailey | |
| 8,462,041 B2 | 6/2013 | Hampel | |
| 8,476,844 B2 | 7/2013 | Hancock | |
| 8,478,096 B2 | 7/2013 | Sicari | |
| 8,478,613 B2 | 7/2013 | Diefendorf | |
| 8,484,665 B2 | 7/2013 | Mckelvey | |
| 8,489,090 B2 | 7/2013 | Rooks | |
| 8,509,140 B2 | 8/2013 | Kauffman | |
| 8,509,990 B2* | 8/2013 | Bennett | G07C 5/0808 701/36 |
| 8,510,707 B1 | 8/2013 | Heuler | |
| 8,533,670 B2 | 9/2013 | Dye | |
| 8,554,624 B2 | 10/2013 | Kumhyr | |
| 8,555,315 B2 | 10/2013 | Woods | |
| 8,560,376 B2* | 10/2013 | Lienhardt | G06Q 10/0631 705/7.38 |
| 8,564,457 B2 | 10/2013 | Lecerf | |
| 8,565,938 B2* | 10/2013 | Coulmeau | G05D 1/0005 701/120 |
| 8,565,943 B2* | 10/2013 | Weinmann | G07C 5/008 244/194 |
| 8,566,855 B2 | 10/2013 | Wong | |
| 8,571,911 B1 | 10/2013 | Meyer | |
| 8,572,404 B2 | 10/2013 | Markham | |
| 8,577,194 B2 | 11/2013 | Sicari | |
| 8,595,831 B2 | 11/2013 | Skare | |
| 8,606,436 B2 | 12/2013 | Roederer | |
| 8,620,714 B2* | 12/2013 | Williams | G06Q 10/08 701/29.3 |
| 8,621,637 B2 | 12/2013 | Al-Harbi | |
| 8,626,891 B2 | 1/2014 | Guru | |
| 8,645,956 B2 | 2/2014 | Becker | |
| 8,648,708 B2 | 2/2014 | Lombardi | |
| 8,650,558 B2 | 2/2014 | Depoy | |
| 8,656,373 B2 | 2/2014 | Dove | |
| 8,660,924 B2 | 2/2014 | Hoch | |
| 8,665,731 B1 | 3/2014 | Ramesh | |
| 8,674,872 B2 | 3/2014 | Billaud | |
| 8,700,559 B2 | 4/2014 | Brenes | |
| 8,732,047 B2 | 5/2014 | Sandholm | |
| 8,746,617 B2 | 6/2014 | Beal | |
| 8,755,207 B2 | 6/2014 | Warr | |
| 8,767,672 B2 | 7/2014 | Soomro | |
| 8,768,892 B2 | 7/2014 | Myerson | |
| 8,769,412 B2 | 7/2014 | Gill | |
| 8,782,249 B1 | 7/2014 | Hood | |
| 8,788,367 B2 | 7/2014 | Cormack | |
| 8,825,228 B2 | 9/2014 | Corpron | |
| 8,856,833 B2 | 10/2014 | Conness | |
| 8,862,984 B1 | 10/2014 | Thakare | |
| 8,886,571 B2 | 11/2014 | Mannava | |
| 8,887,193 B2 | 11/2014 | Xiong | |
| 8,898,694 B2 | 11/2014 | Shimy | |
| 8,903,358 B2 | 12/2014 | Kiene | |
| 8,909,641 B2 | 12/2014 | Bullotta | |
| 8,909,926 B2 | 12/2014 | Brandt | |
| 8,914,022 B2 | 12/2014 | Kostanic | |
| 8,922,551 B2 | 12/2014 | Mikkelsen | |
| 8,943,539 B2 | 1/2015 | Hamano | |
| 9,004,400 B2 | 4/2015 | Certain | |
| 9,009,084 B2 | 4/2015 | Brandt | |
| 9,037,317 B2 | 5/2015 | Mead | |
| 9,053,505 B2 | 6/2015 | Depoy | |
| 9,063,639 B2 | 6/2015 | Grewal | |
| 9,064,284 B1 | 6/2015 | Janiszeski | |

(56) References Cited

U.S. PATENT DOCUMENTS

| | | |
|---|---|---|
| 9,069,930 B1 | 6/2015 | Hart |
| 9,076,127 B2 | 7/2015 | Chao |
| 9,104,760 B2 | 8/2015 | Hadley |
| 9,129,132 B2 | 9/2015 | Serrano |
| 9,135,670 B2 | 9/2015 | Mayer |
| 9,148,701 B2 | 9/2015 | Craner |
| 9,172,482 B2 | 10/2015 | Sofos |
| 9,210,043 B2 | 12/2015 | Biles |
| 9,215,144 B2 | 12/2015 | Biles |
| 9,230,224 B2 | 1/2016 | Ramsey |
| 9,235,395 B2 | 1/2016 | Kodosky |
| 9,245,284 B2 | 1/2016 | Hardin |
| 9,247,279 B2 | 1/2016 | Bleacher |
| 9,256,425 B2 | 2/2016 | Baird |
| 9,256,846 B2 | 2/2016 | Stluka |
| 9,264,444 B2 | 2/2016 | Moore |
| 9,270,694 B2 | 2/2016 | Loder |
| 9,274,521 B1 | 3/2016 | Stefani |
| 9,298,810 B2 | 3/2016 | Fife |
| 9,327,841 B1 | 5/2016 | Sipper |
| 9,355,567 B2 | 5/2016 | Krishna |
| 9,367,064 B2 | 6/2016 | Gohr |
| 9,378,772 B2 | 6/2016 | Miller |
| 9,411,333 B2 | 8/2016 | Gohr |
| 9,412,073 B2 | 8/2016 | Brandt et al. |
| 9,420,121 B2 | 8/2016 | Grosz |
| 9,424,693 B2 * | 8/2016 | Rodrigues ............ G07C 5/0808 |
| 9,435,111 B2 | 9/2016 | Cao |
| 9,435,890 B2 | 9/2016 | Lacondemine |
| 9,446,748 B2 | 9/2016 | Ward |
| 9,459,303 B2 | 10/2016 | Roederer |
| 9,460,092 B2 | 10/2016 | Murphy |
| 9,471,455 B2 | 10/2016 | Horn |
| 9,485,537 B1 | 11/2016 | Canney |
| 9,493,248 B1 | 11/2016 | Kluker |
| 9,501,804 B2 | 11/2016 | Kaufman |
| 9,524,342 B2 | 12/2016 | Hadley |
| 9,529,832 B2 | 12/2016 | Eames |
| 9,536,264 B2 | 1/2017 | Kalra |
| 9,549,224 B2 | 1/2017 | Jensen |
| 9,569,525 B2 | 2/2017 | Spangler |
| 9,587,636 B2 | 3/2017 | Poole |
| 9,613,233 B1 | 4/2017 | Landon |
| 9,628,840 B2 | 4/2017 | Bleacher |
| 9,658,271 B2 | 5/2017 | Thomas |
| 9,665,433 B2 | 5/2017 | Grewal |
| 9,665,557 B2 | 5/2017 | Floyd |
| 9,678,982 B2 | 6/2017 | Flores |
| 9,692,499 B2 | 6/2017 | Moffatt |
| 9,703,902 B2 | 7/2017 | Asenjo |
| 9,709,978 B2 | 7/2017 | Asenjo |
| 9,712,482 B2 | 7/2017 | Aravamudan |
| 9,715,670 B2 | 7/2017 | Rehman |
| 9,729,639 B2 | 8/2017 | Sustaeta |
| 9,734,625 B2 | 8/2017 | Hadley |
| 9,740,896 B1 | 8/2017 | Ben-Bassat |
| 9,745,048 B2 | 8/2017 | Wood |
| 9,752,756 B2 | 9/2017 | Biertuempfel |
| 9,767,483 B2 | 9/2017 | Thomson |
| 9,786,197 B2 | 10/2017 | Asenjo |
| 9,792,644 B1 | 10/2017 | O'Leary |
| 9,799,233 B2 | 10/2017 | Guehring |
| 9,825,910 B2 | 11/2017 | Walsh |
| 9,830,829 B1 | 11/2017 | Doyen |
| 9,838,832 B2 | 12/2017 | Vasko |
| 9,842,034 B2 | 12/2017 | Heliker |
| 9,842,372 B2 | 12/2017 | Kaufman |
| 9,858,245 B2 | 1/2018 | Floyd |
| 9,865,156 B2 | 1/2018 | Bump |
| 9,871,694 B1 | 1/2018 | Walavalkar |
| 9,875,220 B2 | 1/2018 | Rodgers |
| 9,904,356 B2 | 2/2018 | Laughlin |
| 9,911,163 B2 | 3/2018 | Kaufman |
| 9,914,548 B1 | 3/2018 | Vadillo |
| 9,938,025 B2 | 4/2018 | Faure |
| 9,960,598 B2 | 5/2018 | Asati |
| 9,965,527 B2 | 5/2018 | Bullotta |
| 9,984,580 B2 | 5/2018 | Liao |
| 1,000,922 A1 | 6/2018 | Guilherme |
| 9,989,958 B2 | 6/2018 | Asenjo |
| 9,996,600 B1 | 6/2018 | Walavalkar |
| 1,002,565 A1 | 7/2018 | Goldstein |
| 1,004,958 A1 | 8/2018 | Salentiny |
| 2001/0011222 A1 | 8/2001 | McLauchlin |
| 2002/0010633 A1 | 1/2002 | Brotherston |
| 2002/0016778 A1 | 2/2002 | Konno |
| 2002/0019761 A1 | 2/2002 | Lidow |
| 2002/0035495 A1 * | 3/2002 | Spira ................ G06Q 10/04 705/7.36 |
| 2002/0038424 A1 | 3/2002 | Joao |
| 2002/0077944 A1 | 6/2002 | Bly |
| 2002/0077949 A1 | 6/2002 | Qasem |
| 2002/0082966 A1 | 6/2002 | O'Brien |
| 2002/0194099 A1 | 12/2002 | Weiss |
| 2002/0198840 A1 | 12/2002 | Banka |
| 2003/0023518 A1 | 1/2003 | Spriggs |
| 2003/0028269 A1 | 2/2003 | Spriggs |
| 2003/0078145 A1 | 4/2003 | Winkler |
| 2003/0125965 A1 | 7/2003 | Falso |
| 2003/0135441 A1 | 7/2003 | Ginsberg |
| 2003/0167265 A1 * | 9/2003 | Corynen ............... G06Q 10/04 |
| 2004/0117624 A1 | 6/2004 | Brandt |
| 2004/0119638 A1 | 6/2004 | Fagan |
| 2004/0133438 A1 | 7/2004 | Zeisset |
| 2004/0142658 A1 | 7/2004 | McKenna |
| 2004/0148044 A1 | 7/2004 | Arnaud |
| 2004/0148045 A1 | 7/2004 | Arnaud |
| 2004/0169591 A1 | 9/2004 | Erkkinen |
| 2004/0204837 A1 | 10/2004 | Singleton |
| 2004/0225618 A1 | 11/2004 | Thackston |
| 2004/0236587 A1 | 11/2004 | Nalawade |
| 2004/0267395 A1 * | 12/2004 | Discenzo ............ G05B 13/024 700/99 |
| 2005/0050346 A1 | 3/2005 | Felactu |
| 2005/0080698 A1 | 4/2005 | Perg |
| 2005/0110639 A1 | 5/2005 | Puzio |
| 2005/0128083 A1 | 6/2005 | Puzio |
| 2005/0131729 A1 | 6/2005 | Melby |
| 2005/0193008 A1 | 9/2005 | Turner |
| 2005/0203894 A1 | 9/2005 | Weild, IV |
| 2005/0204054 A1 | 9/2005 | Wang |
| 2005/0216826 A1 | 9/2005 | Black |
| 2005/0253020 A1 | 11/2005 | McCoskey |
| 2005/0253021 A1 | 11/2005 | McCoskey |
| 2006/0010152 A1 | 1/2006 | Catalano |
| 2006/0031250 A1 | 2/2006 | Henigman |
| 2006/0047679 A1 | 3/2006 | Purdy |
| 2006/0085314 A1 | 4/2006 | Grim, III |
| 2006/0095156 A1 | 5/2006 | Baiada |
| 2006/0112139 A1 * | 5/2006 | Maple ............... G06Q 10/0631 |
| 2006/0149687 A1 | 7/2006 | McLemore |
| 2006/0163432 A1 | 7/2006 | McCoskey |
| 2006/0190280 A1 * | 8/2006 | Hoebel ................ G06Q 10/06 705/330 |
| 2006/0206289 A1 | 9/2006 | Stake |
| 2006/0218116 A1 | 9/2006 | O'Hearn |
| 2006/0218131 A1 | 9/2006 | Brenes |
| 2007/0007389 A1 | 1/2007 | McCoskey |
| 2007/0021117 A1 | 1/2007 | McKenna |
| 2007/0040063 A1 | 2/2007 | McCoskey |
| 2007/0088806 A1 | 4/2007 | Marriott |
| 2007/0094162 A1 * | 4/2007 | Aragones .............. G06N 3/126 706/13 |
| 2007/0106549 A1 | 5/2007 | Stocking |
| 2007/0112487 A1 * | 5/2007 | Avery .................. G06Q 10/06 701/33.4 |
| 2007/0115938 A1 | 5/2007 | Conzachi |
| 2007/0124009 A1 * | 5/2007 | Bradley ............... G06Q 10/06 700/99 |
| 2007/0127460 A1 | 6/2007 | Wilber |
| 2007/0152104 A1 | 7/2007 | Cueman |
| 2007/0156496 A1 * | 7/2007 | Avery ................. G06Q 10/087 705/305 |
| 2007/0185775 A1 | 8/2007 | Lawton |

(56) References Cited

U.S. PATENT DOCUMENTS

| | | |
|---|---|---|
| 2007/0219831 A1 | 9/2007 | Ne Meth |
| 2007/0225986 A1 | 9/2007 | Bowe, Jr. |
| 2007/0244709 A1 | 10/2007 | Gilbert |
| 2007/0247546 A1 | 10/2007 | Lim |
| 2008/0010107 A1 | 1/2008 | Small |
| 2008/0015880 A1 | 1/2008 | Freedenberg |
| 2008/0033786 A1 | 2/2008 | Boaz |
| 2008/0042800 A1 | 2/2008 | Puzio |
| 2008/0066053 A1 | 3/2008 | Ramamoorthy |
| 2008/0077290 A1* | 3/2008 | Weinmann ............ G07C 5/008 701/33.4 |
| 2008/0077448 A1 | 3/2008 | Diamond |
| 2008/0077512 A1 | 3/2008 | Grewal |
| 2008/0077617 A1 | 3/2008 | Schulz |
| 2008/0117858 A1 | 5/2008 | Kauffman |
| 2008/0125933 A1* | 5/2008 | Williams ........... G06Q 10/0637 701/29.5 |
| 2008/0126377 A1 | 5/2008 | Bush |
| 2008/0132212 A1 | 6/2008 | Lemond |
| 2008/0144432 A1 | 6/2008 | Samid |
| 2008/0154448 A1 | 6/2008 | Mead |
| 2008/0162155 A1 | 7/2008 | Small |
| 2008/0226421 A1 | 9/2008 | Rudduck |
| 2008/0300738 A1* | 12/2008 | Coulmeau ............. G01C 21/20 701/3 |
| 2009/0037302 A1 | 2/2009 | Schulz |
| 2009/0076873 A1 | 3/2009 | Johnson et al. |
| 2009/0083235 A1 | 3/2009 | Joao |
| 2009/0112569 A1* | 4/2009 | Angus .................... H04L 67/12 703/22 |
| 2009/0112692 A1 | 4/2009 | Steelberg |
| 2009/0112698 A1 | 4/2009 | Steelberg |
| 2009/0112714 A1 | 4/2009 | Steelberg |
| 2009/0112715 A1 | 4/2009 | Steelberg |
| 2009/0119177 A1 | 5/2009 | John |
| 2009/0204267 A1 | 8/2009 | Sustaeta |
| 2009/0228354 A1 | 9/2009 | Steelberg |
| 2009/0261204 A1 | 10/2009 | Pitt |
| 2010/0049628 A1 | 2/2010 | Mannava |
| 2010/0064277 A1 | 3/2010 | Baird |
| 2010/0076822 A1 | 3/2010 | Steelberg |
| 2010/0100271 A1 | 4/2010 | Nagalla |
| 2010/0106652 A1 | 4/2010 | Sandholm |
| 2010/0106653 A1 | 4/2010 | Sandholm |
| 2010/0114701 A1 | 5/2010 | Steelberg |
| 2010/0153156 A1 | 6/2010 | Guinta |
| 2010/0198630 A1 | 8/2010 | Page |
| 2010/0211302 A1 | 8/2010 | Ribbe |
| 2010/0262442 A1* | 10/2010 | Wingenter ............. G06Q 10/04 705/7.38 |
| 2010/0293023 A1 | 11/2010 | Senan |
| 2010/0304739 A1 | 12/2010 | Rooks |
| 2010/0332269 A1 | 12/2010 | Russo |
| 2010/0332373 A1 | 12/2010 | Crabtree |
| 2011/0010189 A1 | 1/2011 | Dean |
| 2011/0039237 A1 | 2/2011 | Skare |
| 2011/0054965 A1 | 3/2011 | Katagiri et al. |
| 2011/0126111 A1 | 5/2011 | Gill |
| 2011/0173127 A1 | 7/2011 | Ho |
| 2011/0205910 A1 | 8/2011 | Soomro |
| 2011/0296330 A1 | 12/2011 | Shi |
| 2011/0296401 A1 | 12/2011 | Depoy |
| 2011/0298579 A1 | 12/2011 | Hardegger |
| 2011/0313826 A1 | 12/2011 | Keen |
| 2012/0022901 A1 | 1/2012 | Nasr |
| 2012/0053984 A1* | 3/2012 | Mannar ............. G06Q 10/0635 705/7.28 |
| 2012/0078805 A1 | 3/2012 | Monz-Schneider |
| 2012/0089434 A1 | 4/2012 | Schlitt |
| 2012/0110156 A1 | 5/2012 | Guru |
| 2012/0166249 A1 | 6/2012 | Jackson |
| 2012/0180133 A1 | 7/2012 | Al-Harbi |
| 2012/0185772 A1 | 7/2012 | Kotelly |
| 2012/0233068 A1 | 9/2012 | Epstein |
| 2012/0290104 A1 | 11/2012 | Holt et al. |
| 2012/0295537 A1 | 11/2012 | Zaruba |
| 2012/0297461 A1 | 11/2012 | Pineau |
| 2013/0006686 A1 | 1/2013 | O'Sullivan |
| 2013/0031037 A1 | 1/2013 | Brandt |
| 2013/0054432 A1 | 2/2013 | Hakim |
| 2013/0068878 A1 | 3/2013 | Liardon |
| 2013/0097545 A1 | 4/2013 | Grewal |
| 2013/0117803 A1 | 5/2013 | Markham |
| 2013/0118112 A1 | 5/2013 | Cao |
| 2013/0119971 A1 | 5/2013 | Roederer |
| 2013/0167015 A1 | 6/2013 | Hadley |
| 2013/0209967 A1 | 8/2013 | Guehring |
| 2013/0264420 A1 | 10/2013 | Bickelmeyer |
| 2013/0282190 A1 | 10/2013 | Conroy |
| 2013/0282195 A1 | 10/2013 | O'Connor et al. |
| 2013/0304439 A1* | 11/2013 | Van der Velden ......................... G06F 17/5009 703/6 |
| 2013/0335415 A1 | 12/2013 | Chang |
| 2014/0012707 A1 | 1/2014 | Abdelrahman |
| 2014/0053243 A1 | 2/2014 | Walsh |
| 2014/0058534 A1 | 2/2014 | Tiwari et al. |
| 2014/0075506 A1 | 3/2014 | Davis |
| 2014/0089773 A1 | 3/2014 | Eames |
| 2014/0171022 A1 | 6/2014 | Kiene |
| 2014/0176328 A1 | 6/2014 | Koushik |
| 2014/0207989 A1 | 7/2014 | Paulitsch |
| 2014/0244379 A1 | 8/2014 | Steelberg |
| 2014/0257785 A1* | 9/2014 | Wankawala ........ G06F 11/3457 703/22 |
| 2014/0277792 A1 | 9/2014 | Kaufman |
| 2014/0277793 A1 | 9/2014 | Kaufman |
| 2014/0277794 A1 | 9/2014 | Kaufman |
| 2014/0278617 A1 | 9/2014 | Kaufman |
| 2014/0282037 A1 | 9/2014 | Narasimhan |
| 2014/0335480 A1 | 11/2014 | Asenjo |
| 2014/0336785 A1 | 11/2014 | Asenjo |
| 2014/0336786 A1 | 11/2014 | Asenjo |
| 2014/0336791 A1 | 11/2014 | Asenjo |
| 2014/0336795 A1 | 11/2014 | Asenjo |
| 2014/0337000 A1 | 11/2014 | Asenjo |
| 2014/0337086 A1 | 11/2014 | Asenjo |
| 2014/0337277 A1 | 11/2014 | Asenjo |
| 2014/0354529 A1 | 12/2014 | Laughlin |
| 2014/0365191 A1 | 12/2014 | Zyglowicz |
| 2014/0365264 A1 | 12/2014 | Smiley |
| 2014/0372289 A1* | 12/2014 | Doom .................... G06Q 10/20 705/39 |
| 2015/0046345 A1 | 2/2015 | Hakim |
| 2015/0057783 A1 | 2/2015 | Rossi |
| 2015/0058183 A1 | 2/2015 | Clark |
| 2015/0058184 A1 | 2/2015 | Clark |
| 2015/0066696 A1 | 3/2015 | Teuber |
| 2015/0067844 A1 | 3/2015 | Brandt |
| 2015/0074749 A1 | 3/2015 | Vasko |
| 2015/0122951 A1 | 5/2015 | Wood |
| 2015/0150061 A1 | 5/2015 | Bleacher |
| 2015/0170090 A1 | 6/2015 | Bose |
| 2015/0213369 A1 | 7/2015 | Brandt |
| 2015/0241893 A1 | 8/2015 | Hajimiragha |
| 2015/0242182 A1 | 8/2015 | Mcadam |
| 2015/0242286 A1 | 8/2015 | Grewal |
| 2015/0248635 A1 | 9/2015 | Salcedo |
| 2015/0262126 A1 | 9/2015 | Gillespie |
| 2015/0293530 A1 | 10/2015 | Haskell |
| 2015/0339948 A1 | 11/2015 | Wood |
| 2015/0360792 A1 | 12/2015 | Faure |
| 2015/0371190 A1 | 12/2015 | Iyer |
| 2016/0010628 A1* | 1/2016 | Dhar ...................... F03D 17/00 702/34 |
| 2016/0109875 A1 | 4/2016 | Majewski |
| 2016/0125518 A1* | 5/2016 | Doom .................... G06Q 10/20 705/39 |
| 2016/0134920 A1 | 5/2016 | Bleacher |
| 2016/0155098 A1 | 6/2016 | Mcelhinney |
| 2016/0188675 A1* | 6/2016 | Vossler ............. G06F 17/30539 707/776 |
| 2016/0203722 A1 | 7/2016 | Liao |

(56) References Cited

U.S. PATENT DOCUMENTS

| | | | |
|---|---|---|---|
| 2016/0231716 A1* | 8/2016 | Johnson | G05B 13/041 |
| 2016/0243432 A1 | 8/2016 | Juhasz | |
| 2016/0247129 A1* | 8/2016 | Song | G06Q 10/20 |
| 2016/0251101 A1 | 9/2016 | Kong | |
| 2016/0260331 A1 | 9/2016 | Salentiny | |
| 2016/0261115 A1 | 9/2016 | Asati | |
| 2016/0274552 A1 | 9/2016 | Strohmenger | |
| 2016/0274553 A1 | 9/2016 | Strohmenger | |
| 2016/0274558 A1 | 9/2016 | Strohmenger | |
| 2016/0274978 A1 | 9/2016 | Strohmenger | |
| 2016/0275426 A1 | 9/2016 | Martin | |
| 2016/0330222 A1 | 11/2016 | Brandt | |
| 2016/0333854 A1* | 11/2016 | Lund | F03D 7/047 |
| 2016/0333855 A1* | 11/2016 | Lund | F03D 7/048 |
| 2016/0350728 A1 | 12/2016 | Melika | |
| 2017/0006404 A1 | 1/2017 | Hordys | |
| 2017/0017698 A1 | 1/2017 | Bullotta | |
| 2017/0075778 A1 | 3/2017 | Heliker | |
| 2017/0076235 A1 | 3/2017 | Noto | |
| 2017/0106972 A1 | 4/2017 | Sobajima | |
| 2017/0116434 A1 | 4/2017 | Finkel | |
| 2017/0124533 A1 | 5/2017 | Rodoni | |
| 2017/0124675 A1 | 5/2017 | Bruce | |
| 2017/0129254 A1* | 5/2017 | Nardiello | B41J 3/4073 |
| 2017/0140469 A1 | 5/2017 | Finkel | |
| 2017/0185594 A1 | 6/2017 | Schulz | |
| 2017/0192414 A1 | 7/2017 | Mukkamala | |
| 2017/0192957 A1 | 7/2017 | Ide | |
| 2017/0193414 A1 | 7/2017 | Finkel | |
| 2017/0195827 A1 | 7/2017 | Vasko | |
| 2017/0214717 A1 | 7/2017 | Bush | |
| 2017/0220011 A1 | 8/2017 | Hart | |
| 2017/0220334 A1 | 8/2017 | Hart | |
| 2017/0237612 A1 | 8/2017 | Foster | |
| 2017/0242555 A1 | 8/2017 | Wragg | |
| 2017/0244726 A1 | 8/2017 | Finkel | |
| 2017/0255649 A1 | 9/2017 | Motoyama | |
| 2017/0255723 A1 | 9/2017 | Asenjo | |
| 2017/0257353 A1 | 9/2017 | Motoyama | |
| 2017/0277171 A1 | 9/2017 | Asenjo | |
| 2017/0302511 A1 | 10/2017 | Foster | |
| 2017/0302649 A1 | 10/2017 | Singh | |
| 2017/0302684 A1 | 10/2017 | Kirk | |
| 2017/0308360 A1 | 10/2017 | Kambach | |
| 2017/0308802 A1 | 10/2017 | Ramsøyet al. | |
| 2017/0323231 A1 | 11/2017 | Johnson et al. | |
| 2017/0323239 A1 | 11/2017 | Johnson et al. | |
| 2017/0323240 A1 | 11/2017 | Johnson et al. | |
| 2017/0323274 A1 | 11/2017 | Johnson et al. | |
| 2017/0336849 A1 | 11/2017 | Harper | |
| 2017/0337283 A1 | 11/2017 | Bliss | |
| 2017/0357928 A1 | 12/2017 | Ross | |
| 2017/0359418 A1 | 12/2017 | Sustaeta | |
| 2017/0364043 A1 | 12/2017 | Ganti | |
| 2017/0364320 A1 | 12/2017 | Elumalai | |
| 2018/0012510 A1 | 1/2018 | Asenjo | |
| 2018/0025304 A1 | 1/2018 | Fisher | |
| 2018/0039249 A1 | 2/2018 | Johnson | |
| 2018/0039956 A1 | 2/2018 | Mcelhinney | |
| 2018/0060799 A1 | 3/2018 | Heyer | |
| 2018/0060832 A1 | 3/2018 | Korsedal, IV | |
| 2018/0067738 A1 | 3/2018 | Noto | |
| 2018/0074482 A1 | 3/2018 | Cheng | |
| 2018/0075756 A1 | 3/2018 | Kirk | |
| 2018/0089637 A1 | 3/2018 | Subramaniyan | |
| 2018/0096153 A1 | 4/2018 | Dewitte | |
| 2018/0137219 A1 | 5/2018 | Goldfarb | |
| 2018/0155052 A1 | 6/2018 | Lacroix | |
| 2018/0157771 A1 | 6/2018 | Mestha | |
| 2018/0173182 A1 | 6/2018 | Miller | |
| 2018/0174057 A1 | 6/2018 | Citriniti | |
| 2018/0186446 A1 | 7/2018 | Schmidt | |
| 2018/0189332 A1 | 7/2018 | Asher | |
| 2018/0189701 A1 | 7/2018 | Chang | |
| 2018/0211210 A1 | 7/2018 | Salcedo | |
| 2018/0227367 A1 | 8/2018 | Stone | |

OTHER PUBLICATIONS

Painter, Michael K., et al. "Using simulation, data mining, and knowledge discovery techniques for optimized aircraft engine fleet management." Proceedings of the 38th conference on Winter simulation. Winter Simulation Conference, 2006. (Year: 2006).*

Bower, Geoffrey, and Ilan Kroo. "Multi-objective aircraft optimization for minimum cost and emissions over specific route networks." The 26th Congress of ICAS and 8th AIAA ATIO. 2008. (Year: 2008).*

Ríos, José, et al. "Product Avatar as Digital Counterpart of a Physical Individual Product: Literature Review and Implications in an Aircraft." ISPE CE. 2015. (Year: 2015).*

Tuegel, Eric J., et al. "Reengineering aircraft structural life prediction using a digital twin." International Journal of Aerospace Engineering 2011 (2011). (Year: 2011).*

Chen, CL Philip, and Ten-Huei Guo. "Design of intelligent acceleration schedules for extending the life of aircraft engines." IEEE Transactions on Systems, Man, and Cybernetics, Part C (Applications and Reviews) 37.5 (2007): 1005-1015. (Year: 2007).*

Dekker, Rommert. "Applications of maintenance optimization models: a review and analysis." Reliability engineering & system safety 51.3 (1996): 229-240. (Year: 1996).*

Datta, Partha P., and Rajkumar Roy. "Cost modelling techniques for availability type service support contracts: a literature review and empirical study." CIRP Journal of Manufacturing Science and Technology 3.2 (2010): 142-157. (Year: 2010).*

Papakostas, Nikolaos, et al. "An approach to operational aircraft maintenance planning." Decision Support Systems 48.4 (2010): 604-612. (Year: 2010).*

Johnson, Chris "Creating New Value with Performance-Based Industrial Systems Design and Operations Management." The Bridge:Linking Engineering and Society, vol. 45, No. 3, Fall 2015: 12-23. (Year: 2015).*

Glaessgen, Edward H. and Stargel, D.S. ,"The Digital Twin Paradigm for Future NASA and U.S. Air Force Vehicles", Apr. 16, 2012, NASA (Year: 2012).*

Chen, C.L.P., et al., "Design of Intelligent Acceleration Schedules for Extending the Life of Aircraft Engines." IEEE Transactions on Systems, Man and Cybernetics: Part C: Applications and Reviews, IEEE Service Center, vol. 37, No. 5, Sep. 1, 2007, pp. 1005-1015.

International Patent Application No. PCT/US2017/31310, International Search Report and Written Opinion, dated Jul. 13, 2017, 13 pages.

Tam, Allen S.B. et al., "A generic asset management framework for optimising maintenance investment decision," Production Planning & Control: The Management of Operations, Jun. 2008, vol. 19, No. 4, pp. 287-300.

Warwick, Graham, "Digital Twin Would Track Aircraft Health Through Its Life," Commercial Aviation, Aug. 14, 2014, <http://www.chinaaviationdaily.com/news/37/37092.html>, pp. 1-3.

* cited by examiner

| Part & System | Y CDM | X Casual Factors ||||||
|---|---|---|---|---|---|---|---|
| | | Temp | Aerosols | Derate | PAX | Fuel | Factor n |
| HPT S1 Noz | CDM 1 | | ▨ | ▨ | | | ▨ |
| | CDM 2 | ▨ | | ▨ | ▨ | ▨ | |
| | CDM n | | ▨ | ▨ | | | |
| Combustor | CDM 3 | ▨ | ▨ | ▨ | ▨ | ▨ | ▨ |
| HP Ext Case | CDM 4 | ▨ | | ▨ | ▨ | | ▨ |
| HPT T Case | CDM 5 | ▨ | ▨ | ▨ | | ▨ | ▨ |
| Fan Disk | CDM 6 | | | | | ▨ | ▨ |

FIG. 1D

| Index | FLIGHT_DATETIME | ARRIVAL | DEPARTURE | Distance | FlightLeg | SeverityFactor | PlantType |
|---|---|---|---|---|---|---|---|
| 1 | 09/25/2013 | OERK | OEJN | 529 | 1.295225049 | 3.365144932 | PlaneType_1 |
| 2 | 09/25/2013 | OEJN | OERK | 529 | 1.295225049 | 1.376608544 | PlaneType_2 |
| 3 | 09/26/2013 | OERK | OEJN | 529 | 1.295225049 | 1.304497267 | PlaneType_3 |
| 4 | 09/26/2013 | OEJN | OERK | 529 | 1.295225049 | 1.376543028 | PlaneType_4 |
| 5 | 09/27/2013 | GMMN | OEJN | 2950 | 6.032994129 | 0.579295531 | PlaneType_5 |
| 6 | 09/27/2013 | OEJN | GMMN | 2950 | 6.032994129 | 0.466632242 | PlaneType_6 |
| 7 | 09/28/2013 | OERK | OEJN | 529 | 1.295225049 | 1.280300024 | PlaneType_7 |
| 8 | 09/28/2013 | OEJN | OERK | 529 | 1.295225049 | 1.344899355 | PlaneType_8 |
| 9 | 09/29/2013 | OERK | OEJN | 529 | 1.295225049 | 1.286032674 | PlaneType_9 |
| 10 | 09/29/2013 | OEJN | OERK | 529 | 1.295225049 | 1.337331702 | PlaneType_10 |
| 11 | 09/29/2013 | WMKK | OEJN | 4390 | 8.850998043 | 0.611248639 | PlaneType_11 |
| 12 | 09/30/2013 | OERK | WMKK | 3962 | 8.013424658 | 0.420872949 | PlaneType_12 |
| 13 | 09/30/2013 | OEMA | OERK | 439 | 1.119099804 | 1.318910619 | PlaneType_13 |
| 14 | 09/30/2013 | OERK | OEMA | 439 | 1.119099804 | 1.386048291 | PlaneType_14 |
| 15 | 09/30/2013 | WMKK | OERK | 3962 | 8.013424658 | 0.757386127 | PlaneType_15 |
| 16 | 10/01/2013 | OEJN | WMKK | 4390 | 8.850998043 | 0.443071031 | PlaneType_16 |
| 17 | 10/01/2013 | WMKK | OEJN | 4390 | 8.850998043 | 0.615399359 | PlaneType_17 |
| 18 | 10/02/2013 | OERK | WMKK | 3962 | 8.013424658 | 0.395860709 | PlaneType_18 |
| 19 | 10/02/2013 | OEMA | OERK | 439 | 1.119099804 | 1.358728119 | PlaneType_19 |
| 20 | 10/02/2013 | OERK | OEMA | 439 | 1.119099804 | 1.445469644 | PlaneType_20 |
| 21 | 10/02/2013 | WIII | OERK | 4562 | 9.187592955 | 0.768058143 | PlaneType_1 |

*FIG. 1G*

CONSTRAINED CASH COMPUTING SYSTEM TO OPTIMALLY SCHEDULE AIRCRAFT REPAIR CAPACITY WITH CLOSED LOOP DYNAMIC PHYSICAL STATE AND ASSET UTILIZATION ATTAINMENT CONTROL

CROSS-REFERENCE TO RELATED APPLICATIONS

This application claims the benefit of U.S. Provisional Application No. 62/333,097, filed May 6, 2016, which is incorporated by reference herein in its entirely.

TECHNICAL FIELD

This application relates generally to the field of aircraft operational control and, in one specific embodiment, the dynamic optimization of the aircraft engine system in the present and over a configurable time interval to achieve constrained stale estimation objectives or constraints of an operator or original equipment manufacturer (OEM) or services provider(s) is computed in a control system.

BACKGROUND

Given the potential number of factors to manage the operations associated with a large, complex industrial system, such as, for example, one or more aircraft and their associated apparatuses, such as engines, optimizing such factors for an enterprise (e.g., for asset utilization, fuel cost reduction, physical inspection, physical damage state assessment, workscope, and shop service capacity) is typically ad hoc in nature as well as time-consuming.

BRIEF DESCRIPTION OF DRAWINGS

The present disclosure is illustrated by way of example and not limitation in the FIGS. of the accompanying drawings, in which like references indicate similar elements and in which:

FIGS. 1A-1G are framework diagrams illustrating the relationships of choices and operational paths associated with an example industrial system;

DETAILED DESCRIPTION

Figure 1A:
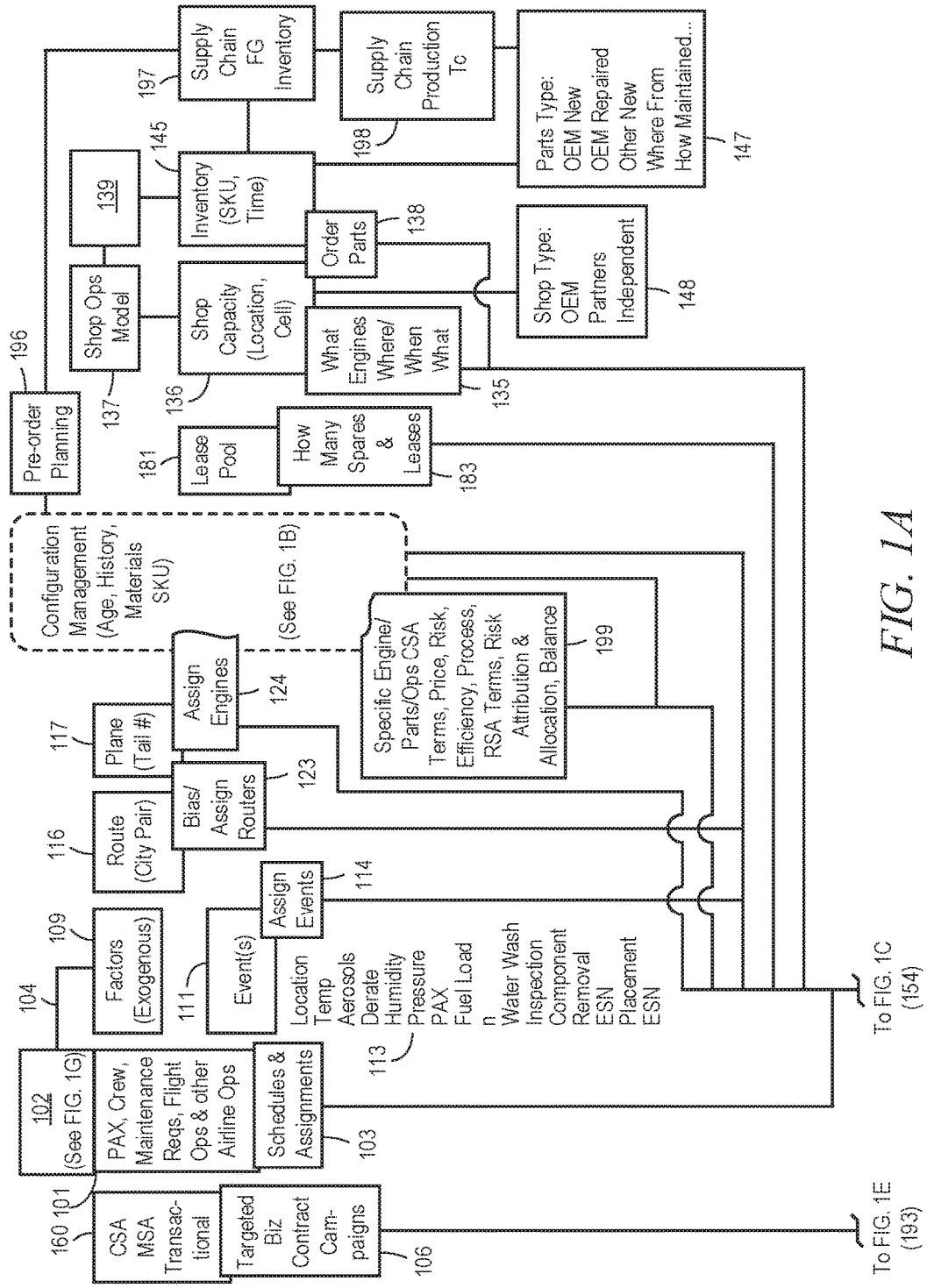
Figure 1B:
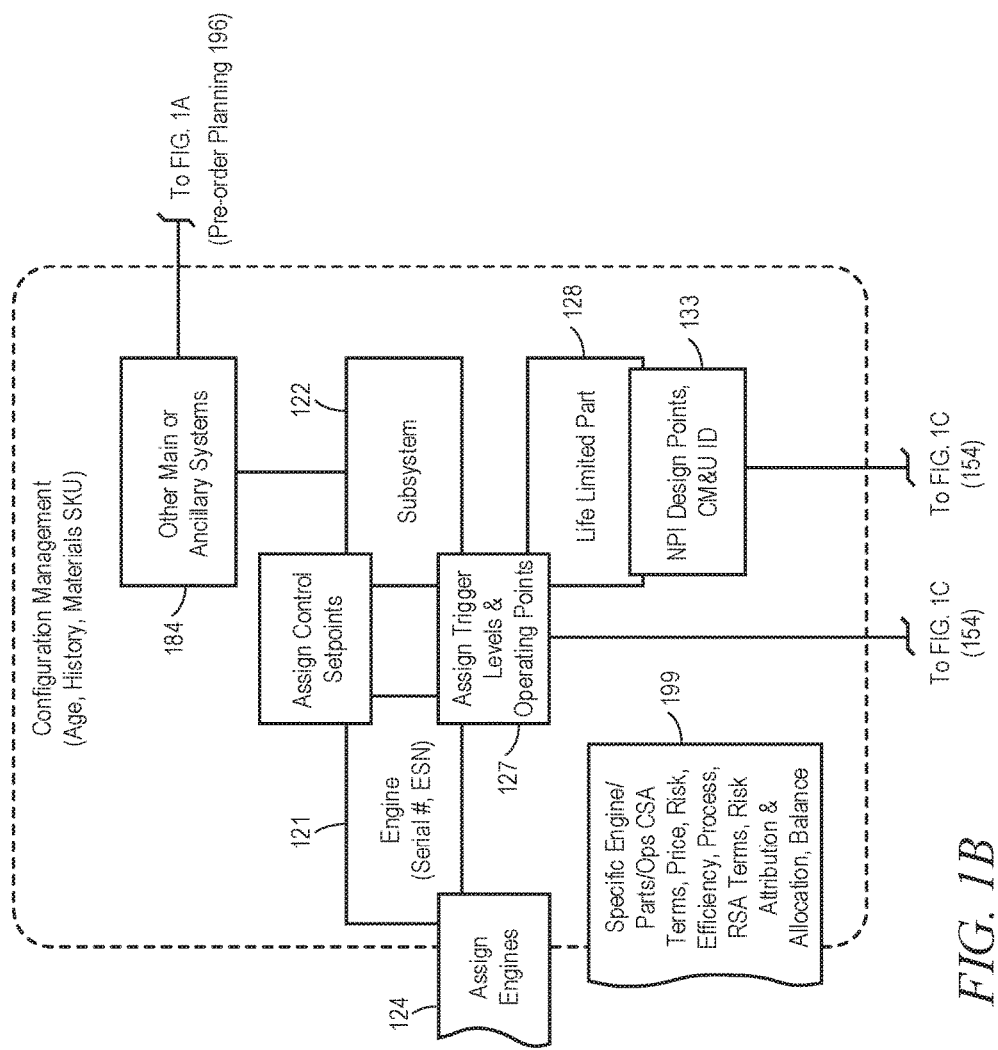

The description that follows includes illustrative systems, methods, techniques, instruction sequences, and computing machine program products that exemplify illustrative embodiments.

A large, complex industrial system, such as, for example, one or more aircraft engines and the aircraft and service systems which interface with them, may be viewed as both a physical system and a business system that can be dynamically controlled to achieve a specified physical state at any chosen point in time, over one or many components in one or more assets, such as a fleet, an aircraft or an engine or its subsystems, and for a plurality of assets. The targeted physical state being controlled for may be automatically and dynamically adjusted, to achieve one or more key performance outcomes of one or more stakeholders over one or more time intervals. Often, balancing these interests involves adjusting various aspects of the industrial system, such as, for example, the operational assignments, placement of new or repaired apparatus as a function of cost and technical capabilities of the components of the system, the configuration of those components, the real time physical control settings of engine fuel and air, the specific operations or control of the business system or network, such as scheduling spare parts stocking level and location placement, scheduling the type of parts to be stocked such as new parts or rebuilt parts or certified used parts that may not have had a repair, deriving the schedule for maintenance operations applied to the engines and their wort scope determination, the costs and risks of service, and myriad other factors. In addition, other factors that are not within the direct control of the system owner or operator, such as the weather; the cost of fuel consumed by the system, the market price of the commodity generated by the system, the actions of a competitor, the introduction of a new technology and so on, may also effect the overall operations, reliability, produced physical benefit, and resulting profitability of the system.

In example embodiments, a method of providing a first set of computer systems with access to a recommendation pertaining to operation of one or more assets based on the one or more assets being in revenue service or in repair is disclosed. Operations data and inspection data is collected at the first set of computer systems. The operations data and inspection data pertains to operating asset states of one or more fleets of aircraft over a time period. The operations data and the inspection data includes values corresponding to fields in the one or more databases, the fields representing at least one of policy data pertaining to one or more operations policies, flight schedule data pertaining to one or more flight schedules, and operating cost data pertaining to operating costs associated with the one or more fleets of aircraft and dates of inspections, types of inspections, and results of inspections conducted with respect to the one or more fleets of aircraft. Assumptions of control input values are derived for use by the first set of computer systems based on the operations data and the inspection data. A financial objective and constraints analysis is performed with a simulation system for one or more assets of the one or more fleets of aircraft. The cost savings analysis includes identifying a modification of at least one of a set of the control input values. An estimated reduction of forecast error related to operating and service costs is computed for the one or more assets over one or more time periods. The identifying is based on comparisons of a first subset of the operations data and the inspection data with a second subset of the operations data and the inspection data. The first set of computer systems is provided with access to the recommendation pertaining to operation of the one or more assets.

In example embodiments, asset lifting state changes are computed in response to a directed duty cycle that differentially degrades engine performance according to those duty cycles and sets the allocation of shop capacity in terms of stocking levels of components, component type, component repair and scheduling of machine work stations, subject to cash objectives at one or more instances of time at a given confidence interval, said statistical confidence being a derived virtual control signal used in an optimization loop to stratify a fleet of assets and schedule physical inspection. A flight schedule of an aircraft may be beneficially changed to reduce fuel and service costs while meeting airline asset utilization criteria associated with operating the aircraft, and the operating limits of inventory scheduling are concurrently attained by stocking, production scheduling and forecast precision—with the control points based upon the disclosed computing state control system and comparisons of operations data collected from databases of multiple external computer systems corresponding to multiple fleets of aircraft associated with one or multiple customers and shop capacity control systems.

The schedules of asset utilization, duty cycles and operating policies, such as thrust limits, in situ maintenance, and so on, which are each directed by the computational control system determine how the operators of the assets attain revenue service from their usage and how variable costs such as fuel expense are realized in operations. The assignment and operation of the subject assets or their states of readiness and/or thermodynamic or operational performance may be governed by a regulation, and/or a contract and/or a maintenance guide. The computing control system controls the industrial system configuration dataflow, the assignment of the industrial system according to a duty, the maintenance of the assets and the consumption of resources in their repair. For various operating schedules and policies, the computing control system calculates either or both of the operator's performance metrics and the service providers. An airline, for example, may manage revenue per seat or airline passenger miles or on time departure or other metric as a measure of how efficiently their asset utilization is Another financial metric may include return on assets in which case the assets may be aircraft, their engine spares and service shops. These business metrics result from the optimal scheduling, operational control of and maintenance of assets. The result is more asset utilization with enough forecast confidence that operational scheduling can assign assets to the most profitable duty, minimize the inefficiency effects of, for example, comparatively poor thermodynamics of the assets which result in higher fuel consumption than otherwise would have occurred in an ideal assignment of assets and maintenance. The present computational control system dynamically and optimally assigns assets to duty cycles, schedules specific maintenance work scope and timing, subject to the constraints of regulation, contract terms and asset or capital structure which sets the number and types of assets and spares—all by setting the assignment duty cycles and maintenance to control the physical states of the assets, monitoring and estimating the states in the current and future intervals of time and dynamically changing the assignments and repair workscopes of the one or more assets.

In example embodiments, engine state estimation (e.g., including damage state estimation) is determined using cumulative damage models (CDMs) over historical, current, and future time horizons using historical data. The basis for these damage models may be historical observation of engine operations and resultant repairs to create probabilities of life such as Weibull distributions. In other instances. Physics based first principle engineering models are derived with, for example, thermodynamics, chemical and metallurgical analysis. The historical data may be aggregated from a plurality of sources, such as engine sensors, service shops, lab tests (image, chemical, physical measures), airline schedules and weather services, and stored in a structured data environment to create assumptions (e.g., for life cycling of specific parts, specific clustering of parts or subsystems as a function of how they jointly fail, or calculating probabilities of failure for specific parts). The data may be used for the setting of life limits (e.g., in cycles independently or in conjunction with metal temperatures or in conjunction with operating patterns or control patterns) and Weibull failure estimations of clustered parts or subsystems, or a cumulative damage model (or other state estimation of the current damage of that part or system at a specific point in time) of specific parts and subsystems. In example embodiments, each part or subsystem has a unique part identifier that the system tracks in a translational way through operating (e.g., as part of one engine for its lifecycle or as a component that existed in multiple engines over one or more repair cycles).

In example embodiments, a specific history or schedule of operations of the engine asset at the asset serial number may be deterministically established. The asset's subcomponents may be a set of parts that change during repair or service events, which are tracked by discrete serial number and enabled to emulate physical state estimations, suggest operational decisions, such as repairs and route and engine assignments, and calculate stakeholder finances for an emulated period.

In example embodiments, combinations of engine assets (such as an engine pair on a given aircraft) are determined. The determinations may include jointly optimizing multiple operations for multiple stakeholders, deciding to change one of the engines, or matching how the aircraft is going to be scheduled (duty or location of operations or on-wing maintenance activities or operating parameters).

In example embodiments, joint optimization is enabled with respect to work scope and assignment of engine assets (e.g., including the parts that are selected to be a component of the engine asset) to an aircraft across a portfolio of assets, such as operating engines on in-service aircraft, engines in repair, rotable engines in waiting, or repaired part or subsystem components in inventory.

In example embodiments, maintenance cost optimization is enabled to, for example, minimize the total service cost and negative free cash flow variance from an operating plan or a deferred balance, over a specified time interval such as a contract period or as a function of asset membership in the portfolio where the portfolio has an economic life forecast, such as when engines will be retired from service or subcomponent of an engine will be repaired, placed, or retired.

In example embodiments, operating cost optimization is enabled to minimize fuel consumption and/or the opportunity costs of reliability (e.g., such that one or more engine assets and their component parts are assigned to a route and have a specified state of repair and/or efficiency so as to fly routes whose schedule is informed by die efficiency and/or reliability of the assigned one or more aircraft engine(s) on said aircraft).

In example embodiments, operating cost optimization is included, such as, for example, where the portfolio of assets (aircraft and/or engines and/or parts) are jointly repaired and assigned, so as to lower the fuel consumption, and the un-reliability opportunity cost for a portfolio, in the instant or over a prescribed forecast interval. In example embodiments, the interval is randomly selected or determined as a function of one or more service contract intervals covering that portfolio or forecasts of that portfolio's operating life factoring in retirements.

In example embodiments, assignments are derived and then optimally controlled by the disclosed computing system to achieve the enterprise risk/return preferences for the physical-business system such as an airline, an investor, or an OEM. Examples include the quantity and type of aircraft and aircraft engines, the physical features of the engine, control and service levels, cost and risk, including an investor's economic return and risk when making investments into the aircraft physical-business system, and an OEM's performance-based service contract terms, price, management and risk, and the contractual service agreement (CSA)/maintenance service agreement (MSA) target ratio.

In example embodiments, the risk of service cost in a contractual service agreement is estimated and priced, such as, for example, where maintenance cost and/or operating cost and/or reliability is to be guaranteed, in various embodiments, the estimating and pricing uses average estimates derived for many historical observations, such as Weibull distributions, and life limited settings for one or more engines in the agreement, in other embodiments, specific historical data is used to create a reliability characterization, such as those historical data that represents a certain operating mode and that that probability distribution is thus used for more specific forecasting by virtue of its basis more closely matching that of a given current engine's life, in example embodiments, as cumulative damage state changes are calculated for the specific engines, and the confidence interval old n in multiple periods are forecasted and actual state is within those forecast intervals (e.g., dynamic set points which are determined by one or more of the optimizations above), average assumptions are replaced with the CDM change forecasts (e.g., for the purposes of contract margin management, work scope and requested change to asset operations via control settings, or asset assignment).

In example embodiments, orchestration of the forecasts in a discrete event and agent based simulation is included as a core component of the disclosed control system. The orchestration logic implements subsystem decision support such as assignment optimization, spares utilization assignments, leased engine scheduling, flight operations policy and control set points, ground operations scheduling, parts forecasting, control preference, and work scope specification as directed by the discrete event simulation code. Alternatively, the orchestration may be directed by an agent based simulation or hybrid of continuous, agent and discrete event. An outer loop optimizer (e.g., stochastic, full enumeration, or foil enumeration with logical cuts) solves individual decision support preferences (e.g., from pricing, work scope, assignment, rotables management, retirement estimation, portfolio membership, and so on) to optimize the ratio of risk and return to one or both of the preferences of an aircraft fleet owner whose assets are under contract or the offeror of the service contract or operation s optimization decision support, such as an OEM or third party service provider. Other optimization objectives enabled by the disclosed computing control system include cash consumption, inventory, spares, turnaround time (TAT).

In example embodiments, a physics-based approach is accepted in addition to data driven methods into the simulation CDMs are used to estimate the state of the aircraft engine to optimize various operations, such as work scope, spares parts stocking, TAT, maintenance, and contractual service agreements' cost exposure for a given service level. The damage/life degradation of tracked subsystems in an asset or die asset in whole will be estimated using one or more CDMs in a selectable interval of time, including a future time where the duty cycles of the asset are controlled by a simulation or are being utilized according to a schedule.

Joint optimization of industrial assets may be used for a combination of work scope scheduling, inventory planning, route assignment, asset assignment to a higher level system (e.g., a certain aircraft engine to a certain aircraft) design modification, dynamical control, financing, service contract underwriting, or service contract operations management.

Scenario planning and purposed orchestration is incorporated to achieve desired states of the physical assets and the operations that use and consume those assets (e.g., using an agent-based and/or discrete event simulation approach). In example embodiments, operating histories of parts and assets, including life experiences (e.g., location, exogenous factors, controls signals, sensor signals, repair activity inspection results, events manufacturing data, and so on) are stored, and used for life cycle control of the state of physical and operations systems, including orchestration of tracked parts (e.g., an engine shroud), asset systems (e.g., an engine), higher-level systems (e.g., an aircraft), portfolios of higher level systems (e.g., aircraft types and clusters of aircraft), scheduled location, exogenous factors (e.g., temperature, humidity, pressure, suspended chemicals, or aerosols) at locations (e.g., city pairs or geo-spatial coordinates), resources that are used, conveyed, or processed (e.g., ground operations, fuel, passengers, crew, cargo, and so on) by higher level systems, service operations (e.g., capacity), inventory, inventory type (e.g., used, new, remaining useful life).

In example embodiments, digital twins of asset entities and operation entities are created and maintained, within the system for use in operations simulation. The digital twin is a digital representation of an actual state of an asset or operations model as it can best be approximated at a particular time period based on data inputs and statistical analysis. In example embodiments, the data inputs may include an observed state of the asset at a particular time point and historical data pertaining to states of similar assets over time.

In example embodiments, a Digital Twin is a continuously tuned, serial-number specific digital representation available m a scalable manner so that every piece of equipment in a set of assets (e.g., a fleet of aircraft, the engines assigned to the aircraft, or the subsystems within the engines) is individually modeled with respect to its state estimation, including life and efficiency states. Digital Twin Operations Optimization (DTOO) is a logical extension that models the operations with the intent to optimize the rate of stale change caused by the purposed operations of the assets and the business systems which support their use and consumption processes so as to improve financial and operating key performance indicator (KPI) objectives. KPIs and functional objectives may collide where a local optimal may detract from a system wide benefit—and a means is created to optimally manage the dynamical business-physical system's impact on, for example, customer asset utilization, fuel consumption, shop cost, capacity and inventory, safe risk adjusted CSA/MSA, growth and cash flow from operations. To demonstrate the methodological approach for operations optimizations, a discrete-event simulation models the provider-customer ecosystem in order to understand the impact of different operating decisions to both the provider and the customer in a consistent modeling framework and set of assumptions. In example embodiments, this capability has the core discrete-event simulation engine in the background, on a parallelized, high-performance computing environment, serving multiple light-weight applications. Each light-weight application is designed to address a specific question of interest by interacting with the core simulation, the simulation assumptions data base or in-memory arrays, post-processing the output, interacting with the post-processed database(s) or computer(s) memory and reporting the results from the simulation, memory or data store in a relevant format that may itself be configurable by the user for the user to make a decision one or multiple times on an ongoing basis.

Individually, these models can be used to understand the actual performance of the equipment in its operating environment, ultimately providing better forecasts for performance degradation, maintenance workscopes, scheduling, and spare parts. When done at scale (e.g., in aviation context), these models can be integrated and used to provide a fleet-wide perspective to identify system-level efficiencies and strategic planning. A logical extension of Digital Twin is to model the actual customer and provider operations used to generate desired business outcomes and, ideally, optimize the processes to improve either or both customer and provider financial objectives. A DTOO model of customer operations may call and/or incorporate the digital twins of the equipment and business system the customer is operating to either explore potential future scenarios (as a human-drivers sensitivity/what-if tool), or in a more advanced form, actually suggest optimal asset or process modification, assignment, control limits and setpoints, repairs and support services deployment recommendations for in support of the equipment (closed-loop optimization). Applications built on top of the DTOO analytic framework may then serve the provider's internal customer's, such as CRMs, shop planners, finance and new engine commercial operations, and may also be used to deliver customer-facing tools and new service offerings as well.

In example embodiments, the DTOO capability fits within an overall decision support structure that centers around modules focused on analytics-based removals (ABR), analytics-based workscope (ABW), operations efficiency and customer productivity. In example embodiments, the DTOO capability fits within operations efficiency module, but pulls information from tools developed within the ABR and ABW modules. In various embodiments, the DTOO drives customer productivity. In various embodiments, engine operating data, contract data, and environment data are outputs from the customer productivity module that are received as inputs at the productivity module for optimizing asset availability (e.g., engine time on wing), cumulative damage modules and configuration data are outputs from the ABR module that are received as inputs at the ABW module for optimizing cost through asset lifecycles; cost accumulation and material mix/demand capacity data are outputs from the ABW module that are received as inputs at the operations efficiency module to drive speed and productivity; data pertaining to fleet optimization, productivity, upsell opportunities, and featured customer applications are outputs from the operations efficiency module that are received at the customer productivity module to deliver monetized value.

In example embodiments, in the aviation services context, a discrete-event simulation models the provider-customer ecosystem in order to understand the impact of different operating decisions to both the provider and the airline/customer in a consistent modeling framework and set of assumptions. For example decision support: if an airline were to expand its routes to include city-pairs with known harsher conditions, what quantitative effects would that have to the number of shop visits, and ultimately to CSA profitability given the specific CSA terms and conditions for that customer? Or, in another scenario: if the provider were to make a derate recommendation to a customer for a particular flight route, what potential side-effects would we see in fuel burn or engine degradation or shop visit cost or services cash flow from operations? Such a holistic modeling capability is used to identify and then control the unintended side-effects of operational decisions, explore interventions to mitigate negative consequences, or proactively identify win-win recommendations to airline customers in both operations and new engine sales and/or service campaigns. In example embodiments, the model is intended to simulate the ecosystem on the time-scale of months to years to understand the aggregate impact of operating decisions over time; it is not intended to represent day-to-day operations which might include flight routing through airspace, or operational recovery from unplanned events, though those elements are callable by the system's simulation-optimization and vice-versa.

In example embodiments, a core simulation engine sits in the background on a parallelized, high-performance computing environment, serving multiple light-weight apps. The core simulation is a discrete event simulation that models some or all of the provider-customer ecosystem, from airline flights to maintenance and parts management. Depending on the inputs, the simulation can be used to analyze the impact of different potential future scenarios, or can be used to conduct sensitivity analysis on parameters of interest. This holistic modeling capability allows a user to configure the simulation to address specific questions to identify win-win recommendations for the provider and customers. In this manner, each light-weight app is designed to address a specific question of interest by interacting with the core simulation, post-processing the output and reporting the results in a relevant format for the user to make a decision.

In example embodiments, the simulation includes an orchestration of business-physical subsystems that are called within the application as subroutines or as services that exercise kernels, command line applications on one or distributed computing environments. The core simulator-optimizer builds at runtime from configuration tables so as to allow easy incorporation of changes from asset state inspections/determinations, actual operations, business process updates, COM upgrades and additions, operating policy and maintenance service or supply chain status.

The disclosed computing system's ability to simulate the provider-customer ecosystem in a single consistent modeling framework and set of assumptions brings a new capability that serve numerous users. For the provider's Customer Team, a use case is planning and scheduling engine removals and specific on-wing maintenance to minimize CSA costs for specific contract fleets. Interacting applications include shop visit (SV) & Workscope Planner, Engine Removal Beat Map, Spares Forecaster, Lease Forecaster, and Inspection Manager applications. For the provider's shop planners, the general use case includes determining shop demand functions under different scenarios and assisting with shop-loading via engine assignments to different shops. Applications may include Shop Slot Tool and WSA Planner applications. For the provider's material planners, the general use case may include determining short, medium, and long-term parts demands under different scenarios (e.g., via a Parts Forecaster application). For the provider's customer advisors, the general use case includes identifying win-win policies or operational changes for airlines. Applications include Airline Scheduling, Schedule Recovery, Waterwash-Fuel Burn Tradeoff Single Engine Taxi, and Derate Sensitivity applications. For customers, the general use case may include quantifying impact of operational policies on fuel burn and maintenance burden. In example embodiments, users will interact with the system simulation via the apps for their specific use-case.

In example embodiments, the framework includes an "app generator" function designed to answer a specific question with a computing system control that can be generated quickly (e.g., in one day or less), whereas other more complex apps would require custom design and development. Applications types may include (1) a detailed scenario analysis application, which enables a user to create a scenario and produce multiple detailed output view of the results in the form of graphs, heat maps, and aggregated values, (2) a comparator application, which allows a user to define a limited number of (e.g., two-three) scenarios and generate graphs comparing key metrics between the scenarios, and (3) a sensitivity application, which allows the user to perform sweeps of up a subset of (e.g., up to three) parameters to perform a sensitivity analysis or tradeoff study for which results are output (e.g., on a graph with the third parameter represented as contours).

In example embodiments, described technologies may be used to store the operating history of parts and assets, life experiences (e.g., location, exogenous factors, control signals, sensor signals, repair activity, inspection results, events, manufacturing data, and so on) towards life cycle control of the state of physical and operational systems.

In example embodiments, a method is disclosed for financially valuing and co-optimizing the design and operating policy choices of a complex industrial system, such as a power asset, thereby achieving multiple objectives beyond financial value creation and/or risk reduction. In practice, complex engineered systems used in industrial processes may have a business context, such as contractual service agreements, capital financing terms and covenants, interconnect policy, regulatory policy, and competitive substitutes in their served markets. Optimizing an industrial ecosystem without consideration of the multitude of objectives and constraints or considering the ecosystem's many existing constraints for the purposes of asset design and operating policy may trap economic or other aspects of value.

In example embodiments, the method considers aspects and silos of economic value for subsets of choices within complex engineered industrial systems and the surrounding business processes and structures. The disclosed system allows for the discovery and control of system design and operating constraints, the co-optimization of multiple objectives that can be achieved with design or operational decision support over an economic or operational interval. Further; the method allows for the resulting financial risk and returns from the various design and operating policies to be used, or candidates to be used, for specific discount cash flow valuations associated with those investments and operating policies—and therefore, facilitating the allocation of risks and returns to the sponsors of various incremental investments in the industrial system and for responsible stakeholders who chose not to make certain investments or operating policies.

The computing control system's capability to run the virtualized system, its various state estimations for degradation and performance while calculating the interactions of the design and operations choices provides the mechanism for calculating the real option value of those choices. It provides precise sources of and contribution to variation, and identifying and proactively managing system level sensitivity and performance or financial risk abatement. The method enables the disaggregation of risks such that the discount rates may be replaced by simulated and replicated operational and design scenarios which thusly enumerate the probable financial outcomes, thereby obsoleting the need for gross or average discounting of future cash flows and instead is able to place specific discounts for future uncertainties according to the system level variation that results from a given design or operating choice. Similarly, given the ability to vary any aspect of assumption, design feature or operating policy and then simulate the industrial system's operating and financial performance—specific causality of choice to performance is enabled for the purposes of allocating cash flow. The delivery of the cash flows amongst stakeholders is certainly enabled with traditional debits and credits into financial accounts and may be implemented with cryptocurrency mechanisms whose core logic is informed by precise allocation of cashflows.

In example embodiments, the system co-optimizes use of assets (e.g., aircraft engines and the aircraft which use them), contractual services (e.g., service agreements for aircraft engine repairs), and servicing of the assets for both a customer and a service provider (or "SP" or "provider"). Cumulative damage models for the assets are orchestrated through time-based simulations and engineering models. The system goes back into history to determine exactly how aircraft engines (e.g., by serial number) have been flown. Engineering models are generated and fed data pertaining to surface temperature, local oxidation, stress, strain, cracks, and other data needed to estimate the physical stale of key components/sub-systems of the engines at a point in time. After the current point in time, simulations play out multiple possible futures. Different possible scenarios are enumerated for relevant parameters, including flight schedules, engine assignments, service work scopes, demand for worn-out parts, and so on. In example embodiments, the analysis is constrained based on contractual term limitations pertaining to the asset. The estimated demand may be used as a demand function for shop scheduling automation, making it possible to automatically make choices about parts inventory and cost calculations pertaining to the engine maintenance (e.g., comparing costs of using a new part vs. using a rebuilt part).

In this complex system, adjusting a risk and return corresponding to one aspect may require a trade off for another risk and return corresponding to another aspect. For example, something might be economically optimal for a given engine, but suboptimal for service shop operations. And if a service provider changes something on the engine, such as a part or workscope or sequence of activities, to make the shop operations more efficient, it could be the case that the customer is impaired in some way (e.g., constraining how the customer may schedule flight operations). As another example, a customer may be flying an engine with less efficiency or an impairment that would make the engine more appropriate for assignment to a different route or route sequence. Coordination with the service provider for engine assignment or a different service schedule may allow efficiencies to be realized by both the provider and the customer, in example embodiments, the efficiencies are discovered through modeling of combinations of factors (e.g., engines, parts, schedules, and so on) based on historical and observed data.

The following sections describe some of the benefits and features of the described system. In example embodiments, these benefits are in areas including services scope, life cycle cost, design, system modeling, and asset operations decision support.

Services Scope

In example embodiments, we select the scope, timing, or risk level of maintenance activities.

The risk of an asset (e.g., an aircraft engine) reaching a maintenance interval with sufficient remaining life or utility of the apparatus is traditionally embedded in the discount rate of an NPV calculation. The risk is not deterministic; instead, the disclosed system control changes the industrial system's operation variation which is further transformed into financial variation. It is recognized that the very actions taken with the asset, such as how, where or when it can be operated, add to or take away from the risk of getting to the desired outage time and scope. The disclosed embodiments do not necessarily assume that the asset will be operated as it has historically been; instead, it contemplates that the operation of the asset can be dynamically scheduled, operated, maintained, modified and assigned differently to control the targeted variation and to cause a state (degradation level and/or operating efficiency) to occur on a created schedule. In various embodiment, any combination of settings or parameters, such as remaining life, operations, maintenance tasks, scope on those tasks, and timing decision variables to be co-optimized, along with other factors spanning revenue from different duty cycles, regulatory limits, service contract limits, market dynamics, may be included in the physical, operational or financial risk calculation.

Industrial systems are comprised, of many subsystems or sets of assets. The overall performance relies on the sub systems interactions, which example embodiments control. How these subsystems can fail together is calculated and their probability. The current asset's joint probability estimate of a failure occurring is updated, instead of depending on observations of joint failure that are observable, recorded, and thus available. In example embodiments, the systems within the industrial and business ecosystem are simulated, exposing them to usage which is made a component of the decision space and tracking the life consumption and probabilities by subsystem so that both the duty cycle of the ecosystem and the repair scope and repair timing are made to be endogenous choices.

Life Cycle Cost

In example embodiments, the practical reality is considered of changed duty cycles that occur in an industrial system's economic life resulting from competitive forces, regulations, and comparative changes in feel costs. In example embodiments, instead of doing a one-time design optimization for the purposes of asset construction (cost bidding that uses a discount rate whose intent is to account for all unknowns), an ongoing simulation is used to test an asset's current design, operating line ups, maintenance activity, control set-points and variable generating costs against service contract, interconnect, and, financial and, regulatory dynamic limits for the purposes of dynamically changing the physical design and/or operations policy from a past and current state to a desired future state, in time.

Modeling

In example embodiments, system parameter sensitivities are quantified (e.g., a coefficient for such parameters need not be specified) and the scope of subsystem and stakeholder interests are optimized for (e.g., it is not assumed the future operations will be as the past has been or that there are no constraints from service contracts, financing covenants, grid interconnect or regulatory or competitive dynamics).

Neither the design nor the duty cycle and asset configuration is assumed to be fixed (e.g., "static"). The system seeks to bring these endogenously into the decision space at both the design of the asset and during its life so as to beneficially change its design or line-up or configuration or its load profile.

Constraints may be imposed by a governing service contract on one or more assets comprising the engineered industrial system, including regulatory or interconnect or capital constraints. The terms of operation are modeled within the digital twin operations optimization.

Instead of treating risk as the inevitable result of a changed instrument reading or exogenous factor, or considered that the risk threshold is a fixed value or that the only risk considered is financial, negative variances in other dimensions of the risk calculation are enabled with the control system. For example, the risk threshold is not a deterministic level with no guidance as to its proper set point or comparative relationship to the potential returns at the said risk limit. In various embodiments, the level of risk is informed as a comparative value with respect to returns on one or more dimensions of value.

"Risk" may also be treated as an event or a string of events not taking place, such as, for example, a risk that an outage will not occur at a scheduled time. In example embodiments, a means for adjusting the liming and work scope of an outage is provided, as is a change in operations activities, so as to achieve a duty that degrades the system on such a path that the disclosed control system enables an outage to occur per the created schedule and that the reliability risk of the apparatus does not cross a risk/return objective, should that objective be set as a binding constraint.

In example embodiments, sub system models are orchestrated through simulation time, exposing said simulated system to exogenous factors, operational choices, contracted services terms, capital structure covenants and calculating probabilistic responses for physical, financial and other metrics of value, such as emissions with a temporal consistency, that enforces the lifecycle performance and operating paths resulting from decisions made at any point of the simulated life. Further, the disclosed system optimizes over multiple periods so as to comply with a risk/return preference for one or more period in such a way as to facilitate the migration of the system from one risk/return preference to another, subject to physical, financial and regulatory constraints.

In example embodiments, the calculation of optionality is enabled so as to switch objectives and/or design or operating paths over die simulation period and allow for probabilistic analysis as necessary for robust design, financial, or operational risk management.

In example embodiments a given power asset and its subsystems are focused on, and not a portfolio of assets, though the methods and systems disclosed herein may be used in a meta model or portfolio or higher order systems of various assets with an overarching financial objective. In example embodiments, a discrete event simulation and replications are used to build probability density functions of interactions, not Bayesian methods. The currently disclosed systems and methods may overcome many inaccuracies introduced into analysis by including the ability to change how the assets would be operated, dispatched, or modified over multiple time periods.

In example embodiments, a service provider may enable or provide a customer with modules for deployment in a client machine, the modules configuring one or more client machines to access modelling tools described herein (e.g., deployed on a server system or on-board control) and present information pertaining to the modelling in user interfaces on the one or more client machines. Using the client tools, the customers may be able to experiment with what-if scenarios pertaining to operations of industrial assets (e.g., based on historical data stored by the provider on server machines and simulations, as described herein). In example embodiments, the customer may pay a license fee to the provider in order to access the disclosed system's data and tools used in the forecasting and dynamical optimization of designs, operating policies, schedules, workscopes, and so on.

In example embodiments, a provider may use forecasts generated by the tools described herein to underwrite or reunderwrite performance-based contracts (e.g., between the provider and customers). Based on forecasts of asset operations and maintenance, a provider may identify under-rewarded risk. For example, a provider may be able to focus on data pertaining specific engines in order to de-risk existing contracts that are based on average engine assumptions (e.g., average flight-hours, average locations, average service-shop costs, average duty cycle severities, and so on) across multiple types of engines. In example embodiments, calculations pertaining to under wiling and risk for a contract will depend on particular terms in the contract pertaining to use of the engines. For example, for a certain engine platform (e.g., a GE 90 on a 777 aircraft), the engines have a certain repair service and work scope rate on average. However, a customer may have a fleet of 20 such aircraft and put three of those 20 on one-hour city hops, exposing the engines to frequent high temperature excursions which differentially consume life vs average life, whereas the customer may put the other aircraft on transatlantic flights, where the ratio of metal temperature excursions are low per flight hour, extending the life of those engines beyond the average. A contract may be generated for a customer that includes terms pertaining to the nsks associated with the most important identified variables pertaining to a specific use of a particular asset or particular subsystem of the asset. Thus, a portfolio of such contracts between a provider and a contractor would not be based on averages, but instead on modelling of each individual asset based on planned uses and active control of that asset and industrial eco-system with the disclosed system.

In example embodiments, a provider may for ecast economic consequences of purchasing new engines or upgrading a set of existing engines. Using the modelling tools, a prospective customer may be able to determine, for example, based on an asset portfolio of 100 aircraft, 200 engines, and 15 spare engines, that a particular upgrade (e.g., changing high-pressure nozzles on 25 engines) over a certain percentage of the assets would give an economic benefit (e.g., enable the aircraft to handle a more profitable schedule more efficiently) over the lifetime of the assets. In example embodiments, we consider two cases wherein a first case is that the only data pertaining to maintenance of a first asset manufactured or serviced by a first provider makes up the average data and that the data pertaining to a second asset manufactured or serviced by a second provider is specific historical data pertaining to the specific asset and the planned use of that specific asset by the customer (e.g., flights of 100 aircraft between specific city pairs). For the second asset, the actual usage of the engine by the customer is simulated over the lifetime of the asset, including all service shop visits and service repairs, based on specific data pertaining to the planned use of the asset, including operation policies of the engines, weather through which the engines will be flying, and so on. The second case beneficially draws upon the realized results of the first case and uses asset and duty specific wear. The operations and service risks that may be forecasted using empirical evidence and first principal models using observed data as a basis for assumptions that the customer doesn't wish to manage may be moved over to the provider's balance sheet in exchange for compensation in the contract to mitigate those risks. The precision of the analysis possible with the first case with respect to the second asset allows the provider of the second asset to provably demonstrate an increase in the net present value and/or real option value of the customer's operations, or a reduction in risk, that exceeds any option that the first provider may be able to demonstrate to the customer with respect to the first asset. Thus, not only would a customer be more likely to purchase an asset from the second provider, but also the cost of capital associated with the purchase may be reduced based on the increased precision in the risk calculation and thus the enablement of lower risk capital provisions.

FIGS. 1A-1G are framework diagrams illustrating the relationships of the system's control points and operational paths associated with an example industrial system. Such relationships may include, for example, relationships between asset duty assignment, resultant system and sub-component life consumption state, system and sub-component reliability and their effects on service timing, work scope and service operations, and so on. In various embodiments, the framework may be implemented as a distributed multi-agent physical system control to dynamically optimize risk and value for one or more stakeholders with simulation and optimization. In example embodiments, operational paths are actively controlled to create different physical states of a plurality of components, assets, and operations associated with a one or more assets comprising an industrial system, so as to achieve the multiple criteria of operators, service providers and investors over a specified time interval, above a specified probability of fee one or more outcomes.

Figure 1C:
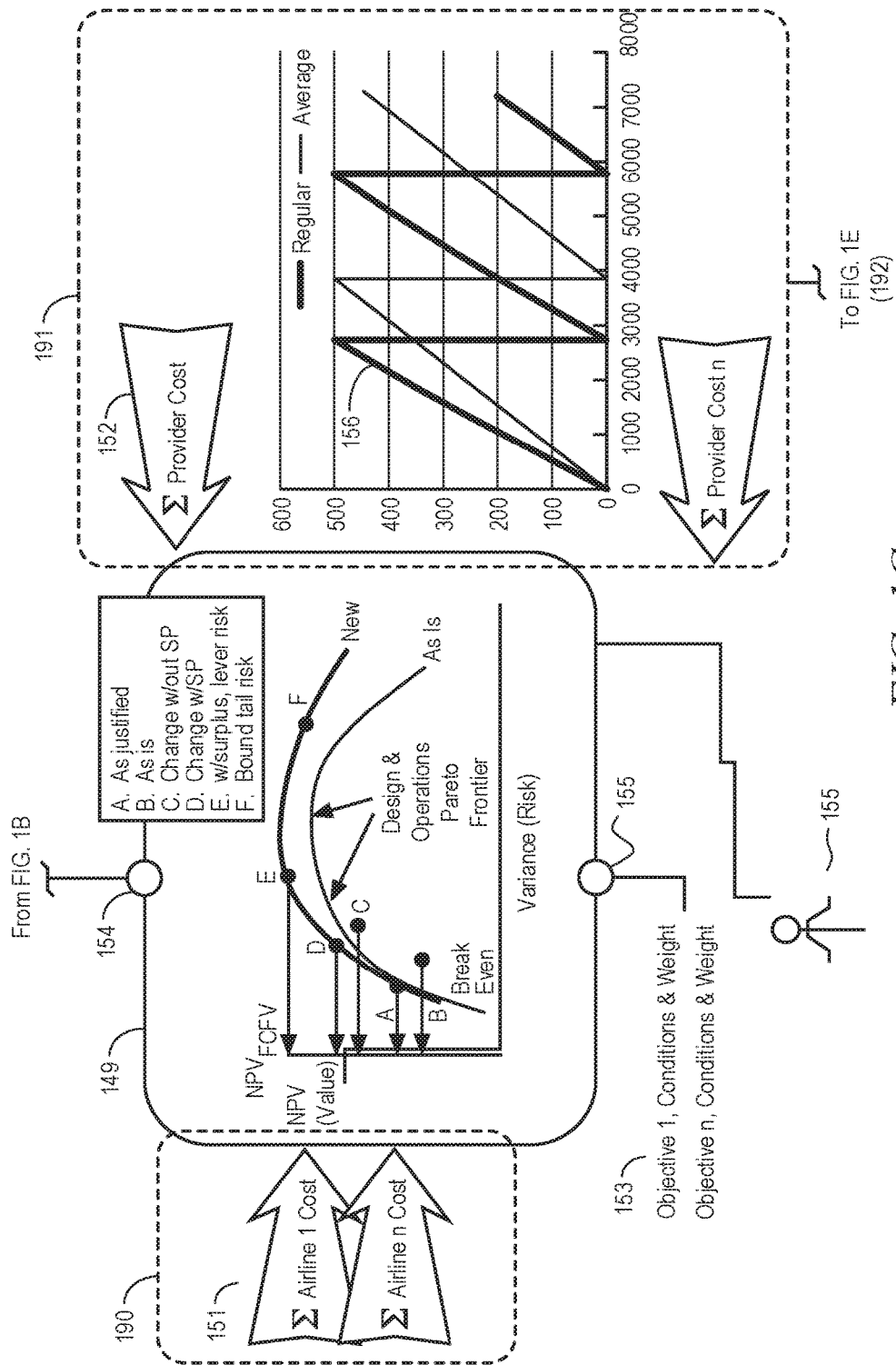
Figure 1E:
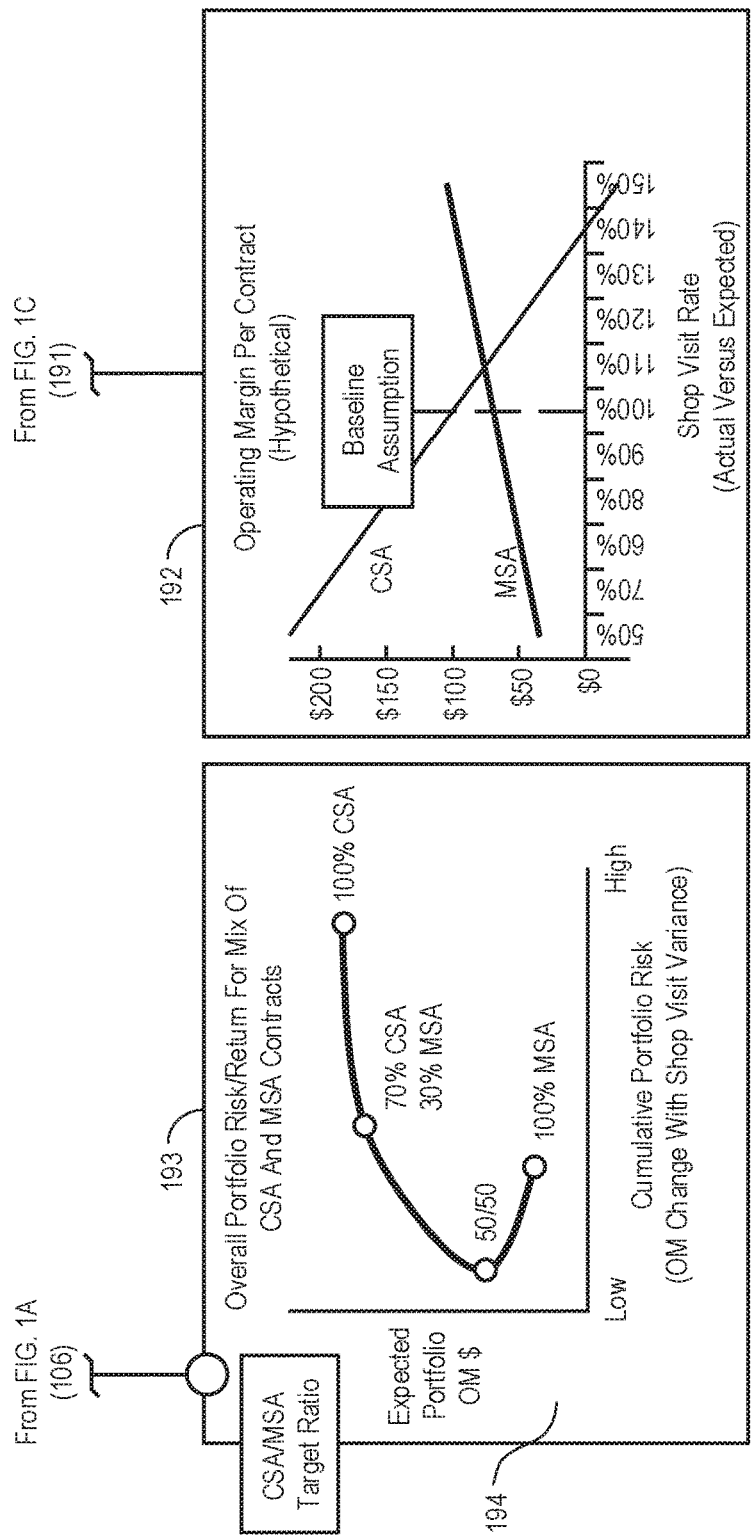
Figure 1F:
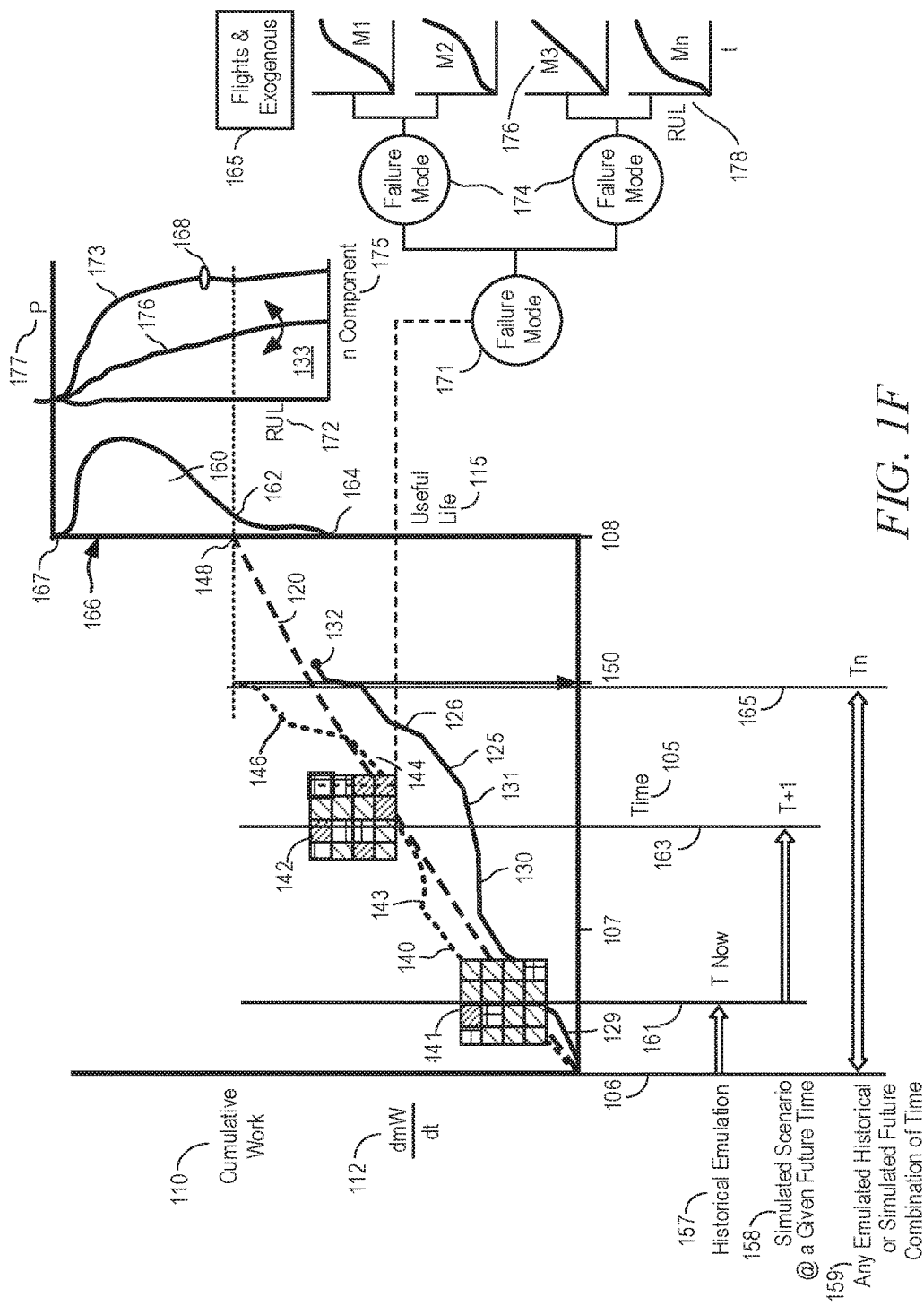

In particular, the framework 100 depicts, at FIG. 1F, a first operational path 120 and a second operational path 125, such as actual operations or a simulated scenario or replication over time 105 for operating an industrial system, such as aircraft, their engines and the key subsystems there-in. In addition, an alternate life consumption 140 path arises from a different use as compared to the second, operational path 125.

The scenario path 120 may be an average life consumption path, such as for a single or plurality or portfolio of assets, or it may be a reference design or operating path used to characterize expected asset design performance and operations service levels. In reality, industrial assets may be exposed to unique duty cycles or purposefully operated by the disclosed system to have a non-standard operation so as to cause one or more of the assets' subsystems to achieve a desired physical or operational state probability at one or more points in time and thus a unique path through their economic life.

Generally, component parts and subsystems of the example industrial system may operate over time such that the useful life of those components is consumed during that time. Accordingly, the industrial system needs maintenance from time to time to replace or rebuild the component parts or the entirety of the industrial system. How the industrial system is operated with respect to the temperatures, pressures, chemistries and stresses resulting from the chosen operations and/or control settings will impact the remaining useful life at a given probability and/or reliability 120, 125, 140 and through time 115 up to the asset or a subsystem's useful life. It is beneficially not limited in operation to fully consume useful life, but certain maintenance events and operating control choices can be made at any point 105 in time to benefit one or more objectives of one or more stakeholders at one or more intervals of time.

More specifically with respect to FIG. 1F, the first operational path 120 depicted therein represents a steady-state operation of the asset for a design or assigned load at a constant work output 112 (e.g., in thrust per unit of time, in megawatts produced per unit of time, etc.) and standardized or non-variant exogenous conditions 109, 165 and a defined duty cycle. Exogenous conditions are, for example, those input factors the industrial system is exposed to which cannot be directly controlled by the system in a given design configuration such as, for example relative humidity, barometric pressure, temperature, air pollutants or suspended aerosols. A duty cycle is, for example, a changed rate of work output, starts and stops of an asset, a location and rate of change of location.

In some embodiments the operational path 120 may also be a base case plan to which other plans of operating the industrial system may be compared to. Consequently, the asset and/or its subsystems 175 will reach a particular reliability level 162 with a corresponding maintenance outage point in time 105 and associated maintenance time and work scope 108 at a specified reliability probability 160 (e.g., probability of remaining useful life) for the specified subsystems 175 that are employed for system operation at that time.

Relative to the first operational path 120, the second operational path 125 results in a variable power output rate 112 over time 105, with periods of operation matching a load point whose power output rate 112 is the plan or design operating point for the physical system, a steady-state rate segment 131 during which the system consumes differentially less useful hie 115, and a rate segment 126 which consumes differentially more useful life rate and a shut off rate 130 during which the system does not consume any useful life 115 of the overall asset or for a targeted subsystem 175, such as a life-limiting apparatus or subsystem component(s) of the asset.

The design and controlled point of physical state may be at a subsystem of the asset, such as one or more of the parts and subsystems of the asset or at a higher level (s) than the asset such as, for example, the aircraft and fleets or subsets of a fleet of aircraft.

The useful life consumption path 120, 125, 140 represents the life consumption for the entire system resulting from the limiting subsystem or part within the system 175, for example, an engine's combustor. In some examples, subsystems 175 of the system or asset may be controlled so that the useful life 115 of each subsystem 175 may be managed by identifying upgrades, performing asset configurations (e.g. "lineups"), scheduling operations and scoping maintenance.

Life consumption of an industrial system is typically nonlinear as a function of work input or output outside of a "normal" or nearly always outside of a design operations point or range. At the system level, some compensation for physical stress avoidance can be made, such as by setting a control configuration that preserves life of the asset but sacrifices efficiency or life consumption, such as during useful life segment 146. Such configurations, as well as other operations, control, maintenance work scope, and other physical and business aspects of the asset, may help manage economic aspects or other aspects of value related to the engine or its use. For example, managing operations, control, and maintenance work scope so that the useful life segment 146 is at a desired reliability probability 160 at a certain time 105 is probabilistically accomplished. This control accounts for the historical path 157 up to the present time 161 and calculate the physical states of the tracked and managed subsystems of digital twin state estimation 141, 142 and then be simulated through candidate operating scenarios 130, 140, 143 to a future time 163 at which point the control system is seeking to achieve a physical state of the entire asset or one or more of its subsystems or parts of digital twin 142 to be at a specified damage, life or efficiency or reliability state 115 at that time 158. The targeted states in time may be set by the system to achieve desired operations points such as asset utilization, parts inventory, cash position, as operations examples.

The stale condition refers to one or more of physical apparatus damage, remaining useful life, efficiency, reliability, shape, surface roughness measurement, crack length or depth or other physical aspect of an industrial system in whole or in part. The state at any interval of time 105 between time zero 106 to the present 161 or future time 163, 165 or any incremental segment of time (e.g., 161 to 163, 161 to 165, or 163 to 165) that is of interest to control other aspects of the system such as, for example, service shop demand for repair services 135, operating costs of the assets 151 and the higher level systems the assets are a part of (e.g., an aircraft) or to synchronize the concurrent state condition between a number of assets (e.g., two engines on a given aircraft) or to manage a portfolio of assets to a state condition (e.g., the engines assigned to a region, the engines on a given service or performance based contract or in a given financing contract or the cohort of engines that are targeted for retirement at a certain time or state condition or whose totality or certain components of are being financed by a stakeholder whose risk and return preferences 153, 149 are being controlled for via the operation or control or service scope of an asset or component of an asset or a higher level system that is using/consuming the asset.

The emulation and simulation system is used to calculate the current 157, future 158, or any interval of time 159 state condition for any aspect of the system from a specific part 128 or subsystem 122 of a given asset or to the specific asset 121 as a whole or to classes of assets such as, for example, an engine type that is defined as having certain parts or vintage or service history or service contract or other type classification.

The emulation and simulation based control system 100 is used to calculate the state of plane types, specific states of assets 121 assigned 124 to a specific higher level asset 117 such as a given aircraft.

The emulation and simulation system is used to calculate and orchestrate the assignment 123 of specific higher level systems 117 such as a plane, which has specific engines 121 which are comprised of specific subsystems 122 and parts 128 that are in turn operated 127 in a determined way by the optimizer 154 for efficiency and/or life consumption—with a duty or schedule 116 such as a route or sequence of routes with specified operations parameters such as allowed rate of power output. At each operation or dispatch or assignment, the asset 121 is controlled 127 in a determined manner to achieve the change in state 141, 142 at a point or interval of time 105. At the location of assignment 116 or between locations or cycle waypoints or dispatch points 102 or operating points 112, certain exogenous conditions/factors 104 at those points affect the rate of change of the physical state of the asset 134 and its subsystems 171, 174, 168. These one or more degradations (or repairs) are calculated for each increment of time 105 for each tracked subsystem 122 and part 128 for one or more life consumption mode via one or more state estimation engine(s) 134, 171, 174 which accumulate 110, 115 the specified state conditions and through time 141, 142.

In the historical emulated 157 mode, the actual state estimation causal factors and exogenous conditions are sequenced through time intervals either continuously or in discrete time segments or by event triggers. To simulate the state estimation into the future 158 or over an interval of time 159 that may include operations not physically occurring as yet 163, the exogenous factors 109, 165, in example embodiments, are first simulated in a random walk and then, as the system simulator indexes through future time, value 113 for these damage factors are written to the inputs of the one or more state estimation engines 134, 171, 174, 173, 176, the state change is calculated and then accumulated 115 (shown, for example, as useful life).

Historical events 111 such as, for example maintenance work, inspections, damage and so on are also managed by the emulator-simulator and consumed into the state estimations 134. In future time 158, events may be caused to happen as a function of a schedule (e.g. annual inspection), a policy (e.g. change oil at x miles, inspect at this airport), an estimated state condition and its triggering policy 141, 142 (e.g. a life limited cycle count, an efficiency level, a prognosticated failure point and etc.).

Returning to the state estimations of the asset and its parts and subsystems 141, 142, the states may be represented as numerical values or in one embodiment as a color, for example red, yellow and green. Numeric values can be the result of engineering and data driven state estimation outputs as expressed as hours of or cycles of remaining life or hours or cycles used up to a given point in time, a physical measure such as BTU/kWHr, a given scale to characterize damage such as a Blade Damage Report, a dimensional measure, a sensor scale such as PSI or Temperature or a percent of a metric that connotes the stale of the asset, its subsystem or parts. Other indicators may be used such as colors or a change in comparative shape so as to enable the system operators to visually understand the state of the physical asset. These visual indicators are set via threshold logic such as, for example, that at 100 percent of system state, say when new, down to say 75% life remaining (or any other state indicator)—that subsystem is labeled 'green'. From 74% to 20% is labeled yellow and below 20% is red. In FIG. 1F, the managed subsystems of assets 141, 142 are represented as boxes with cross-hatching representing the state condition of each subsystem relative to a plurality of state threshold values (e.g., green, yellow, or red threshold values representing a need for maintenance of each subsystem). In example embodiments, a "red" indicator may suggest that the customer will have to bring the engine into the shop earlier than planned. In various embodiments, the graph of FIG. 1F, including the digital twins 141 and 142, may be presented in a user interface such that a customer may experiment with what-if scenarios pertaining to engine assignment, operations, and maintenance schedules, including cost and efficiency calculations.

Depending upon the measures or bounds of state estimation such as described R-Y-G in three summary states, other logic is enabled which consumes one or more of the system state estimations and triggers control actions in response. For example, a shop visit would be called if five or more of certain subsystem or parts states transitioned from a yellow state summary to a red state summary. The logical combinations of numerical values, summary states, different aspects and subcomponents of the assets may be as simple or complex as is needed for the triggering control of the system.

In example embodiments, on the vertical, there is some rate of work 110 (e.g., power output) that we're asking the engine to produce. Along the horizontal is time. The dotted lines represent the possible life plans for the engine. The digital twins 141 and 142 represent the application of cumulative damage models to determine the states of different parts or subsystems within the engine at different points in time. The connotation is that if a customer doesn't stress the engine, the customer is on the lower curve (e.g., the customer is not consuming the available life over time that the customer had planned). If the customer stresses the engine (e.g., overfires it or runs it in a harsh environment more often), the customer is consuming more life than planned at one or more points in time. At some point, the customer is going to hit a reliability (e.g., that the customer or provider can predetermine based on thresholds) at which the customer will want to bring the engine into the service provider shop for service. Alternatively, the system adjusts duty patterns or maintenance events or wort scope to achieve an objective other than maximum life.

In example embodiments, a simulation incorporating the digital twins 141 and 142 wraps the cumulative data models to orchestrate where the engines are being flown, how the engines are being flown, how they're coupled to a particular aircraft, the weather conditions in which the engines are to be flown, aspects of how the engines are being controlled, and so on. The information is fed into the cumulative damage models for each subsystem, which drives the changing in state over time of the estimated state of the subsystems within each digital twin.

Time may be an important element in some embodiments. The physical state estimations are made, for example by one or more cumulative damage models 134, through time, as a function of how the assets were utilized 157, and how they will be used in the future as the system is simulated forward 158 or any combination of past and future 159. The individual parts and subsystems may be tracked individually, such as by part serial number or a subsystem clustering of parts or the asset in its entirety. The asset in its entirety may be characterized by logic which consumes as an input the individual state estimations of the tracked parts and subsystems. These states are dynamic through time as a function of the operating choices made in actual operations and by those choices which are automatically made by the logic of the disclosed control system such as, for example scheduling the asset to a location 103 and subjecting it to local ambient conditions, necessary power output and so on, assigning events to occur 114 such as maintenance, assigning rates of change of power output through time such as for various duty cycles 123 and assigning assets to other assets 124. These states may trigger responses for the asset in its totality, such as a schedule 103 or for a 127 subsystem 122 or part 128. These states may trigger responses directly or be biased or controlled by the physical-business system multi-stakeholder, multi-criteria, multi-preferences optimizer 154. Airlines or customers may have operating policies 101, such as taxiing out on the runway using one engine to save fuel, using a certain percentage of engine thrust at takeoff d-rate (e.g., running an engine at 90% is a 10% d-rate) at takeoff climb, cruise, or other action, routing between departure and destination points, and so on. In example embodiments, the modeling and simulation methods described herein may allow an operator to optimize such operating policies.

Events are controlled to happen in future time according to triggering rules/policies that are orchestrated by the simulator and its optimization logic 154 in response to the simulated state of physical system and its subcomponents for more than one asset and in the context of other assets, for example the two aircraft engines on a single plane or a fleet of aircraft engines on multiple planes with respect to the one or more objectives of the system. Assignments 123 to routes may be controlled to happen in future time according to routines for scheduling that are called. Assets may be assigned 124 to higher level systems such as an engine(s) to a given aircraft. Asset internal operation, control settings and subsystem assignments may be controlled 127 by the simulator and its system optimizer 154. Candidate operating points and physical design may be orchestrated by the simulation in a design of experiments or full enumeration mode so as to calculate comparative performance between candidate design, operations or control policy.

The physical and business system is emulated, simulated and optimized in this measurement and control system. For example, a service contract's terms, price, risk may be tested 199 and optimized 154. Similarly, other operational aspects such as the number of operating spares, inventory stocking, operating cost or cash flow is enabled. A given system 121, 119, 118 or subsystem 122, 128 may be optimized 154 for a set of preferences 155 over one or more objectives 153. The simulation also allocates risk, returns and calculates balances by stakeholders 199 related to the operations of assets and their subsystems.

FIG. 1C depicts two of many possible stakeholders: customer or airline 190 and service provider 191. Each stakeholder has its own objectives 153. The objectives may be shared, independent or compete against one another. For example, service provider 191 wants to maximize its service revenue, whereas customer 190 wants to minimize the service provider's revenues. Given these independent objectives, the system probabilistically calculates at higher-level system optimizations that may benefit both stakeholders. Each stakeholder may assign its own conditions or weight to each objective 153. Thus, for example, Objective 1 may have conditions or weightings assigned by customer 190 as well as different conditions or weightings assigned by provider 191. Customer costs 151 and service provider costs 152 are identified and provided as inputs into the optimizer 154. For example, the service provider 191 may acknowledge that a particular customer 190, such as an airline, makes its money flying passengers and thus is focused, on keeping operating costs, including fuel costs, low. Thus, for example, weightings assigned to operating costs by customer 190 may be higher than ratings assigned to other costs by the customer. The customer 190 may acknowledge that service provider 191 makes it money by providing hardware (e.g., engines) and services (e.g., maintenance of engines).

The optimizer 154 looks for an economic operating point at which both stakeholders 190 and 191 can benefit. In example embodiments, the system uses simulations to analyze risk and return preferences 149 and generate a comparison of net present value against variance of the cash flows creating the net present value on an absolute basis or with respect to a plan. Multiple inputs of the system are orchestrated into the simulation and calculations, for example, the customers flight schedule 102, exogenous factors 104, physical part data 134, and so on. Thus, for example, the system is configured to determine that, for a chosen set of aircraft, with specific engines, and flown these specific engines with particular loading of the aircraft, running at specific work rates for changes in rates per unit time), at specific locations, running at specific temperatures in particular weather conditions, how the each specific engine will degrade over time, or burn more fuel, or become more unreliable is calculated. The service provider can thus use the simulation calculations to assist the customer in using the customer's assets more optimally or take on and manage operational risk directly. The system may recommend an intervention in scheduling. For example, assume a customer has an engine that is less efficient (on average) in a fleet of engines, each having different remaining useful lifes. Such engines may each have multiple (e.g., 33) subsystems, each of which requires maintenance and may potentially cause an aircraft to be removed from service. Both the service provider and the customer may have an economic interest in keeping the least efficient engines (e.g., those that burn more fuel) on particular routes that are best suited for the engines. The routes that are best suited may be those that wear the engines in a particular way such that their fuel burn is minimized and their need for service is more predictable and can be preplanned or coordinated with the service provider's maintenance shops to minimize maintenance costs for both the service provider and the customer. Based on simulations, the service provider may better predict when an engine is coming for maintenance, and what kind of maintenance will need to be performed (e.g., including whether to a part will need to be replaced with a new or serviceable used part) or cause said visits to occur and define the work scope. Thus, based on the simulations, the service provider's shops may have more advance notice of maintenance needs of each of the specific assets of its customers, allowing it to streamline its capacity use or inventory, such as inventory of expensive (e.g., multi-million dollar) parts (e.g., engine repair kits).

For example, the optimizer 154 may identify that a 757 (e.g., with a particular tail number) having two particular engines is currently assigned to repeatedly fly a short (e.g., one-hour flight) back and forth between two points. The optimizer 154 may identify particular costs (e.g., costs associated with maintenance requirements of a particular wear pattern in the engines, fuel burn, and so on) based on simulations of all of the subsystems of the engines. Based on the identification of the costs and an analysis of the flight schedules of a fleet of aircraft of the customer, the optimizer 154 may identify that a better use for the 757 would be to have it fly across an intercontinental route (e.g., from New York to London), then short cycle the flight for 15 hops, and then fly it back across the intercontinental route. The system may then recommend the better use (e.g., via a user interface), including reasons for the recommendation (e.g., in the context of weighted objectives of either tire airline, the service provider, or both). For example, projected savings of customer costs 151 (e.g., amount of fuel saved, an increased percentage of asset utilization, a savings in maintenance costs, and so on) may be presented in support of the recommendation. Similarly, a projected savings of provider costs (e.g., in streamlined inventory processes, such as minimizing an amount of expensive inventory items that must be kept in stock, or minimizing a number of maintenance visits that are required under a contractual agreement, and so on). Additionally, by coordinating airline schedules across multiple customers, the provider costs associated with airline maintenance may be coordinated and optimized at a particular shop, such that, for example, parts having longer useful lifes in one aircraft engine are swapped with parts in another aircraft engine such that the useful fifes of both engines are maximized.

In example embodiments, a service shop may be mixing and matching engine parts, repairing parts, and installing new parts. The service provider may have a limited amount of time (e.g., 60 days) to perform maintenance or repairs on an aircraft engine when it arrives in the shop (e.g., based on contractual agreements between the service provider and customer and/or to achieve a certain number of engine spares), if a proper inventory of serviceable used or repaired parts is not available for swapping into an engine (e.g., to service a subsystem of the engine), the service provider may need to use a new part. The cost difference between using a used and new part may be significant. Thus, the service provider may have a strongly weighted objective of having appropriate used or repaired parts available in inventory when an engine arrives in a shop. Suppose a service provider has five years remaining under a contractual agreement to service a customer's engine. The service provider would incur significant unnecessary costs if it had to use a new part with a useful of 20 years to perform its maintenance duties on such on engine. An appropriate part to use in this case would be a part having a remaining useful life that, corresponds with the remaining useful life of the engine as a whole.

Thus, in example embodiments, the optimizer may identify various factors that affect service provider cost 152 with respect to its contractual obligations to a particular customer or a group of customers. Such factors may include flight schedules, asset utilization, inventory, and so on, as depicted in FIGS. 1A-1G. The optimizer can thus provide guidance for getting the right material into the right asset at the right time as a function of the service that the provider is obligated to provide to the customer or group of customers.

Operating scenarios calculated by the disclosed computing system change performance from changes in design and/or control points in the business-physical system—which in turn generate more cashflow when the computing control is beneficially configured and operated to do so. The graph depicted pertaining to risk and return preferences 149 shows that such optimizations enable the reduction of risk for each level of operating performance improvement (shifting the "New" range to the left in comparison to the "As Is" range) and/or increasing NPV (shifting the "New" range up in comparison to the "As Is" range) for each unit of risk. Such a graph may be presented in a user interface to demonstrate the result of the analyzing of all of the factors depicted in FIGS. 1A-1G, including simulations of engines through possible flight paths using CDMs. Thus, the optimizer can demonstrate with a certain probability the economic benefit to the customer and/or the service provider of implementing the suggested changes of the optimizer. Thus, for example, the "New" range may be realized by a customer adjusting flight paths or asset utilization according to the recommendations of the optimizer, which may, in turn, improve maintenance scheduling so as to have a lower impact on flight scheduling. As another example, the service provider may realize the "New" range by being able to minimize an amount of expensive inventory that must be kept in various shops and by having more control over the load levels at particular shops based on better improved forecasting of upcoming maintenance tasks. In various embodiments, the pareto frontier represents, for every risk level (or variance), the best economic choice that can be made given particular inputs. The "As Is" frontier relies on data inputs, such as customer proprietary data points, that are less complete that the data inputs relied upon for the "New" frontier, which includes simulations using CDMs. Points B and C in the graph shown in FIG. 1C are depicted as not currently being on a pareto frontier, and are thus suboptimal.

In at least some embodiments, these and other aspects of the asset may be managed concurrently, such as commercial operations, lineups, maintenance, service work scopes, upgrades, and control points. An example system, described in greater detail below in conjunction with FIG. 2, may determine such managed aspects to enhance the economic value of the asset.

FIG. 1F graphically depicts the relationship between the asset, for example an aircraft engine, system rate of power output 110, time 105, and useful life 115 consumption and system reliability probability 160 for the one or more operational paths 120, 125, 140 (one that to a current time has be actually realized and other paths which are candidate scenarios that are simulated by the system) and its associated subsystems. The life paths may be for either a new unit or a repaired unit whose state is known certain at a point in time such as when new or from specific inspection or maintenance for any subsystem 175 being tracked. The physical state probabilistic estimations of one or more parts and subsystems are updated with these assessment points and activities.

At an operational segment 126, the corresponding life consumption may be extremely high, yet may be reduced by a control setting which lowers system efficiency, such as allowing more internal airflow or reduced surface temperatures and thus increased specific fuel consumption, in exchange for a reduced 131 life consumption rate for the same power output or less power output but longer duty cycle or other tradeoff. The "system-of-systems" simulation and optimization based planning and control that is disclosed utilizes cumulative life consumption, as depicted in FIGS. 1A-1G, based upon the current cumulative state of the asset, maintenance timing and scope to adjust service duty, control settings, maintenance, lineups, and commercial operations, to compare various operating scenarios and automatically select 154 the tradeoffs of operating efficiency vs life consumption vs. asset assignment for revenue duty, according to the risk and value management preferences of one or more stakeholders 131.

The operational segment 126 described may also, under other beneficial embodiments, serve as an example of how interaction between operations, maintenance, design, and various business considerations may be employed to automatically change the design parameters and operating characteristics 133 of parts and subsystems to achieve physical states through time that enables the resulting useful life segment 131 to be lower than it otherwise would have been under the same circumstances.

In the industrial system or specific asset being simulated, a scenario may be investigated that beneficially takes advantage of for example, a peak demand pricing opportunity and specifies the commercial market schedule for the associated extra load 112. The simulator may then optimally 154 dispatch 103 the Simulated asset(s) at a probability that the offer for dispatched revenue service was accepted, may simulate the asset as differentially consuming life according to the load or duty 103, may set the remaining useful life point 166 as a function of reliability and/or repair work scope to the subsystems of the asset, and may trade off the costs and scope of a changed configuration, maintenance scope and fuel purchase according to one or more stakeholder 131 risk and return preferences in the instant or through one or more intervals of time. The system may also execute a different set of scenario runs using, for example, a catalog of available design modifications, updates, and operational decision policy changes. Consequently, the scenarios which install a certain control system upgrade which allowed the useful life segment 131 to be reduced, even though subsequently causing more feel to be consumed, may provide a higher return on investment over the simulated economic lifecycle than other alternatives. Thus, the simulation/optimization system described herein may identify a design modification to the industrial system that would achieve optimum or at least enhanced economic risk and/or return preferences and/or other metrics of value.

In example embodiments, similar to the identification of a valuable upgrade 133 to a subsystem of the industrial system, as provided above, the simulation/optimization system may also adjust repair work scope 135 and/or the policy terms 199 for all assets in general or a specific asset-by-asset trigger for the maintenance timing along with operations alternatives 123. A possible base-case scenario 120 is that the asset employs the first operational path 120 to arrive at a specified maintenance event scheduled for time 108 with remaining useful life (RUL) 172, which represents a chosen reliability probability (e.g., probability of remaining useful life 160). The simulator/optimizer may track the subsystems 175 to develop or determine the overall useful life 115 and reliability of the asset. The simulator/optimizer may then determine that moving the outage point from time 108 to time 150 by consuming the life of the asset using the second operational path 125 is more beneficial from the perspective of economic value (or some other metric of value) compared to the base-case scenario of the first operational path 120. As in all tradeoffs being described as examples of the system, the risk and return preferences 149 of one or more stakeholders 131 are automatically optimized 154.

Similarly, the service support may consist of one or more repair shops and within those shops are operations (such as assigning assets to available capacity, setting work scope, ordering parts), tooling, people and sequencing a plurality of demand streams, such as, for example, the services activities for multiple airlines or the extent of specified maintenance in a given service event. The shop capacity 136 is modeled 137 with respect to its operations 139 capacity over time 159. Left uncontrolled by the disclosed system, the shop demand (quantity of assets and extent of work scopes) may be highly variable and thus prone to periods of underutilization and over subscription. Underutilization squanders variable expense. Too much demand, creates overtime and service level delays in operations which are governed by performance based services contracts, there are typically clauses that govern turnaround time or service level or asset utilization or availability and thus it is highly beneficial to control the demand function, service TAT, Service Level Agreement guarantees (SLA) and shop cost. The disclosed system simulates the use of assets to estimate the asset life of efficiency and enables asset sequencing to be optimally set to maximize the benefit of asset use and control the sequence of the shop demand 150 as a function of operations and time and orchestrates shop operations model 137 such as, for example, a discrete event simulation and scheduler 139 so that some or all assets can be assigned 135 by the optimization 154 in such a way as to co-optimize the end user's costs 151 and service providers cost 152 or other stake holder 131 or objective's preference 155. An example objective is to lower total customer and service provider cost. A stakeholder 131 may be an airline 151, a service provider 152 or an investor with a financial stake in an aspect of the system.

Repair inventory 145 on hand to maintain industrial assets consumes capital when stocked. As the shop demand 135 is controlled, parts ordering 138 is optimized over the forecast interval 159 to minimize inventory count and carrying value.

Which parts are used for repairs is also beneficially controlled by the disclosed. As an example, if it is known that an asset will have an assigned duty cycle 103, 112 whose operations will control a given life consumption 173, 176 according to a controlled assignment 114, 123, 127 over an interval of time 105, for example a contracted time period, then the ordered 138 parts 147 may be differentiated by their cost and life estimation so as to lower the service producers cost 152 without exceeding their or other stakeholder preferences 131, 151 and objectives 155 with respect to risk and return 149.

The assigned 135 shop 148 is optimally controlled 154 with respect to available machine capacity 139 or skill or used or new inventory or consumables 145 at the one or more repair facilities in the repair value chain.

In example embodiments, presuming the maintenance timing is fixed at time 108, as is the RUL 172, for a specified reliability probability 160 for the set of subsystems 175, the simulator/optimizer calculates possible operations and/or control of the asset to seek superior risk/return or other metrics of value for one or more stakeholders 131, 151, 152 and may be set to cease calculation when global objectives are met and input assumptions are not changing. Accordingly, asset operation segments (indicated by reference numbers 127, 131, 130, 126, and 132) along second operational path 125 may be bid, dispatched, and/or controlled so that the asset may arrive at time 108 at a specified reliability probability 160 (e.g., the probability of a physical impairment or failure of the asset or subsystem) and/or efficiency while providing an optimized return on investment for a given stakeholder. Further, that if it is infeasible to meet operations 125, outage timing 150, 180 or repair or uprate work scope that impacts useful life on a component 175, at a reliability 160, that also results in a set of cash flows or other metrics of value as defined by a stakeholder of the industrial system, that is acceptable, then the available choices (operations, timing, repair scope, reliability, efficiency, design, lineups) are sequentially relaxed parametrically and/or concurrently in order to calculate the opportunity cost of that choice element, which is treated as a system constraint(s) which the decision maker may decide to relax or the financial optimizer may choose to relax.

In example embodiments, the design of the physical system may be changed 133 such as with an available modification and the optimization routine re-run through 127, 120, 130, 126, 132, 125, 108, 160, 150, 125. A stakeholder 131 may be a service provider 132 with a contract that specifies a performance level for another stakeholder such as an operator 151 and the provider requires an upgrade or repair to be made which needs an expenditure to be made now 161 so as to achieve a risk and return through a time interval 159 of point in future time 163. The requisite investment is made now at 161 by a stakeholder that specifies a certain return and risk level at one or more points of time 105. The system 100 incorporates that investor's preferences in the optimization objective function 154 such that by operations optimization choices 103, 114, 123, 124, 127, 199, 183, 135, 138 the cash Hows from operations, subject to the performance contract terms, are more assured (lower risk) return are provide via the deliberately controlled attainment of physical and operational states through time for one or more assets.

In example embodiments, even the current state of the asset (e.g., at T Now 161) may not be known with absolute certainty. For example, the last physical inspection of an asset or part or subsystem of the asset may already be in the past. Thus, there may be multiple layers or dimensions of stochasticity. For example, a first layer may be a distribution around the real condition of the engine at T Now 161, a second one may be a prediction of the events to which the engine is actually subjected to in the future. Thus, the length tail of the T Now distribution may affect when a customer should schedule an inspection of the asset (e.g., to decrease the level of uncertainty regarding the asset's current state to improve forecasts to be within an acceptable threshold or margin of error for a particular time period). The simulations may thus not only aid customers and providers in determine how to optimize operation of the asset, but also inspections (e.g., horoscope inspections) of the asset. In example embodiments, images are taken of various parts of the engine, such as the blades. The images are captured and scored against certain engineering criteria and compared with CDMs simulations (e.g., to refine the CDMs). The scores may represent the significance of detected surface cracking, root cracking, spallation, dirt, pits, and so on). Thus, upon physical inspection, the simulation data may be confirmed with a certain percentage of accuracy and the CDMs may be updated, to account for any differences in actual state versus predicted state at the time of the inspection.

A causal driver of shop repair delays may be the availability of certain inventory. The pre-order planning 196 control receives component 122, 128 state information 142, 146 for specific engines 121 and provides the quantity of components in various stages of remaining useful life, through time 105 to the service shop 136 supply chain 197 for their production 198 estimation purposes with respect to time to produce finished goods which can be made available to the service shop 136 inventory replenishment 145 by part type 147.

The pre-order planning 196 may contain the supply chain production model 198 that in turn may optionally contain current production quantities such as through an MES or ERP system. Said model of the supplier production process may be unable to provide finished goods inventory 197 to replenish service shop inventory 145 for a forecasted demand 135. The airline operations may be biased 123 such that certain engines which would otherwise require shop services be operated via assignment 123 or control set point 195 to lower the rate of life consumption and thus delay the service event 132 time 150 to match the part availability Additionally, the extent of repairs to an asset may be dynamically set to match the available service capacity and/or to produce more spare assets but at a reduced. RUL than an original or average plan or more RUL than an original plan.

Generally, as described above, the simulator/optimizer may alter the operating risk compared amongst operational paths 120, 125, 140 to achieve the economics or other aspects of risk and value at one time or over an interval Path 140 is an example of a higher physical damage risk than 120 at time 150, yet may result in lower cost risk 154 vs. 156 when more aggressive bid, dispatch, and operations, despite the added risk of arriving at outage schedule at a higher risk point 166, are differentially compensated for over the economic time interval being simulated and optimized.

In example embodiments, the simulator/optimizer may manage interactions between the useful life 115, reliability probability 160, subsystems 175, and repair work scope of the asset. For example, the simulator/optimizer may estimate system level reliability probability 160 at a point in time 105 by looking up the value of the reliability probability 160 at that, point in time 105 along the useful life consumption path 140. The reliability probability 160 may be derived or simulated from engineering models and observation of fielded units, and corrected for climates, load cycles, transient dynamics, repair cycles, subcomponent vendor sources, metal temperatures, and other indicators and drivers that characterize the RUL 172. In various examples, the simulator/optimizer may retrieve the cumulative state information (e.g., operational paths 120 and 125, and useful life consumption path 140) from either a control system of the asset, an asset data store, or a remote data store of the operational history of the asset.

Further, as depicted in FIGS. 1A-1G, the reliability probability 160 of the entire asset or system may be based on the RUL 172 of each of the subsystems 175 of the asset, and may be developed by one or more methods, such as, for example, cumulative damage models comprised of thermodynamic and materials engineering models, statistical regression, machine learning or subsystem models that are probabilistic and aggregated with techniques, such as Monte Carlo simulation. Variation in RUL 172 forecasts may result from many factors, operations hours being one such causal variable as depicted in graph 100. In like framework, the simulator/optimizer may track other causal factors, such as component shutdowns, trips and starts, air cleanliness with respect to particles and chemical concentration, and metal temperature, from direct measure and/or virtual sensing of these factors as the asset is operated. Additional factors indicative of RUL 172, such as repair records, original equipment manufacturer (OEM) manufacturing and inspection data, or OEM or supplier lot, may be operationally tracked and employed in the simulation or its post processing.

Each major subsystem 175 that is important to the overall asset or system reliability or efficiency probability 160 may be monitored and tracked RUL 172, expressed as a probability 177 of two subsystems 173 and 176, is depicted in graph 100. As illustrated therein, for all RUL 172 estimates, the subsystem 176 is less reliable that subsystem 173, and thus the subsystem 176 is most likely to be the limiting component in the probability of life (reliability probability 160) for the overall asset.

Figure 2:
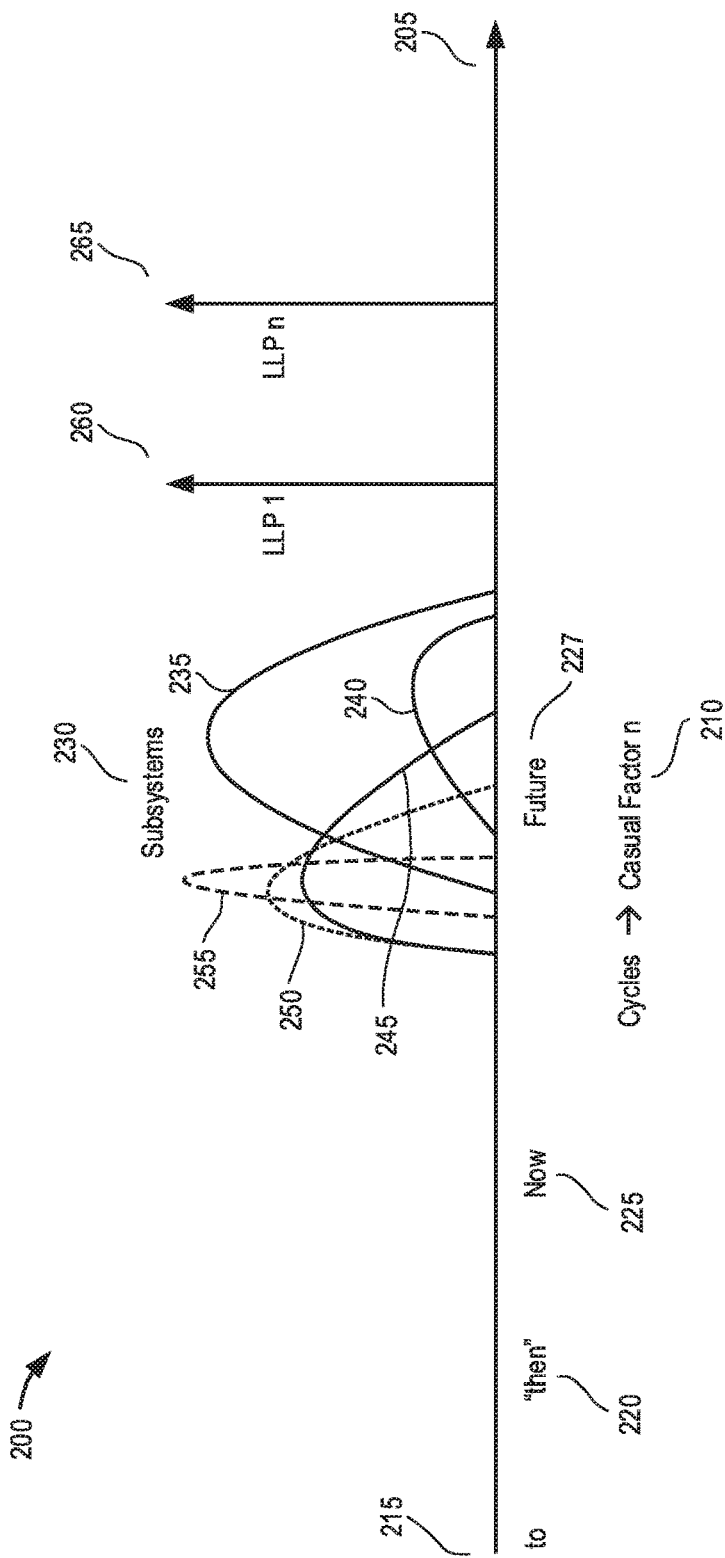
FIG. 2 is a framework diagram of life assumptions as they relate to risk transfer and component state in one or multiple time horizons used to transfer risk between an asset operator and service provider.

The simulation based state control system 100 is centered on the physical asset as the asset is dispatched and serviced throughout its economic life 106, 108. The physical asset is comprised of subsystems and parts which accumulate wear, as depicted in FIG. 2, and thus experience service costs as a byproduct of their degraded physical stale from having been operated 120, 125 or 140. The physical degradation is a function of the operation of the asset and the factors it was exposed to during those operations, for example temperatures, pressures, humidity, suspended aerosols in the ambient air, percent of foil load, temperature of metal surfaces, chemistries in ambient air, repair history, inspection results, cycles and rates of change of work output by the asset and other causal factors 113. The simulation hosts 134 one or more damage models for one or more subsystems 122 and parts 128 in the physical asset 121. The source of these hosted damage models can be from any method which relates the conditions of and how the asset is operated with the resultant impact to the physical state change of the asset and/or repair to the asset. As an example, a component "Fan Disk" 168, when exposed to Ambient Temperature, Fuel Heating Value and a number of other factors 'n' for a period of time and cycles does lose, for example, available material dimensionality and material strength. These degradations may be explained with engineering models, data driven models that use historical observations to train over, accelerated life testing, designs of experiments and regressions of the resultant data, rules, arithmetic relationships or other analytical means as may exist or be conceived. The only requirement is that the system simulator is able to host the algorithm or lookup table or rules which describe degradation and can pass the assumption data to them for an interval of time such as the simulation clock increment and that those assumption data exist in the historical record and can be emulated 157 to replay a part or asset system's operating life experience and that the future 158 simulation is able to calculate and then pass the life model(s) 134 assumptions. For industrial systems, such as, for example, aircraft engines, power turbines, reciprocating engines and common industrial assets—these hie consuming causes are well known and the exogenous elements 165, 109, 113 (temperature, humidity, and so on) are able to be simulated along with the specific operating scenarios such as flight schedules 102, plant dispatch 116, loads, torque, maintenance scope, topologies, duty cycles and other aspects of their operations. The state of components within the asset 141, 142 are thus updated through emulated or simulated time as exposure and duty occurs. The state of subcomponents 168 and the resultant reliability 173, 176 are determined by one or more hosted model 176. Failure or degradation state change is calculated by one or more models describing one or more failure modes 174. The means to aggregate wear or failure or performance models may, for example, be from logical rules, joint Monte-Carlo simulation or a use of a rate of change that is most severe over a time interval or weighted average or draw from a stratified life characterization such as a Weibull distribution or any other means as may be available in the art to correlate exposure to degradation 171, 168.

The threshold of reliability risk from point 164 (e.g., no risk or below threshold risk) to point 167 (e.g., near-certain impairment) is a parameter employed in the simulator/optimizer. In the illustrative example of FIGS. 1A-1G, the simulator/optimizer may determine a set point (e.g., particular outage level 162) as the impairment risk limit and thus may request unit repair at approximately time 150 when the remaining useful life value 148 occurring along useful life segment 146 is attained. This set point (e.g., particular outage level 162) may have been another point 166 along the reliability probability 160 if the economics or other metrics of value warranted operations with that risk level for the greater overall asset-level performance.

A comparison 156 over a forecast interval of physical state or operating performance resulting from differential usage, service, and design or operating policy is compared over a time interval 159 and an economic difference between the two scenarios is calculated. For a service provider 152, such as an OEM of the industrial system, the present value or net present value or real option value of a design and/or operating policy effect on the resulting Free Cash Flows FCF of the industrial system and the governing contract between a customer and service provider will most likely be different depending upon the scenario of design and operations in a similar way, the resulting FCF of a user 151 of the assets such as an airline or power generation or rail locomotion customer do change depending upon the change in the system's efficiency, reliability, and service outage time, workscope flexibility to be dispatched or scheduled or used in any other way. The PCF is probabilistic and is calculated by the simulation system for a scenario (design and operations) and then replicated to account for exogenous condition variability 165, 109, 113. Changes in FCF and investments are netted to Present Values PV to calculate NPV using one or a number of discount rates. Variances of the absolute value of cash flows or differences of cash flows to business plans or absolute values are also tabulated for scenarios and replications. NPV and variances 149 are related and different stakeholders in the industrial system's performance have different preferences for the relationship between risk (variance) and return (IRR, NPV, PV, or real option value). Multiple objectives 155 may be present and solved for 154 by the simulation-optimization based control system being disclosed. The control tradeoffs to achieve a physical state at a point in time is achieved by jointly changing the operating decisions related to scheduling the duty pattern or schedule of assets 103, managing intervention events such as maintenance and inspections 114, assigning higher level assets to a duty 123 such as an aircraft to a schedule, assigning assets to higher level assets such as engines to an aircraft 124. Triggering control set points and maintenance 127 of a system and its subcomponent parts and subsystems, changing the design or configuration 133 of industrial systems, assigning services 135, ordering service inventory 138 arrivals, setting or modifying the commercial contract terms or price for services 199.

Moreover, the simulator/optimizer may beneficially estimate the value of a subsystem upgrade and/or repair by simulating the asset under conditions with life-limiting components, such as subsystem 176 of FIGS. 1A-1G, with alternate available RUL 172 probabilities 177. Should the cost of upgrade or repair work scope of the subsystem 176 be adequately compensated by the economic gain produced at the asset level, the simulator/optimizer may provide a recommendation for the upgrade or specified repair work scope. Further, the simulator/optimizer may assess any number of candidate work scopes with or without replications in providing such a recommendation.

As an example, consider the cumulative work 110 corresponding to an output through time of an aircraft engine, such as thrust. The plan 120 rate of work and cumulative work for operating an engine at an amount of thrust over time, subject to the average planned severity of an average flight where the engine will be flown, and within specified operating policies, there is a probability of failure 160. For example, if the asset is on planned line 120 at time 107, there is no probability of engine disruption based on useful life degradation (i.e., at time 107, the dashed line doesn't overlap with (the graph of) a probability of failure 164). However, when the asset is on 120 at time 150, there is a probability of failure, which rises as time progresses and the asset is utilized such that the operating plan 120 to time 108 to intersection point 148, where the probability of failure is represented at point 162.

On average, an engine might be exposed to factors that differentially consume life such as a certain set of dirty air, relative humidity, or temperature, but, in the specific (e.g., out of a fleet of 100 aircraft), specific engines may be running through more harsh environments or operated at a full power takeoff, full power climb, etc. Thus, for example, a specific engine may be off of the planned line 120 and on the specific life path 140. At specific life path 143, new instructions have been provided by the computing control system and implemented for operations of the engine based on recommendations of the optimizer. For example, the aircraft has been moved from a short hop biased route structure to a transocean route bias, is flying with less takeoff power, is flying through less harsh environments, is using runways more efficiently. At 150, the engine is scheduled to come in for service, however, after time 163, the engine is below the planned line 120. Thus, at 144, the operating instructions may be changed again for the engine, and it is deployed in conditions in which its useful life is degraded more quickly Thus, based on the simulation based control system, it is purposely operated such that its probability of failure may reach point 162 by time 150.

Another specific engine path 130 shows that an engine has been operating well below is planned line 120. Given this data, at particular points in time, the system may recommend the swapping of the engine on specific life paths 140, 143, 144, 146, with the engine on specific life paths 130, 125, 126, 131, 132. Thus, both engines may be utilized more optimally with respect to their useful lifes and maintenance schedules. The determinations of engine swaps may be made by the system such that the average specific life paths of engines across a fleet of aircraft come closer to planned line 120. For example, given the maintenance plan for the engine on specific life path 130, decision may be made at 125, 126, 131, 132 by the customer to increase utilization of the engine (and thus increase availability of the fleet) such that the useful life of the engine comes closer to planned line 120, particularly with respect to specific pre-planned maintenance points.

The probabilistic distributions 173, 176, 168 (In the example form of Weibull distributions) represent the probability of failure of one or more subsystems or components 175 within an engine, such as a combustion subsystem. Each subsystem may be represented by multiple (e.g., hundreds) of parts. And each subsystem may have its own probabilistic failure distribution (e.g., based on simulations and CDMs) The failure distributions for each subsystem are aggregated and rolled up into distribution 160. Monitoring failure modes 171, 174 of various subsystems may allow incorporation of replacement or new parts into a subsystems so as to change the shape of the component failure distribution 133, which, in turn, changes the shape of the engine failure distribution 160. Thus, through coordination of shop visits for multiple engines across fleets of engines for customers or groups of customers, part swapping within subsystems may allow optimization of the maintenance of the whole engine system (e.g., with respect to obligations of the service provider undo; a service contract).

A business system or contract portfolio of a service provider 191 and other stakeholders such as investors 131 who are investing through the service provider 191 are beneficially improved with the disclosed computing control system with respect to the management of the physical system's impact to risk to return ratio at the enterprise level with a diversity of service contract terms 160, such as for example, contractual agreements for parts, parts and services, services alone, or certain performance outcomes of the customer 190. Should there be model risk or operations risk or exogenous factors that reduce performance outcomes, such as for example high fuel prices or a recession, a number of less correlated contracts will typically limit the maximum financial loss. In an example embodiment, the target ratio of parts maintenance service agreement (MSA) to contractual services agreement (CSA) is dynamically optimized 193.

The hypothetical operating margin 192 per contract for a CSA decreases as more service costs are realized, given the example term and condition which provides for required parts and repair services to keep aircraft engines 121, for example, available and efficient. The example contract may have its revenue set as a function of operating hours or cycles, independent of the totality of factors which degrade life faster 126 than planed life 120. The hypothetical operating margin for a MSA increases as services are required given its exemplary terms and conditions which provide for parts and services on an 'as needed' basis, costing terms agreed to a priori, such as, for example a discount to list price. The cumulative portfolio risk, for example, the variance in operating margin change with shop visit rate is compared to the expected operating margin of a given portfolio 194. The cumulative portfolio risk is comparatively high with one hundred percent CSA terms given their exemplary condition that ties revenue to asset usage but with more productive services, the shop rate (cost) may comparatively decrease—which is an objective of the presently disclosed system. A 100% MSA portfolio will not expose the service provider 191 to margin risk given that the parts and services provided under the example terms simply transact as needed and the provider 191 makes an incremental operating margin on each transaction. At CSA/MSA ratios between 0 and 1, the ratios of risk and margin change. A provider may desire a certain ratio of this risk and return, and the disclosed system enables the scheduling and assignment of physical states through time to achieve that ratio as an objective 153 in the system optimization 154. In concert or separately, the ratio of CSA/MSA may be set independently of the lifecycle economic optimizer 154 by the CSA/MSA optimizer 193. In bus latter embodiment, the CSA/MSA targeted ratio 106 informs the shaping of service contracts 160. Thus, with a certain ratio of contracts optimized 193 that establish the revenues, the system controller via its optimizer 154, reduces variance of cost cash flows. Diversity of contract terms between CSA and MSA enable operating margins to be supported in lower service rate scenarios and higher service rate scenarios, according to the preferences of the service provider 191 or investor 131.

In example embodiments, parts come into a service shop (e.g., a supply chain) of a service provider under CSA, MSA, or on a transactional basis (e.g., for purchase of a particular part or for a complicated repair). Running a service shop requires the provider to have (sometimes very expensive) parts on hand. For engines that are under CSA, the risk that has been transferred to the provider is the maintenance risk in example embodiments but can be any agreed upon performance aspect. In this case, the provider ideally would be able to put a used serviceable spare part into the engine instead of a new part. For engines that are under transactional basis, the provider ideally would like to be able to put a new part into the engine. For engines coming under MEA, whether a new or used part is most ideal for the provider would depend on the pre-negotiated discount for the part that is specified in the contract. The service demand is superimposed onto the service shops, and the service shops superimpose supply-chain demand over factories, including provider factories and supply-chain factories. Conversely, should service capacity or parts be limited, the workscope may be change or timing of the service event. And parts consumption with labor is used to calculate cash flow and/or cash consumption, which may be an object or constraint in the optimization that controls the asset's schedule, dispatch and assignment of loads. The modelling described herein enables the interests and operations of the various stakeholders to be cooptimized with respect to relevant factors, including customer operations (e.g., airline policies, including flight routes and traversal of airspace), service operations, supply-chain operations, and contractual operations.

Another structural target to attain which facilitates the system being able to produce the risks and returns for its stakeholders is the scheduling of spares with respect to location, quantity and type. Spares can be specific capital assets such as a rotor or an entire unit such as an engine. Spares can be owned by the service provider 191 or customer 190 or a stakeholder 131 such as a financing organization such as a bank or investor or other service provider that leases parts or entire engines. The ratio of spares, engine leases and use of specific assets from said spares or pools of assets is derived by simulating the operations of an airline and service provider to calculate the costs 151, 152 and their variances (risk) to optimally 154 inform 182 the ratios of parts and engines 183. Once attained, the use of these assets 181 is controlled by the system optimizer 154 to achieve the financial payoffs of stakeholders 131, 190, 191. In one example embodiment, the number of engine spares is controlled for by adjusting work scope and timing of a service event as a function of available service capacity.

Figure 3:
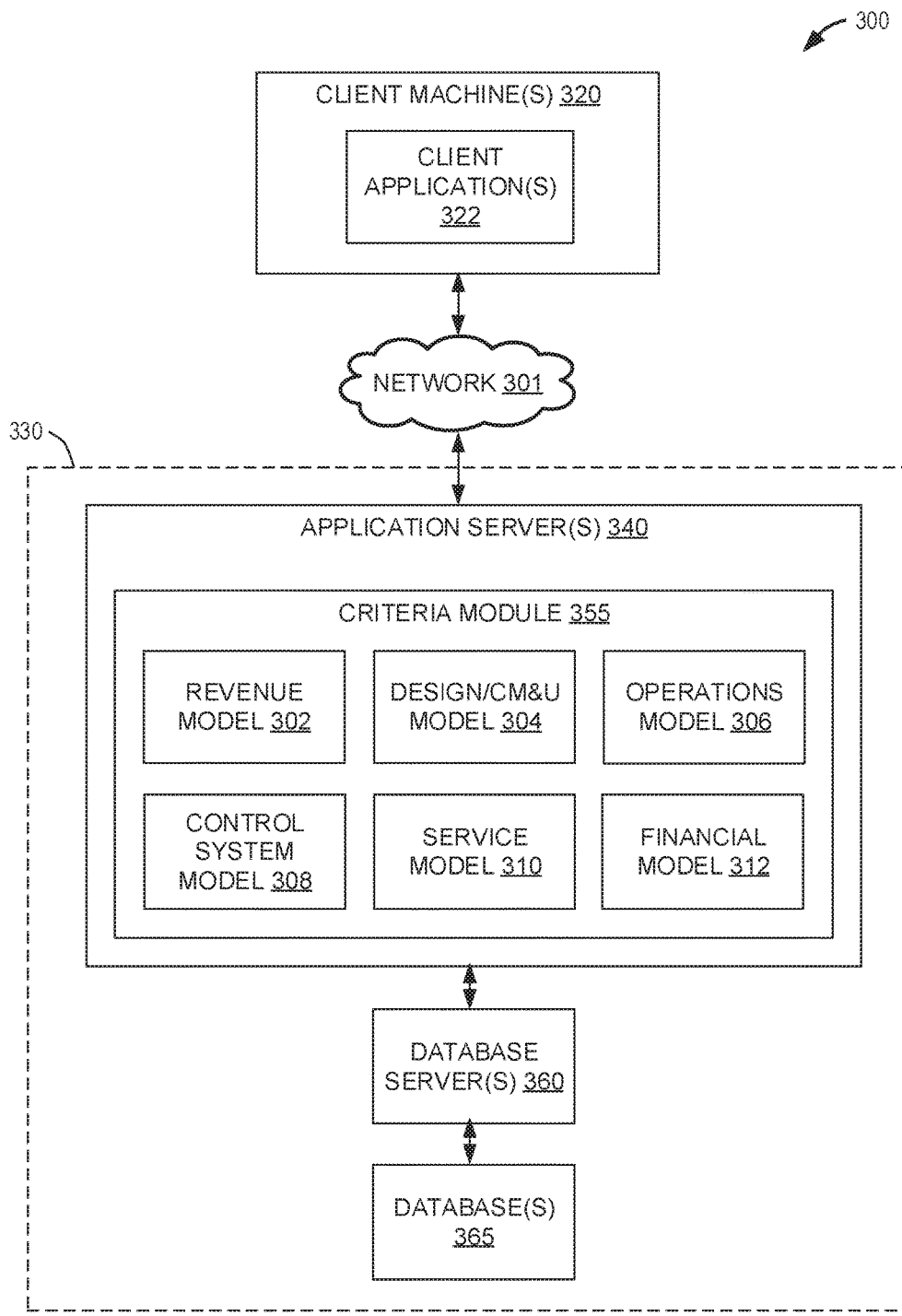
FIG. 3 is a block diagram of an example architecture for implementation of the simulator/optimizer of FIG. 2.

FIG. 3 starts from the generation of the flight schedule and aircraft-to-route assignment. The flight schedule and aircraft-to-route assignment is provided as an input. In this manner, the simulation can be used as a scenario-based "what-if" tool where different flight schedules are provided as inputs. The simulation then "files" the schedule using "flight ops policies" and "environment issues". Specifically, the flight ops policies include takeoff derate, climb derate and single engine taxi policy per city-pair route. In order to introduce stochasticity in the model, each of these inputs is provided a probability distribution such as a mean and a standard deviation in a normal distribution which is sampled from during the simulation. Therefore, although a specific city-pair route might have a takeoff derate policy of 10%, the simulation will sample from a distribution to allow the derate to vary, representing pilot's making operational decisions that might vary from the policy. Similarly, the environment module defines the winds-aloft, ambient temperature at departure city and PM10 (or coarse aerosols) at departure city. Randomness is introduced by defining a mean and a distribution which is sampled from during the simulation. The flight schedule is then "flown", with variation induced by the statistical sampling. A key simplifying assumption is that the flights are assumed to occur as listed in the flight schedule inputs, with no operational deviations (such as delays, recovery from unplanned events, etc).

The Mixed Mode Aggregator (MMA) module applies damage to the engine components using the different damage model paradigms, including weibulls, CDMS, cycles, and custom damage analytics. The MMA competes these different component damage models in a consistent framework to understand which component will drive a shop visit (and when). The component damage (which will ultimately drive a shop visit) also contributes to overall engine performance degradation which is captured via the "Engine Performance Degradation Index" (EPDI) which is a degradation factor applied to the fuel-burn calculation.

The Operational Decision module then performs the logic that represents the decisions that either service provider or the airline customer could make depending on the states of the aircraft or engine as calculated from the MMA and fuel-burn's modules. These decisions are limited to engine maintenance, and specifically four actions as shown in the diagram. The first is to do nothing and simply fly the next flight, the second is to perform on-wing maintenance (such as waterwash), the third is to perform an inspection, and the fourth is to perform an engine removal. Also is that one of the operational decisions could be to modify the flight schedule and aircraft-to-route assignments.

In the first case, the next flight is simply flown without any actions, for the second, the on-wing maintenance is performed (and appropriate positive adjustments are made to engine damage state or performance) and then the next flight is flown. For the third, the inspection is performed which results in additional information that results in a subsequent operational decision. Finally, in the last case, the engine is removed for a shop visit, with the workscope, turn-around-time, and costs being identified, before being returned to the spares pool. The aircraft is immediately assigned another engine from the spares or lease pools and proceeds to its next flight. The simulation is completed when all the flights in the flight schedule have been processed.

In example embodiments, a simulation framework includes some input 'knobs' (e.g., assumptions, scenarios) that are controlled by the provider (e.g., shop workscope), others by the customers (e.g., derate, single-engine taxi policy), others by both (e.g., removals and on-wing maintenance), and others by neither (e.g., weather). The key outputs are metrics of interest to both the provider and the airline customer. For the provider, these metrics might include shop visit forecasts, workscopes, CSA operating margins, parts forecasts. For the airline, these metrics might include fuel costs, number and timing of shop visits, number of engine spares and impact of flight policies on their operating costs or airline passenger miles resulting from asset utilization. For example, a particular use may focus on shop visit forecasts, spares forecasts and lease forecasts. The simulation framework may be deliberately constructed to represent an end-to-end ecosystem, starting with an airline's flight schedule and working through to the maintenance cycle of the engines through shops and into the spares pool.

The list of input "knobs" may include, for example, knobs taken from various modules, including knobs taken from a Flight Schedule module (e.g., a Flight Leg knob), a Flight Ops Policy Module (e.g., Takeoff Derate, Climb Derate, and Single Engine Taxi knobs), an Environment module (e.g., Head Wind Speed, Ambient Temperature, Coarse Aersols knobs), an On-WingMX module (e.g., Waterwash Interval, Waterwash Threshold, Waterwash Effectiveness, and Waterwash Retention knobs), and a Workscope module (e.g., Workscope definitions knobs). In example embodiments, the Flight leg, TakeoffDerate, Climb Derate, Single Engine Taxi, Waterwash interval, and Waterwash Threshold knobs may be under operational control of the airline, whereas the Workscope Definitions knob may be under Operational Control of the provider.

The input knobs may organized into various groupings of input data. The groupings of input data may include groupings for simControl (Specifies key parameters such as Start and End dates, number of replications to run the simulation), Airports (Lists the airports and airport-specific information), Appairs (Lists information specific to airport-pairs), acweType (Lists the aircraft and engine configurations), AengineType (Lists the engine types and specific information), acInstances (Lists each aircraft in the simulation by tail number), AengineInstance (Lists each engine in the simulation by ESN, as well as initial states (installation, cycles, SV, etc)), LLPperEngine (Lists the LLP parts and initial cycle counts for each ESN), flightSched (Lists the sequential flight schedule including departure, arrival, time and aircraft tail number), acweTRouteOps (Lists route-specific parameters for each city-pair flown by each specific acweType), EngineEDPIFuelEff (Specifies the mapping between EPDI and the fuel-burn multiplier), acweEffMult (Lists the fuel-burn multipliers for single engine taxi scenarios), CalendarDateRemovals (Lists any scheduled removals known in advance (per ESN)), WeibullMode (Lists the Weibull modes (and parameters) for each engine type). SpecificLLPEngineType (Lists the LLP parts for each engine type), DamageModel(Lists the damage models (CDMs) used for each engine type), Workscope (Lists the workscopes and key parameters (TAT, cost)), WorkscopeFailureMap (Map indicating which failure modes drive which workscopes), WorkscopeResetMap (Map indicating which failure modes get reset when a specific workscope is completed), WSAParameter (Specifies the WSA-specific parameters needed to run WS), WSASimulatorDriverMap (Map indicating how the simulation-native failure modes map into the WSA failure modes), WSA WorkscopeFailureMap (Map indicating which WSA failure modes drive which WSA workscopes).

Some of the challenges in running the simulation may include gathering, cleaning and formatting the input data. Some data may be obtained from a forensics database maintained by the provider. Other data may be obtained from separate data sources accessible by the provider. Such data sources may provide data pertaining to fleet Weibulls, list of aircraft (e.g., by ESN in contract), current ESN-aircraft assignments, current ESN cycles since shop visit, engine configuration (e.g., to select appropriate Weibull by ESN), historical flight routes by aircraft, severity formulas (e.g., derate, temperature, other severity data to modify Weibulls), list of uninstalled engines in contract (e.g., spare or in shop), LLP data by ESN (e.g., cycles, limits), historical flight parameters by ESN and route (e.g., derate, temperature, and so on), planned AC/ESN entry or retirement, past work done by ESN on module level (e.g., what was repaired or what wasn't repaired), planned maintenance action (e.g., SB removals), shop workscope options and triggers, status of engines in shop (e.g., expected return date), CDM/DRM models and status by ESN.

In example embodiments, outputs generated by the simulation may include SV & workscopes, spares count, lease days, ESN removal probability, SV cost, fuel burn, CSA profitability, shop loading, and parts/inventory needs. In example embodiments, all of these outputs, except fuel burn, may be primary interest to the provider, whereas only SV & workscope, ESN removal probability, and fuel burn, may be of primary interest to the airline.

The raw output from the simulation may include data items organized into files labeled by replication number of a particular simulation run. This structure allows the post-processing scripts to easily read all the files (e.g., for all the replications for a given scenario) and then analyze to provide statistical outputs. Such files may include an "engine state change" file that sequentially lists each engine-related event that occurs during the simulation (e.g, including an engine instance identifier, a date and time of the engine state change, the new state of the engine (e.g., "mounted, off," "in repair," "in spares pool," and extended information (e.g., "water wash applied at 10,000 cycles when the EPDI was 3504.308," "current aircraft set to null," "installed to aircraft (B3191[47])," "finished repairs," and so on). This output file can be used to analyze when engines are installed/removed from aircraft, repaired and moved into the spares pool, undergo waterwash and other similar events.

The files may include a "shop visit" file that provides details specific to engine shop visits, including rows corresponding to a shop visit such that an engine with multiple shop visits appears multiple times. In example embodiments, each row corresponds to a shop visit indicating which engine entered/exited the shop, the workscope performed and some other parameters (e.g., ECSV, ETSV) when entering the shop. This information can be post-processed to understand shop utilization, workscopes performed and shop costs. Columns may include an engine instance identifier, a number of shop visits, a number of repairs, an enter service date, an exist service date, service reasons (e.g., "soft removal data," "Weibull: HPT S1 Blade," "Weibull: HPT S1 Nozzle"), workscope (e.g., HOC fix, BNC early, HOP teardown), ECSV, ETSV, and severity factor.

The files may include a "fuel consumed" file that includes information pertaining to fuel burn. In example embodiments, each row corresponds to a flight and displays the fuel burned (e.g, in lbs.) for each segment of the flight. This data can be processed to determine fuel costs, impact of specific policies on fuel-burn in a particular flight phase (such as single-engine taxi on fuel-burn during taxi), or aircraft-to-aircraft variation in fuel-burn on specific city-pairs. The columns may include an engine instance identifier, a flight number, a date/time, fuel at taxi (pre), fuel at takeoff, fuel at climb, fuel at cruise, fuel at descent, fuel at landing, fuel at taxi (post).

The raw simulation outputs described above provide flexibility for post-processing to provide meaningful graphs, heat maps and statistically aggregated values. The vision is for the core simulation engine to provide the standardized raw outputs, which are then post-processed by app-specific scripts (e.g., R-scripts) to produce the desired output visualizations. Example scripts include the following: (1) SystemSimPostProcess_vX.R—a wrapper-R-script that sets the file paths, filenames, and calls the remainder scripts, (2) SystemSimpostProcessESNRemoval_yX.R—processes the engine state change files to produce a master table that lists, per engine, the total probability of removal, as well as probability of each failure mode occurring: additionally, it provides the data table needed to produce a heat-map showing the increased probability of removal for each engine overtime, (3) SystemSimPostProcessShopVisits_vX.R—processes the shop visit files to produce plots of number of shop visits vs. time, as well as bar charts showing breakdown of workscopes per month; the output includes counts of all shop visits, as well as counts of only the next shop visit (e.g., in case an engine has more than one shop visit within the simulation), (4) SystemSirnPostProcessSpares_vX.R—processes the engine state change files to produce plots of spares level vs. time, (5) System SimPostProcessLeasedEngines_vX.R—processes the engine state change files to produce plost of number of leased engines vs. time, as well as a histogram of number of lease days required.

Simulation Modules

Modules in the system simulation include the following:

Aircraft-Engine Route Assignment module: Assigns aircraft-engines to routes or recommends aircraft-engine-route assignments.

Aircraft-Engine Assignment module: Assigns aircraft to engine, in example embodiments, initial assignment is given as input. Within simulation, at shop visit events, engine may assigned to aircraft from spares pool (e.g., as FIFO or using advanced logic).

Flight Schedule module. Lists specific flights (e.g., by dale, time, aircraft-engine, city-pairs) that are flown in the simulation. In example embodiments, the flights are user defined with a schedule provided as input with "severity" of each flight determined in pre-processing, in example embodiments, dynamic schedules can be updated within the simulation based on operational decisions.

Environment module: Determines weather and environmental factors that impact performance. In example embodiments, historical data may be used to generate average annual temperature and coarse aerosols at takeoff airport, as well as distributions of headwinds (e.g., by city-pair). In example embodiments, official Aviation environmental models are incorporated and called from within the simulation.

Flight Operations module: Determines flight operations policies defined by the airline. In example embodiments, historical data is used, to generate distributions (e.g., per city-pair) for various policies, such as derate and single-engine-taxi, in example embodiments, additional flight operations policies, including ones not specific to the engine, are incorporated.

Pilot Decision module: Models pilot decisions in implementing the policies. In example embodiments, decisions are sampled from distributions for decisions pertaining to Derate and Single Engine Taxi. In example embodiments, more advanced logic than sampling is used.

Flights module. Ekes each of the flights in the schedule. Sequentially processes each flight. Derate and single engine taxi are used per Pilot Decision. Temperature and coarse aerosols are lookup via environment table. Headwinds are sampled from distribution. A severity (e.g., pre-processed) for this flight is applied to engines.

UER module: Estimates frequency and cause of unexpected removals.

Mixed Mode Aggregator module: Determines shop visit driver by considering available damage models/plans for engine removal. Modes may include CDMs, Weibulls, LLPs, softtime, calendar date limits, simple damage models.

Engine Performance Degradation module: Determines loss of fuel efficiency based on usage. In example embodiments, degradation is modeled as a multiplier on the cumulative severity using a proxy parameter (EPDI) or an approved degradation model.

Fuel Burn module: Calculates fuel-burn per flight. Historical city-pair data used to generate distributions of fuel-burn per flight phase. Each flight sampled from distribution and adjusted for derate and duration (due to headwinds). In example embodiments, aircraft digital twin and gas path tracking filters are incorporated.

Operational Decisions module: Represents actions dial can be taken after each flight. In example embodiments, there may be four possible actions: 1—do nothing; 2—on-wing maintenance (waterwash); 3—inspection: 4—engine removal. In example embodiments, operational decisions include aircraft-related decisions, as well as ability to modify flight schedule.

On-Wing MX module: Maintenance that: can be performed without missing the next flight. Waterwash implemented with user-specified interval, degradation threshold. May include other On-Wing or On-Tarmac maintenance activities.

Inspection module. Triggers an inspection and possibly a new operational decision based on inspection results.

Removal, Workscope and Shop-Related modules: Block of modules representing the assignment and processing of engines as they flow through the shops. In example embodiments, SV Scheduling may be simplified to assume no constraints (can always be serviced within TAT). Workscope module has two options: 1—a simulation native version; 2—calls WSA. Simplified models for SV Cost, TAT and workscope based performance update via EPDF Incorporates shop capacity constraints, dynamic scheduling, and more advanced models.

Spares and Lease Pools module: Represent the spares and lease pools available for installation to aircraft. Queue of repaired engines (FIFO) and option to lease engines when no spares available (max number of lease engines is user input).

AIRCRAFT-ENGINE TO ROUTE ALLOCATION BLOCK. This block includes an aircraft-engine to route allocation module, an aircraft tail number module, and engine serial number module, a planned aircraft maintenance schedule module, and a flight routes module, AIRCRAFT-ENGINE TO ROUTE ALLOCATION MODULE. This module is used to assign the aircraft-engine to routes and flights in the flight schedule. In example embodiments, a static user input provided by the airline or generated during pre-processing. The user is able to generate different assignments and run them through the simulation as different scenarios to understand the impact of route assignments. In example embodiments, this module optimally and dynamically makes aircraft-to-route assignments.

AIRCRAFT TAIL NUMBER MODULE. This module is configured to manage a list all the available aircraft (E.G., by tail number) at the start of the simulation. In example embodiments, each tail number may be matched to a pre-defined tail type.

ENGINE SERIAL NUMBER MODULE. This module is configured, manage a list of available engines (e.g., by serial number), including spare engines. In addition, it may maintain lists of engine specific initialization information. In example embodiments, for each engine, the installed aircraft is specified, as well as its mounted position. In addition, ECSV, ETSV, the SV count, and Weibull modeset the engine is presently using are specified. Columns may be included to indicate whether the engine is installed, a future expected delivery, a spare, or in the shop at the start of the simulation. For engines in the shop, the shop exit date may also be indicated.

PLANNED AIRCRAFT MAINTENANCE SCHEDULE MODULE. This module is configured to manage a list of planned letter checks for the airframes which would serve as constraints on allocations of the aircraft to the flight schedule. In example embodiments, this module is not used if the flight schedule with allocated aircraft tail numbers is statically generated in pre-processing.

FLIGHT ROUTES MODULE. This module is configured to manage lists of the flight routes for the simulation period without the aircraft tail numbers assigned. This module is used to specify parameters that are relevant for the city-pair such as the distance, typical derate used, as well as the pre-processed Weibull severity for the flight. In example embodiments, these parameters are specified for a particular aircraft type, as the same flight route flown by different aircraft types would be operated differently.

FLIGHT SCHEDULE MODULE, The daily flight schedule module specifies flights that will be flown during the simulation. In example embodiments, a user provides a schedule which covers all flights over the desired simulation start to end date, and include all aircraft to be simulated. The flight schedule lists all flights, including: Departure date and time, departure and arrival city, assigned aircraft, tail number.

If replicating a historical time-period, this flight schedule would be the actual historical flights flown. If performing a forecast simulation, then the flight schedule must be generated. It could either be provided by the airline directly, or it could be generated based on historical flight schedules with some subject matter expertise input into future growth or modifications to the schedule. For example, consider that an airline is looking to potentially expand its route network to more harsh environment. In absence of specific information from the airline directly, a notional future schedule is generated by using past year's flights as a basis, and making adjustments to deploy aircraft to these new routes. In example embodiments, columns include departure aircraft code, arrival airport code, aircraft type, distance, departure taxi PL Bits, arrival Taxi FE Bits, To derate mean, to derate halfrange, (71 Derate mean CI Derate Halfrang, WeivullSeverityf1, WeibullSeverityf2, WeibullServertiyf3.

In example embodiments, the flight schedule may be treated as a static user input. In other embodiments, the flight schedule is generated or dynamically modified (e.g., city-pairs, frequencies, or tail-number assignments) so that optimizations can be performed.

A projected flight schedule may be generated in pre-processing. First, the historical flight schedule is retrieved from the provider's databases and examined. Part of this examination includes data cleaning, as well as identifying a suitable time period which seems representative of the airline's most recent flight patterns. The selected time period is then replicated multiple times to generate the future flight schedule for the desired number of forecast years.

In example embodiments, the future flight schedule is generated as a pre-processing step by running a specially developed script, such as a script having the following pseudo code: (1) read in the input files; Rename columns in the historical flight data; (2) perform initial flight cleanup, order the flights by tail number and timestamp; (3) Scan through the flight list and attempt to rectify any missing airport codes, (3a) if arrival airport is missing for a particular row, substitute the next following departure airport for the same tail number; (3b) if departure airport is missing, substitute previous arrival airport for same tail number; (4) delete any rows with missing departure or arrival airport data, (5) create lists of all aircraft, airports, and routes (e.g., city pair plus aircraft type), (5a) classify each aircraft by type; may need tins for route ops, (5b) compute average departure temperature by airport, ignoring NA's, (5c) computer average derate by route and aircraft type, ignoring NA's, (5d) computer flight leg time by route and aircraft type based on distance and air speed, (6) generate alternate schedule for aircraft which lack flight data across the entire historical time range, (6a) for each aircraft, determine the date of its earliest flight and subtract the first flight data across all aircraft—this indicates the delay before this aircraft began flying (within this historical time range), (6b) classify each aircraft as to whether its delay to first flight is more or less than a parameter defining the maximum—if its delay is less than the parameter, classify the aircraft as having a valid flight schedule, if delay is greater or equal, classify the aircraft as having an invalid flight schedule, (6c) for each aircraft with an invalid schedule, replace its list of flights with a copy randomly selected from valid aircraft of same type—at this point, optionally save a copy of the "cleaned up" flight list; (7) create the projected schedule, (7a) create a "schedule block" consisting of all necessary columns, (7b), starting from the data indicated in parameter file, copy the schedule block with incremented dates, (7c) repeat until the desired end date is reached and delete any flight beyond the end date, (8) save the schedule (e.g., into separate files for aircraft, airports, and routes).

ENVIRONMENT MODULE. The environment module is used, to simulate environmental factors that are beyond the control of either the airline or the provider. The intent is to incorporate a global weather model (likely based on historical data) to provide realistic environment operating conditions when simulating future flights. Such environmental factors may include ambient temperature at takeoff, coarse aerosols, and head-winds. The ambient temperature at takeoff may be a key parameter for estimating engine damage and is used in severity models for ICAM shop visit forecasting, as well as pricing of CSA contracts. Coarse aerosols may also have a severe impact to engine damage, particularly in environments with significant quantities of sand, such as the Middle East or the Gobi Desert. The impact of coarse aerosol (or equivalently, PM10) may be included into severity models using special-purpose analytics to improve estimates for shop visits and time-on-wing. The head-winds (specifically, wind velocity) primarily impact fuel-burn with little impact to engine damage. In example embodiments, the temperature and coarse aerosols are inputted as historical annual average values at each airport, and the head-winds are inputted as average values per city-pair.

In example embodiments, the environment module is limited to considering ambient temperature and coarse aerosols at the takeoff airport, as well as the headwind velocity between city pairs to locus primarily on engine-related issues. In other embodiments, the environment module incorporates more detailed weather models which would impact overall aircraft-level dynamics.

FLIGHT OPERATIONS POLICIES. The flight ops policy module is used to simulate airline operating policies that are in the control of the airline. Some of these policies might arise as technical directives directly from the flight manual and other's might be the specific airline best practices. These are policies that the provider might influence provided the value story makes sense to the airline. Operating policies may include, for example, takeoff derate, climb derate and single engine taxi. The takeoff derate may be a key parameter in estimating damage to the engine and may be used as one of the main inputs into the severity models for ICAM, as well as for commercial pricing of the provider's CSA contracts Climb derate may also be a key parameter in understanding engine damage and incorporated into severity and/or pricing models. The single engine taxi is known to provide fuel-burn benefits which would be balanced with any excessive damage the non-operating engine would suffer due to lack of a warm-up time when spooled-up just prior to takeoff. In example embodiments, the takeoff and climb derates are provided as uniform distributions (with a mean and hail-width) based on historical data per city-pair for the specific airline. The single-engine-taxi is inputted as a code (per city-pair) indicating whether no engines, left engine or right engine is used during taxi.

Although example embodiments refer to a few policies, the vision is to incorporate all relevant flight policies used by the specific airline into the simulation models. Additionally, although example embodiments focus on policies that primarily impact the engine, the framework is intended to be able to handle any policy that impacts aircraft-level operations.

PILOT DECISION MODULE. The pilot decision module is intended to replicate the pilot's decision making process when implementing the airlines flight operations policies. This module is intended to introduce randomness into the simulation replications that is reflective of real-world operations as each pilot operates his/her flight. In example embodiments, the pilot's decisions include takeoff derate, climb derate and single-engine-taxi. The takeoff and climb derates are sampled from the uniform distribution (with mean and half-width specified in the inputs based on historical data for the city-pair). The single-engine-taxi may be a binary flag and no choice may be given to the pilot (e.g., if the inputs specify that a single-engine taxi should be performed on a city-pair, then it is always performed). In example embodiments, randomness is introduced by sampling from a historical distribution, and also indicating which engine (left or right) is used. In example embodiments, the focus is on the engine, however, pilot decisions that are related to the overall aircraft may also be included, (e.g., based, on incorporation of an aircraft digital twin).

FLIGHTS MODULE. This module is the core of the fly-forward capability as it sequentially goes through each flight specified in the flight schedule applying the appropriate environmental factors and pilot decisions regarding flight operations policies. Each replication of the simulation is unique depending on the random sampling performed on the inputs. For the proof-of-concept, the random sampling is limited to wind, takeoff derate and climb derate. All other input factors are deterministic (single-value) inputs such as average annual temperature.

The simulation logic will fly every flight regardless of locational inconsistencies (such as departing from other than the previous arrival airport). Also, every flight is flown as scheduled There is no attempt to model delays and subsequent recovery, for the proof-of-concept, "flying a flight" simply entails incrementing the cycles and time on the airframe and associated engines.

For a given aircraft tail number, die next flight in the schedule is obtained and compared against the simulation time to see if it's a future flight, or a missed flight from the past. If it's from the past, the flight backlog is caught up with and an immediate check of whether the aircraft is fit to fly is performed. If it's not fit to fly, or if the flight is a future flight, a wait process begins. The wait process includes determining whether a calendar date removal is triggered. The removal includes removing the engine for SV (shop visit), processing the SV, entering the spares pool, getting assigned to new aircraft, and determining next potential cycles to failure as min(Weibull, LLP). If the aircraft is fit to fly after the waiting period or after being confirmed as fit to fly, the aircraft is flown on its flight. Then the CDMs are updated (e.g., via the mixed mode aggregator module). An operational decision is then made (e.g., via the operational decisional module) The operational decision includes (1) determine whether any CDM threshold is reached, (2) determining whether any Weibull cycles have been reached, (3) determining whether any LLP cycles have been reached, and (4) determine whether a calendar date removal has been reached, if any threshold has been reached, the engine is removed for SV, Otherwise, a check is performed on whether the engine reached cycles for on-wing MX. If the engine has reached cycles for on-wing MX, the on-wing MX is performed. Finally, the information for the next flight is obtained and the process is restarted for the next flight.

The normal situation is that the next flight is to occur in the future, and the aircraft waits for the appointed time. While waiting, a calendar date removal might occur, in which case, the aircraft is sent to have an engine removed, prior to flying the next flight. At the appointed flight time, a check is made to make sure the aircraft is "fit-to-fly". In example embodiments, this determination may Simply include checking that engines are installed; however, in other embodiments, this determination may include more complex logic. The flight is then flown and the damage models are used to update the damage states of the engine components as the part of the MMA module. The next step is part of the Operational Decision module where the engine is evaluated to decide what to do next. First, the analytic/CDM damage states are checked to see if any thresholds have been missed, second is to see if any Weibull cycle limits have been met, third is to check if any LLP cycle limits have been met, and finally, the calendar date removal is checked, if any of these are triggered, then the engine is removed for a shop visit. The order is of particular importance, because if multiple damage modes are triggered on the same flight, only the first one is used to determine the workscope. Furthermore, if multiple damage modes of a given type (for example, multiple Weibulls) are triggered on the same flight, then the order in which they appear in the input sheet determines the workscope. If the engine is removed, it is sent to the shop, then the spares pool, and then ultimately gets reinstalled on a new aircraft. At the time of reinstallation, the random draw from the Weibulls is made, along with a comparison of the Life Limited Parts (LLPs) cycles to determine the potential cycles to next shop visit. If the engine is not removed, then a check is made to see if on-wing maintenance is due, otherwise the aircraft is cleared for the next flight in the schedule.

If it is found that the next flight is a missed flight from the past, then the aircraft immediately attempts to fly the next flight. First, a check is made to insure the aircraft is "fit-to-fly", and if so, then the flight is immediately processed (without waiting for a particular time in the simulation). It is possible, that if an aircraft is grounded for an extended time period, there may actually be a backlog of missed flights. These are all processed, in sequence as soon as the aircraft is "fit-to-fly". These delayed flights have consequences on the simulation, particularly in regards to engine removals, shop visits and interactions with other aircraft. For example, if an aircraft is grounded from January to July, then on July 1 st, it will begin processing the 6 months of missed flights. If under the original flight schedule, a LLP component would have met its cycle limit sometime in February, that LLP shop visit event will now occur in August (e.g., a 6 month delay). This delayed LLP shop visit would have subsequent ripple effects on the shop visit scheduling, availability of spares engines, and determination of which engine serial numbers get installed on other aircraft. In essence, this one aircraft is flying its entire flight manifest 6 months late. Since missed flights are processed immediately in the simulation as opposed to waiting for a specific flight time), there is the possibility that the aircraft's flights could catch-up to the simulation (since it will be flying flights 24/7, at night, when all other aircraft are dormant). This logic is primarily geared towards maintaining the schedule for flights that are minimally delayed due to headwinds, however, it breaks down with unforeseen consequences if an aircraft is grounded for extended time periods.

It should be noted that the scenario of a missed flight from the past may be an abnormal situation with the present simulation setup and can only occur due to illogical inputs. For example, if the inputs are setup in such a manner that an aircraft is specified to have a flight before its delivery date. Another scenario would be if the headwinds on a flight are so strong that the flight takes too long. As an extreme example, if the headwinds are specified as 10000 mph, then a flight that should only take a few hours could take months, resulting in many months of missed flights. In general, a missed flight can occur any time engines are not installed on the aircraft at the specified flight time (and this is the only check that is made to see if an aircraft is fit to fly). This could, in principle, occur if there is an engine removal with no spare engines or leased engines available. A lease engine cap may be introduced which results in aircraft-on-ground situations.

In example embodiments, the simulation may actually simulate the trajectory of the flight itself (e.g., via the incorporation an Aircraft Digital Twin that can model the performance of the entire aircraft throughout the flight using typical aircraft performance methods (e.g., using L/D, T/W, drag polars, and so on). In this way, the aircraft digital twin will enable the ability to consider scenarios "beyond the engine."

UER MODULE. The Unexpected Engine Removal module incorporates models that reflect actual unexpected engine removal rates observed in the field. These models may or may not have granularity down to the level of the component that caused the removal. In example embodiments, these models may be based on historical data.

MIXED MODE AGGREGATOR MODULE. The mixed mode aggregator module competes the different damage models that exist to identify which component will drive a shop visit (and when). Instead of considering all flights for every aircraft to be an "average flight" (average flight leg, utilization and derate), which gives no ability to distinguish deterioration on aircraft/engines flying one route vs another (e.g., a harsh route with a lot of dust exposure would cause more engine damage than a gentle route), and instead of considering only Weibull and life-limited-parts (LLP) damage paradigms, in contrast, the MMA module flies each aircraft on unique flights per the flight schedule, accumulating usage/damage accordingly and the MMA incorporates soft-times (e.g., cycle based), calendar-date removals, Weibulls, LLPs, CDMs, and any other custom analytic.

Figure 10:
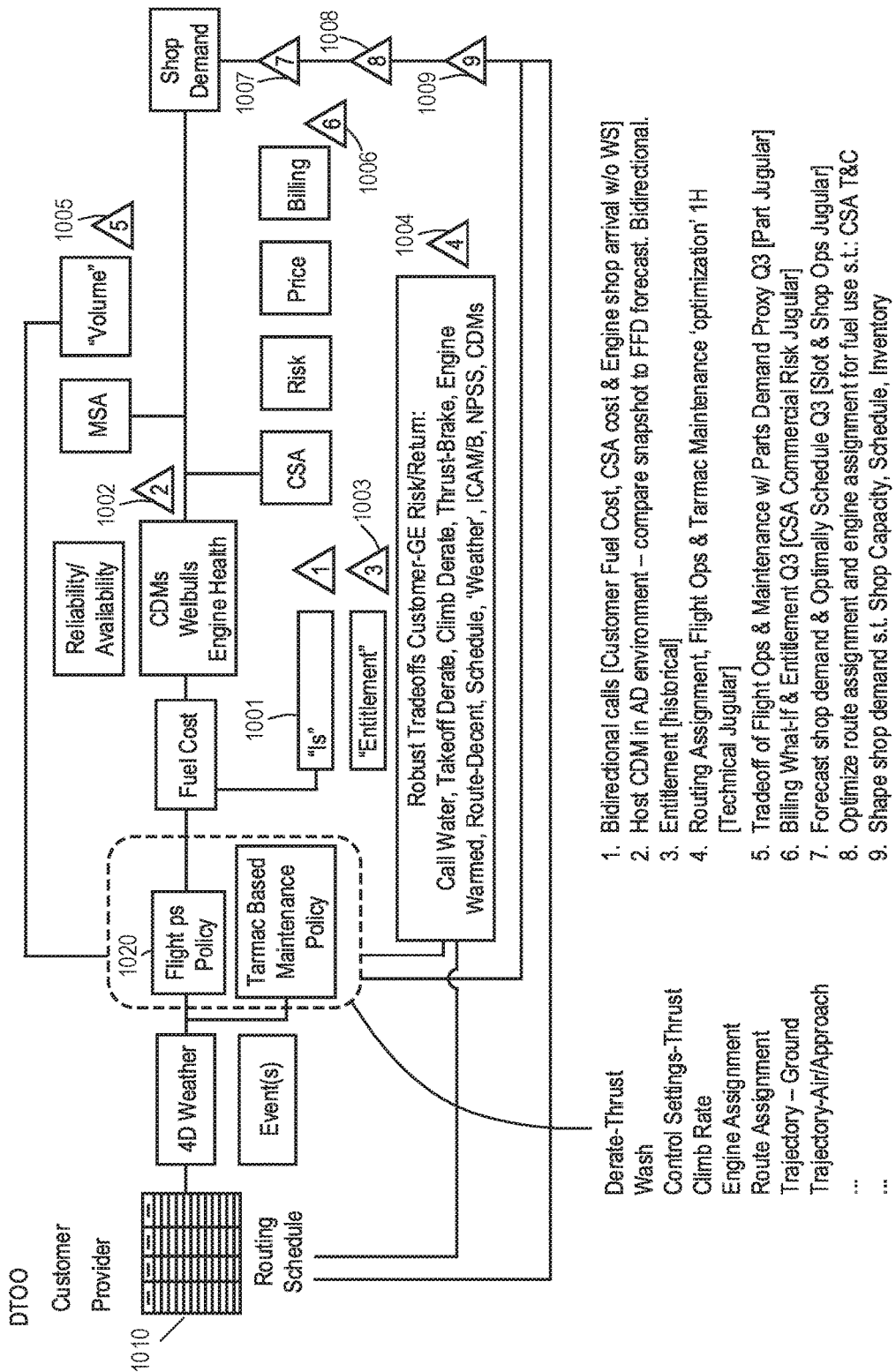
FIG. 10 is a graphical representation of an example decision support interface for co-optimization of design and operations.

FIG. 2 is a framework diagram of life assumptions as they relate to risk transfer via physically sensing and optimally controlling component state(s) in one or multiple time horizons for one or more assets and subsystems used to transfer operating performance and/or financial risk between an asset operator and service provider: said risk informing fee physical state being controlled for in an example industrial system. The depicted probabilistic remaining useful life curves are the expected maintenance need which brings the asset into the maintenance and repair operation (MRO) when run to the limit. As an example, component 255 will cause a service event before the subsystem characterized by 240. Because the components differentially wear as a function of exposed conditions, the asset is controlled m one embodiment to enable an optimized schedule that wears several components at a rate that makes the service visit more complete in its workscope—for example, a schedule of repairs done once rather than two service visits. FIG. 10, discussed below, illustrates exemplary cost modeling of a CSA contract with terms that stipulate certain engine states be maintained in whole 121 or in part such as at a subsystem 122 or part 128 level. This illustration shows the beneficial means to which a contract can be modeled, underwritten, priced and managed by the disclosed system simulator and optimization.

FIG. 2 describes the philosophy of how the mixed mode aggregator competes the different damage models to forecast when an engine will be removed. Some of the models are deterministic (In a specific date) and others are probabilistic. In the example, there are multiple Weibulls 235, 240, 245, 250, and 255 and 2 LLPs 260 and 265. For a given engine (ESN), a timeline is setup for each of the damage models Conceptually, the deterministic damage modes may be straightforward as their removal dates may be fixed and known in advance. When running multiple replications of the simulation, those removal dates will always be the same for a given engine. The probabilistic modes, however, are sampled from the distributions resulting in different removal dates in each replication. The earliest removal date across all the damage models is then used as the driver for an engine removal. The MMA philosophy can, therefore, accommodate any damage modeling paradigm that expresses itself either as a fixed or probabilistic removal. Different damage model paradigms that can be hosted by the mixed mode aggregator include, for example, (1) a son-time removal paradigm—preventive measure to remove engine from service at certain number of cycles, in the MMA approach, cycles are converted to fixed date using known flight schedule for the engine; (2) calendar date paradigm—schedule maintenance for engine: in the MMA approach, fixed removal dates may be input and known at start of simulation; (3) Weibull paradigm—failure distributions for each major component on the engine adjusted for average severity: in the MMA approach, random draws from flight-schedule specific severity-adjusted Weibull, (4) LLP paradigm—life limited parts with certified life to a certain number of cycles: in the MMA approach, cycles are converted to fixed date using known flight schedule for the engine; CDM/DRM or custom analytic approach—accumulation of flight-by-flight damage with specified threshold for inspection or removal; in the MMA approach, each parameter used to calculate the CDM/DRM is forecast for the given flight schedule and the CDM/DRM is updated after each flight.

A timeline 205 originating at a meaningful point To 215 such as the beginning of an assets life or the beginning of a contract or the start of an interval of interest such as "then" 220, "now" 225 and "future" 227 establishes the temporal relationship of contractual activities and obligations.

Degradations to asset performance may be caused by many factors, such as for example ambient conditions, temperature and stress cycles. The present disclosure accounts for the specific causal factors of degradation as computed by the cumulative damage models 134, however, contracts do not necessarily have to have these factors in the contractual language or terms but instead can use higher level metrics leading to life consumption such as cycles or hours of use 210. For illustrative purposes, engine flight hours are used to describe one embodiment.

An industrial asset such as an aircraft engine is characterized by subsystems 122 and certain parts 128 such as life limited parts 260, 265 which are tracked by regulatory and contractual specification which, for example, may require a certain maintenance action or replacement when its proxy metric for life consumption 210 is reached. Subsystems 230 are a set of components such as a combustion system or an auxiliary system such as related to fuel or air. These subsystems are characterized, for example, by Weibull failure rates 160, 173, 176, 235, 240, 245 each subsystem having its failure or degradation realized by operation of the asset. In example embodiments, the operations are measured at a high level, such as flight hours or cycles 210 while in another embodiment, the operations are measured at a precise low level such as local atmosphere, power output fuel type or maintenance activity as disclosed with the aid of FIGS. 1A-1G.

In one embodiment, the contractual cost to the provider 152, 191 is the sum of repairs for subsystem 230 service plus specific parts 260, 265 service. In one embodiment, the repair policy is such that if one subsystem causes a service intervention, that the other system will be inspected and repaired up to a new remaining useful life level.

In example embodiments, the expected average 120 plan life of an exemplar subsystem 245 is made more precise in terms of the statistical probabilities of life consumption based upon the granular modeling afforded with the cumulative damage model(s) 134 being exposed to actual or scenario operations 103, 109, 111, 116, 124, 127. As the specific degradation of a subsystem is modeled as a function of that asset's specific operations, the probabilities of life consumption achieve a narrower forecast interval such as, for example from the original Weibull shape and location parameters 245 to then 250 and then 255 as more model 135 precision is attained and more operations factors are considered. The present value change of free cash flow 149 resulting from the increased precision as life consumption (and service costs) is more accurately modeled for individual assets, their subsystems and parts can be viewed as the option value of implementing the disclosed system for contract underwriting, pricing and management. This change in NPV for a given asset can be aggregated for a portfolio of assets. The terms of a performance based contract may be valued by calculating provider costs 152 of specific life paths 125, 140 versus an average life 120. The operations control policy related to location, duty, service interval and scope, asset control and assignment may be valued by calculating the comparative costs of resulting specific life paths 125, 140. Similarly, the customer's costs 151 can be calculated for the terms and operations of a contract/asset/fleet.

In example embodiments, although not depicted in FIG. 1C, benefits to stakeholders other than the service provider and customer (e.g., airline) may be realized. One example of such an additional stakeholder may be an investor. For example, through a simulation involving the digital twin and an analysis of a future life plan of an asset (e.g., based on conditions in which aircraft using the assets will be flown), a customer may decide to upgrade an engine in a particular way (e.g., add a new control system or a higher temperature rating turbine, and so on, to more optimally modify an engine for higher efficiency in the way the customer wants to use it or as it is scheduled with the disclosed system). The models may allow an investor to make the economic investment into the engine according to that investor's risk/return preference. Through the subsequent use of the engine and the change in its cash flows, the digital twin state estimation models, when exposed to simulated futures, pricing, assignments, bidding and dispatch, enable calculations of how to achieve a financial preference under a given operating mode that enables payment of the investor back according to the contractual obligations.

Referring to FIG. 3, the revenue model 302 may be configured to provide criteria regarding the monetary aspects of opera ting an industrial asset, including the revenue generated by the asset, the costs of fuel that may be used to operate the asset, dispatch and trade parameters, power generation capability and grid stability expectations, and so on. For example, the revenue model 302 may provide possible terms of power purchase agreements, possible ways of generating revenue from waste heat and/or other byproducts of the asset, electricity spot pricing, desired profit margins, and the like.

The design/CM&U model 304 may be configured to provide particular design options, such as alternatives regarding the particular subsystems (e.g., gas turbines) and components of the power asset 205. The design/CM&U model 304 may also be configured to suggest custom modifications and upgrades to a pre-existing design of the power asset 205 that may result in enhanced return on investment or other aspects of value. Further, slack values are calculated by relaxing constraints which are characterized by system design or operating policy points.

The operations model 306 may be configured to provide one or more sets of policies or rules regarding operation of the power asset 205. In one example, such policies may be set based on information received at the operations model 306 from the physics-based model 225 and/or the data model 230 of the asset condition analyzer 220. In other embodiments, the physics-based model 225 and/or the data model 230 of the asset condition analyzer 220 may serve as the operations model 306 within the asset condition analyzer 220, as opposed to being located within the criteria module 255. Example policies may include circumstances under which the asset 205 may exceed its normal steady-state ranges (and for how long), circumstances under which the asset 205 should be shut down, weather conditions under which certain components (e.g., an inlet chiller) should be employed, and so on.

The control system model 308 may be configured to provide parameters, limitations, and the like regarding the operation of particular subsystems (e.g., gas turbine) or components of the power asset 205. For example, the control system model 308 may provide information regarding allowable inlet schedules and other parameters for ramp up of a component in response to increasing load, how much remaining useful life may be consumed by over firing a component by a specific period of time, and so forth. Such information may be useful in determining whether operating the component in such a manner may be useful in generating additional revenue.

The service model 310 may be configured to determine various parameters and limitations regarding the servicing, repair, and/or replacement of the various components and subsystems of the power asset 205. Such parameters may include the particular types of repair to be performed on a particular component based, on the amount of use of the component, limitations regarding the use of the component that may invalidate a service contract or warranty, the length of time associated with the repair and/or replacement of the component, and the like. The costs of different potential service contracts and their various terms may also be provided.

The financial model 312 may be configured to provide different scenarios regarding various financial aspects of the power asset 205 that may be considered. In some examples, the financial model 312 may provide different scenarios regarding capitalization of the asset 205, such as whether the various components of the asset 205, or the asset 205 in general, may be purchased using presently available fends, whether outside investors may be pursued, whether financing should be employed, and so on. The financial model 312 may former analyze cash inflows and outflows based on initial investments, repair and/or replacement of components, cost of feel consumed, expected revenues based on market pricing for output of the asset 205, and the like. Moreover the financial model 312 may provide indications of equity risk/return preferences of the owners and/or operators of the asset 205, as well as the lifecycle economic dispatch, modification, operations, and services that may achieve such preferences, subject to various capital structure constraints.

SOFT TIME REMOVALS MODULE. Soft-time removals refer to die idea of driving a shop visit based on the number of cycles flown. This is used when a decision is made (either via a service bulletin, provider recommendation, or airline operations decision) to remove an engine as a preventive measure on a periodic basis for maintenance. For the proof-of-concept, the soft-time removals are implemented using a "Weibull Soft Time" with a large shape parameter (to approximate a delta function) and the timescale indicating the number of cycles. These soft-time removals are not engine specific and can only be based on cycles since last shop visit (ECSV) consistent with how all other Weibull-based failure modes are treated. Since the exact flight schedule is already known, the cycles can be converted to a deterministic calendar date which remains the same for each replication of the simulation.

CALENDAR-DATE REMOVALS MODULE. Calendar date removals are used when specific engines (per ESN) are known to be scheduled for a shop visit on specific dates. For example, this can be used in situations where there is a scheduled removal plan to address a service bulletin. For the proof-of-concept, calendar-date removals may handled via the inputs where a user lists the specific ESNs and their removal dates. These dates are treated as deterministic and the engine will always be removed on that date. A calendar date removals input table may allow different categories of removals (for example, Service Bulletin #1, and Service Bulletin #2, etc.).

WEIBULLS MODULE. Failure forecasting may be largely based on Weibull distributions (based on engine cycles) generated from historical failure data for each engine component of interest. These Weibulls may be maintained by teams of analysts, updated regularly and used extensively across the provider's systems. The Weibulls may be one of the main inputs in order to forecast shop visits to manage contracts, forecast contract profitability and understand potential pressure points. A Weibull failure mode is a distribution specified by three parameters: Shape (>0: higher numbers indicates "narrower" distributions approaching a delta function), Timescale (in cycles, which approximates the mean time to failure for the weibulls), Offset (in cycles; positive numbers push the mode farther into the future and delay the onset of the mode).

In general, the provider may specify one Weibull per component of interest. On occasion, however, there might be multiple Weibulls for the same component (representing different damage modes), or there might be a Weibull that isn't specific to particular component (such as an EGT Weibull). In addition, each engine platform may have one or more sets of Weibull failure modes defined. Each set reflects either a particular configuration of the engine (such as whether or not the engine has received a specific fix or upgrade), or the number of shop visits experienced by the engine so far. In example embodiments, there are two Weibull sets (0 and 1), and Weibulls are defined for each subcomponent for each set. In example embodiments, if an engine comes in for a shop visit, any components affected by the workscope belonging to set 0 will be incremented to set 1 to determine the failure cycles of the next shop visit, whereas any components already at set 1 will remain at set 1.

When sampling from a Weibull distribution, it is important to correctly account for the conditional probability based on the number of cycles already flown (e.g., component survival to current cycle count). This is relevant at the start of the simulation when engines are initialized (and most engines have cycles of use on them), as well as when an engine comes out of the shop and the components which were not affected by workscope are the existing parts with cycles of use on them.

At the start of the simulation, the engine cycles since last shop visit (ECSV) are specified as an input. This information is provided at the engine level or engine subcomponent level. After a shop visit, the Weibulls are reset by setting the ECSV to 0 only for the specific components repaired (based on the workscope) and the Weibull set is incremented as described earlier (e.g., only for the repaired components). The engine is then sent to the spares pool until needed. Upon installation to an aircraft, the engines flight schedule is known. The severity for the aircraft's specific flight schedule is calculated and applied to each of the Weibulls. A draw is then made from the severity-adjusted distributions for each of the Weibulls, and the minimum cycles to failure (across all subcomponents) is used (along with the minimum cycles remaining across LLP parts) to determine the next potential shop visit.

SEVERITY ADJUSTMENT. To forecast failures, Weibulls generated by historical failures across a global fleet for each subcomponent may be used. Since each engine is operated differently and experiences different environment conditions, adjustments must be made to the base Weibulls when making forecasts. This is done by multiplying the base Weibull (e.g., eta and beta) for each failure mode by a severity factor determined using a severity calculator with flight leg, derate, utilization, ambient temperature and coarse aerosols as the inputs. The severity calculators are developed for each engine platform by (e.g., by the provider's engineering teams) and are intended to adjust the Weibulls (e.g., either reduce or extend the expected cycles to failure) based on actual operating conditions. Additionally, each subcomponent Weibull can be multiplied by a different severity factor (e.g., for the same operating conditions) since one can easily understand that cold section components are affected differently than hot gas path components. In practice, for a givers engine platform, the provider may create a limited set of (e.g., at most 3) different severity factors to be applied to the different engine components. This mapping is defined (e.g., which severity factors to multiply against which components) and is specified m the inputs. In example embodiments, for a single platform (e.g., the CF34 platform), there may be only one severity factor, so all the Weibulls are multiplied by Severity Set 1.

Instead of using the weibulls to treat every engine as flying the same average flight with constant operating parameters, and therefore the same severity factors for all flights, in example embodiments, each engine is flying a different flight schedule, with different flights legs, derates, etc.

In example embodiments, the severity adjustment is handled via pre-processing during the generation of the flight schedule. At that time, the flight leg (FL), utilization (UTIL), ambient temperature (TEMP), takeoff derate (DER), and coarse aerosol counts (CA) are used with predetermined severity calculators to calculate the severity for each flight. This severity is included as part of the inputs.

As described earlier, the severity factor is applied to the Weibull upon engine installation to the aircraft in order to make the random draw for its next shop visit. When an engine is installed on an aircraft, the simulation would look-forward at the next 10000 flights for the given aircraft and average the severity parameters directly. These average values would then be used as inputs to the Java severity calculator as follows:

Severity Factor=SeverityCalc(avg(FL),avg(UTIL), avg(TEMP),avg(DER),avg(CA)

This severity factor would then be multiplied by the Weibull parameters in order to conduct the random draw to assign the next shop visit date.

LIFE-LIMITED PARTS, Life limited parts (LLP) are engine-critical components that have been certified to fly for a specific number of cycles based on extensive engineering design and testing during the certification process. These components are typically high-value parts (such as the turbine disk) and can drive a shop visit if their replacement becomes due. For the proof-of-concept, since the flight schedule is known in advance, the cycles can be converted, to a calendar date with remains fixed across all the replications of the simulation. The LLP specification for each part has inputs which are identical to those used in ICAM:

Life Limit: maximum number of cycles prior to replacement being required

LLP Buffer: typical number of cycles remaining at which the part will cause a shop visit MinBuild. minimum cycles which must remain on this part when the engine leaves the shop (for an unrelated repair)

It is easiest to explain the meaning of these parameters with an example. Consider a life-limited part X with: Life Limit=25,000 cycles, LLP Buffer=100 cycles, and Min-Build=6,000 cycles. Current cycle count (ECSV)=18,000 cycles. The following scenarios could occur:

If the engine does not experience any other reasons for removal, LLP part X will cause a shop visit at (25,000–100)= 24,900 cycles.

If the engine goes into the shop for some reason right now (at 18,000 cycles), LLP part X will not be replaced at that time because it has (25,000–6,000)=7,000 cycles remaining, which is less than MinBuild.

If engine goes into shop for some reason after 19,000 cycles, LLP part X will be replaced at that time because it will have less than 6,000 cycles remaining (less than Min-Build cycles)

In example embodiments, an input list of all the life-limited parts for the engine platform is received. The input of values for the LLP parameters (described above) is specified per engine serial number for the simulation.

CDMS, DRMS AND CUSTOM ANALYTICS. In example embodiments, any physics or data-driven analytic that is used to forecast engine component damage may received as input CDMs and DRMs generated by the provider may be specific cases of custom analytics that can be inserted. In order to be useful, these analytics must be independently validated by comparing the analytical predictions of damage with inspection data for a large number of engines. The simulation may simply use the analytics, and may not be able to in itself make better predictions and compensate if the underlying analytic is a poor predictor of damage. In example embodiments, the analytic must provide an initial damage state (via pre-processing and specified in input table), and then be able to calculate the incremental damage per flight as a function of the flight-specific operating parameters in the flight schedule. If the damage model is based on engine parameters such as T3 or T49, then there must be a mechanism provided to forecast those values. In addition, the analytic definition should include conditional logic that triggers an event. The conditional logic could be as simple as a threshold, or could be more complex such as slope-based or something else entirely. Additionally, the analytic should specify what event should occcur when the conditional logic is triggered.

In example embodiments, damage analytics are incorporated in the simulation and an input table is used to specify which ones should be used in the simulation. For example, two analytics specific to the CF34-10 (e.g., LPT shroud drop and first stage nozzle cooling holes blockage) may be incorporated into the simulation model. The LPT shroud drop is used to drive an engine removal (shop visit), however; the nozzle cooling bole blockage analytic is simply reported as having crossed the threshold (without driving a shop visit) since the analytic itself is still under validation. In example embodiments, the simulator platform infrastructure enables the simulation to call (e.g., within a replication, after each flight) the analytic, which may be hosted in a scalable and language-agnostic environment.

In example embodiments, CDMs/DRMs may be used to estimate the engine health using historical flights to the present day. This information may then be used to assess whether an engine should be brought in for inspection.

Engine Performance Degradation Module. In example embodiments, the engine fuel-burn performance degradation over time is modeled in the simulation as a multiplier against the fuel-burn. The engine degradation is captured in an "Engine Performance Degradation Index" (EPDI), which is a non-physical number that is simply incremented every flight. This cumulative index is calculated based on the severity calculated for each flight. As the flights occur, the cumulative EPDI for the engine is incremented by the EPDI for the flight. The cumulative EPDI is then related to the fuel-burn multiplier (l/fuel efficiency ratio).

As an example, if a particular engine has flown 300 flights, and the cumulative EPDI for that engine is calculated to be 1200, then the engine is deemed to be 98% efficient, so the fuel burn multiplier used on the next flight would be 1/0.98=1.04. In example embodiments, this method is replaced with EGT margin degradation curves (or other similar methods) developed by the provider for the different engine platforms FUEL BURN MODULE. The fuel-burn module is used to estimate the actual fuel-burn for the specific flight in specific weather conditions by the specific aircraft tail-number. Ideally, the fuel-burn estimate is made at the aircraft performance level, taking into account the drag characteristics of the specific tail number, as well as the actual degraded engine performance. The vision for the fuel-burn module is to incorporate actual aircraft and engine models to properly estimate fuel burn. At a high-level, for the purposes of the simulation, the fuel-burn for a given flight can be estimated purely based on a tail-number specific aircraft performance model (e.g., via the Aircraft Digital Twin). In example embodiments, any fuel-burn degradation between the airframe and the engine is disaggregated, which requires a serial number specific engine-model. In example embodiments, the fuel-burn is estimated using a lookup table obtained from historical data in the provider's database systems.

In example embodiments, the fuel-flow (in lb/hr) is provided per city-pair per each phase of flight. This information is provided for different aircraft-engine combinations since two different aircraft types flying the same city-pair are likely to have different performance. During the pre-processing generation of the inputs, the takeoff and climb fuel-flow rates may be corrected for the derate used on that particular historical flight using, for example:

Takeoff (or Climb) Fuel Flow=(Actual Fuel Flow)/ Derate

As such, the values provided as inputs may represent the notional 0% derate fuel-flow. Similar data may also provided for the time duration of each flight phase.

The duration of the cruise phase may not be provided; n the lookup table, but rather the cruise speed may be provided instead. The cruise duration may be calculated from the ground-speed (cruise speed−headwind speed), both of which are provided as inputs per city-pair. This is one example of linking an environmental factor (headwind speed) to an outcome important to the airline customer (fuel-burn). In this manner, the ground-speed is also replication-specific, and the duration is calculated using the city-pair distance.

Cruise Duration=(Great Circle Distance Between CityPairs)/(Cruise Airspeed−Headwind speed)

The standard deviation of the fuel-flow and durations may also provided, so that randomness can be introduced into the simulation by sampling from the respective distributions. By multiplying the statistically sampled fuel-flow rate with the statistically sampled duration, a unique (or rather, replication-specific) fuel-burn is determined for each flight. Additionally, the engine performance degradation correction is also used to adjust the fuel flow, so that the total fuel burn for a single flight is calculated.

Operational Decision Module. The Operational Decision module is intended to replicate the logic behind the operational decisions available to both the provider and the airline customer after each flight. In principle, this module would incorporate logic that could any impact of either the provider's or the airline customer's operations. This would include the airframe, the engine, flight schedules, or even ancillary services such as catering.

As a simple example, the focus may be on an engine with one of three operational decisions being made with respect to the engine after each flight. The first is to do nothing and fly the next flight. The second is to perform an on-wing maintenance action (e.g., waterwash) based on some OEM-recommended or airline policy, prior to the next flight. The third is to remove the engine for a shop visit. A replacement engine may be immediately pulled from the spares pool or lease engine pool so the aircraft can fly the next flight. The removed engine is then processed in the shops to determine the workscope, shop costs, and turn around, time (TAT) prior to being reintroduced into the spares pool. Additionally, a decision to perform an inspection may be made and a subsequent operational chain that occurs if the inspection is passed or failed may be incorporated.

Maintain Existing Schedule module. This module essentially represents the status-quo behavior which is to proceed with the next flight without any intervention.

On-Wing Maintenance Module. This module is used to represent any engine-specific on-wing maintenance that can be performed and its impact to either engine damage state or performance. Note that, in principle, this module should be expanded to include any "tarmac-based" aircraft maintenance as well.

An example of on-wing maintenance includes an engine waterwash. The implementation is straightforward with two triggers: 1—cycles-based, and 2—engine degradation-based (e.g., EPDI crosses a threshold). The impact of the waterwash is to improve the EPDI by a user-specified number of points, and as such its only impact is to improve fuel-burn, without any impact to the damage state of the engine. In addition, a retention period must be specified, which indicates the duration (in cycles) of the effectiveness of the waterwash, with the performance (e.g., EPDI) degrading linearly back to the pre-wash degradation curve. EGT increases as the engine degrades over time with some portion of the degradation being recoverable via waterwash and the rest requiring a shop visit. The impact of the waterwash improving the performance may be visualized as a step function, which then linearly returns back to the pre-wash performance over a certain number of cycles (the retention period). This behavior may be modeled and incorporated into the simulation.

If the inputs result in a second waterwash to occur during the retention period (e.g., the inputs specify cycles between waterwash to be less than the retention period), then the second waterwash is postponed to immediately after the retention period. The on-wing maintenance module may similarly incorporate any additional on-wing maintenance actions that can, for example, either extend the life of components or impact fuel-burn.

Inspection Module. The inspection module is used to represent the process of performing an inspection on a part per a prescribed inspection policy, and returning the results of the inspection. The results of the inspection then drive another operational decision which could be to any of the actions described earlier (e.g., fly next flight, on-wing maintenance, removal, or even another inspection). Additionally, with the incorporation of CDMs, one of the outputs of the inspection module might be to "true-tip" the COM for a particular damage mode. Modeling the results of the inspection may be based on historical data to generate a distribution on the results of the inspection.

Removal, Workscope, and Shop-Related Modules Once the decision has been made to remove an engine, then these modules simulate the process of the shop visit logistics. This includes determining which shop to visit, scheduling a slot within the selected shop, and identifying the appropriate workscope to perform. In particular, for the latter, identifying the workscope also specifies bow long it takes, bow much it costs, and what is the impact of the shop visit on the engine.

The workscope module is configured to model the process of deciding the extent of the repair work performed during a shop visit. In example embodiments, one of two methods to model the workscope selection process may be selected. The first is a rules-based model developed and run natively within the simulation framework, and the second is to invoke the Workscope Analyzer algorithm (WSA) as an external module Both are described below.

The rules-based, simulation-native implementation consists of a series of lookup tables developed in consultation with CPMs. Each of these tables is presented as an input values to the simulation. The Workscope table defines the available workscopes for a particular engine model, bach workscope is defined will's a name, a turn-around-time (TAT) a non-CSA customer price, and a CSA cost. The WorkscopeFailureMap table which lists ail the damage modes (weibulls LLP, CDM, calendar removal, etc.) that could cause an engine removal and identifies the workscope (from the Workscopes table) that is subsequently triggered. The WorkscopeResetMap table specifies which Weibulls are reset when a particular workscope is completed and the engine leaves the shop. The Weibull for a component is reset by setting the ECSV for the component to 0.

The flow of how the tables are used in a simulation is as follows. First, an engine shop visit is triggered by a particular damage mode. This damage mode is used to identify the workscope to be completed (using the WorkscopeFailureMap). The turn-around-time and cost for the shop visit are specified (using the Workscopes table) and the engine remains in the shop for the specified TAT duration. Upon leaving the shop (into the spares pool), the appropriate weibulls are reset (using the WorkscopesResetMap).

WORKSCOPE ANALYZER (WSA) APPROACH. The WSA implementation involves defining mappings between the native rules-based approach input tables and required WSA inputs, and then calling WSA as an external module. The WSA approach may have a large set of predefined workscopes (e.g., that were determined by the WSA team in consultation with the shops) that are maintained in a database (e.g., along with the average costs and turn-around-time for each of those workscopes) that is called from the WSA algorithm. These workscopes are often more extensive in number than those that might be defined by a CPM, and are specified via input tables. In addition, in order to reduce the problem size, the WSA algorithm relies on groupings of the failure modes (rather than considering each individual weibulls or LLP) to determine the workscope to be performed. This requires a mapping between the damage modes to those "grouped damaged modes" that are used by WSA. During the simulation, as an engine failure occurs, it creates the necessary WSA inputs, runs the WSA as an external module, and then receives the recommended workscope from the WSA algorithm. The simulation then processes the shop visit (using the recommended workscope) in the same manner as any other shop visit.

The WSAParameter input table that defines the WSA run-time parameters that are passed to the WSA module during the external call. These parameters are required by WSA and define how the WSA algorithm is run and how it behaves. The Workscopes table may be completed with the additional workscopes defined by WSA (and the flag is set to TRUE, indicating it is used by WSA, and not the native rules-based approach). Only the workscopes flagged TRUE are passed to WSA. This table is provided by the WSA team for the specific engine platform. The WSAAVorkscopeFailure map lists the WSA damage modes that could cause an engine removal and identifies the WSA-specific workscope that is subsequently triggered. This is the analog to the WorkscopeFailureMap. The WSA algorithm may interpret this as the minimum workscope that will be considered, and it is likely to propose additional workscopes as part of the optimization.

The WSASimulatorDriverMap table defines the mapping between the individual damage modes to the "WSA damage modes". Some of the modes map 1-to-1 (for example, the "Weibull Combustor" mode maps to the WSA "Combustor" mode), while others are grouped (for example, the "LLP Booster Spool", "Fan Forward Shaft", and "Fan Rotor" all map to the WSA "LLP Fan" grouped damage mode). This mapping must be provided by the WSA team and is necessary since, as described earlier, the WSA algorithm uses groupings of damage modes defined specifically for WSA. The WorkscopeResetMap table is populated with the WSA specific information. This table is used in the same manner as described earlier to determine which WSA damage modes need to be reset.

In example embodiments, the flow of how the tables are used in a simulation is as follows. First, an engine shop visit is triggered by a particular damage mode. This damage mode is used to identify the workscope to be completed (using the WorkscopeFaiiureMap). The turn—around-time and cost for the shop visit are specified (using the Workscopes table) and the engine remains in the shop for the specified TAT duration. Upon leaving the shop (into the spares pool), the appropriate Weibulls are reset (using the WorkscopesResetMap).

In example embodiments, the flow of how WSA is used when integrated into the simulation is as follows. First, an engine shop visit is triggered by a specific damage mode. This damage mode is mapped to the appropriate WSA-specific damage mode (using the WSASimulatorDriverMap) and the WSA inputs are passed to the WSA algorithm, WSA is called externally, and returns the workscope that should be performed. The turn-around-time and cost for the shop visit are specified (using the Workscopes table) and the engine remains in the shop for the specified TAT duration. Upon leaving the shop (into the spares pool), the WSA-specific damage modes that; need to be reset are specified (using the WorkscopesResetMap). These are then mapped back to the base Weibulls that need to be reset (using the WSASimulatorDriverMap).

SHOP VISIT SCHEDULE MODULE. The shop visit schedule module is intended to model the situation where an engine can be sent to multiple shops, and there is a desire to level-load engine maintenance across the shops, or to identify potential bottlenecks that would delay an engine servicing. In example embodiments, it may be assumed, that the engine being removed can be immediately processed by the shops. This module is agnostic to whether the rules-based or WSA approach is used to determine the workscope.

SHOP VISIT COST MODULE. Tins module is intended to model the costs associated with the specific shop visit so that total costs can be accumulated over the life of the simulation. In example embodiments, input values for each workscope are specified. The module determines the cost value for a specific shop determines the different shops available with a cost multiplier to complete the same workscope completed at each shop. This allows more accurate assessment of the costs of the shop visits for contracts where the engines might end up in different shops around the world.

TURN-AROUND-TIME (TAT) MODULE. The TAT module is intended to model the wing-to-spares-pool time (e.g., the elapsed time, in days, it takes to remove an engine from the aircraft to its subsequent placement in the spares pool). This module is heavily influenced by the shop visit schedules and any potential bottlenecks occurring. In example embodiments, the simulation defines the turn-around-time for each different workscope instead of an "average" shop-visit turn-around time for all workscopes. Similar to the shop costs, the intent is to allow the user to specify a multiplier on the turn-around-time for each shop in order to take into account different transportation times and shop productivities.

WORKSCOPE-BASED PERFORMANCE UPDATE MODULE. This module is configured to update the engine fuel-burn performance based on the workscope completed.

SPARES POOL MODULE. This module represents the spares pool of engines that is typically contractually maintained under a CSA agreement. These engines are used to replace engines that are coming off-wing in-order for the aircraft to continue flying. In practice, if there are no more spare engines available, then provider may be obligated to procure a lease engine from the market to install on the aircraft. In example embodiments, the spares pool is essentially a first-in, first-out queue with engines coming into the spares pool from the shops (as they are repaired) and then assigned to the next aircraft requiring an engine. In example embodiments, more advanced logic intelligently assigns engines to aircraft based on engine-pairing, anticipated future flights, or other logic.

LEASE POOL MODULE. The lease pool module represents the market availability of lease engines for use in-ease the spares pool is exhausted. If an aircraft requires an engine, and the spares pool is exhausted, then a leased engine is installed on the aircraft. The simulation keeps track of the number of leased engines, as well as the leased engine days so that lease costs can be calculated. In example embodiments, a maximum size to the lease pool is provided. In this case, aircraft will remain grounded if the lease pool is exhausted. Logic is introduced to manage the lease pool, as well as the impact to the flight schedule with grounded aircraft.

As depicted in FIG. 3, the system 300 depicts the criteria module 355 as deployed in a networked system 330. The networked system 330 may provide server-side functionality, via a network 301 (e.g., the Internet or Wide Area Network (WAN)) to one or more clients. FIG. 3 illustrates, for example, one or more client machine(s) 320. The one or more client machine(s) 320 may each execute one or more client application(s) 322, such as a web client (e.g., a browser, such as the Internet Explorer browser developed by Microsoft Corporation of Redmond, Wash.) or a programmatic client. Each of the one or more client applications may include one or more modules (e.g., a plug-in, add-in, or macro) that adds a specific service or feature to a larger system.

Within the networked, system 330, one or more servers (e.g., an API server or a web server) are coupled to, and provide programmatic or web interfaces respectively to, one or more application server(s) 340. The application servers 340 may host one or more applications or modules, such as the criteria module 355 described herein. The application servers 340 are, in turn, shown to be coupled to one or more databases servers 360 tbat facilitate access to one or more databases or NoSQL or non-relational data stores 365.

While the system 300 shown in FIG. 3 employs a client-server architecture, various embodiments are, of course, not limited to such an architecture, and could equally well find application in a distributed, or peer-to-peer, architecture system, for example. The various applications could also be implemented as standalone software programs, which do not necessarily have computer networking capabilities. Additionally, it will be readily apparent to one skilled in the art that machines 320 and 330, as well as client applications 320 and server applications may be coupled to multiple additional networked systems.

Figure 4:
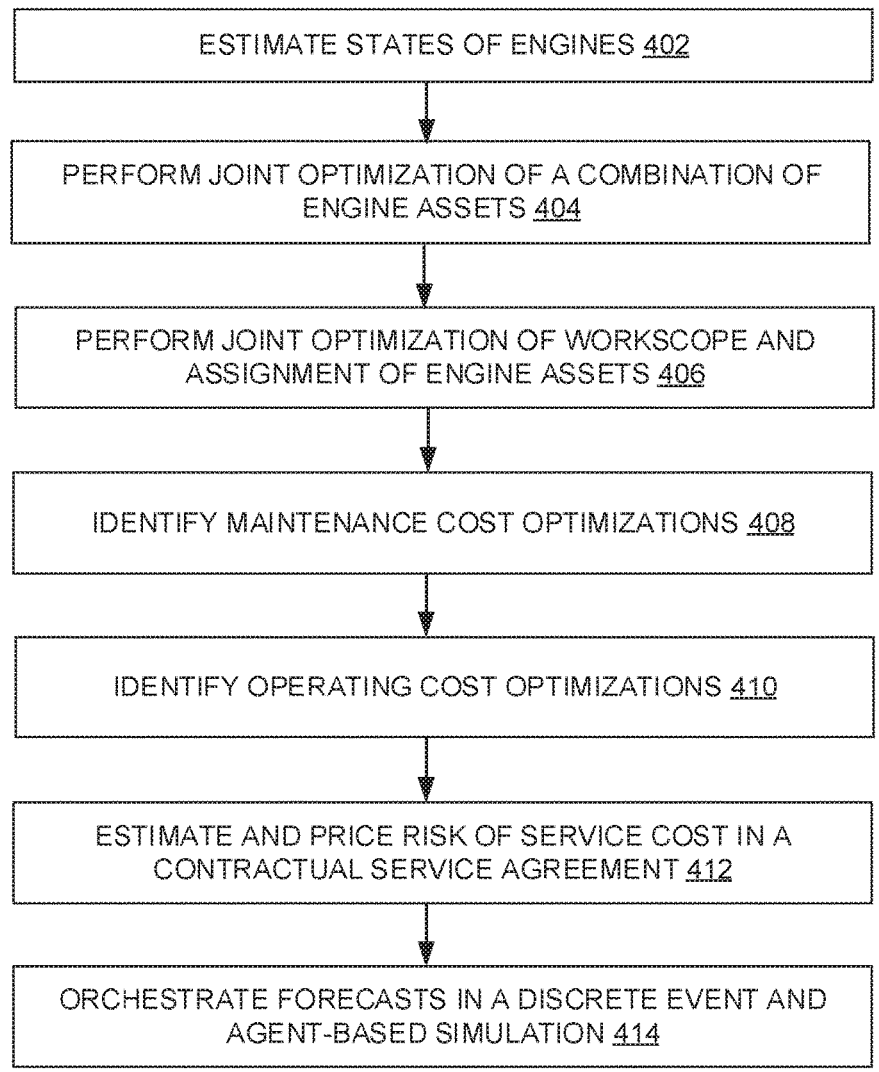
FIG. 4 is a flow chart of an example method of optimizing operations using a digital twin system.

FIG. 4 is a flowchart of an example method 400 for computing operations optimization. A service provider 191 achieves optimization gains in internal operations such as, for example, CSA risk reduction, CSA cost reduction, CSA revenue price setting and enhancement, especially with respect to risk and the identification of new product introduction opportunities for design as well as for selling modifications and uprates to a customer. For a customer 190, the gains include more reliable and profitable assignment of assets to certain duty cycles or routes, best assets to keep in the operating portfolio versus being scrapped, sold, parted out and the optimal dynamic in service control and asset operation. At operation 402, states of engines are estimated (e.g., based on simulations, including digital twin modeling, as described herein). At operation 404, a joint optimization of a combination of engine assets is performed. At operation 406, a joint optimization of workscope and assignment of engine assets is performed. At operation 408, maintenance cost optimizations are identified (e.g., based on application of the models and joint optimizations). As operation 410, operating cost optimizations are identified. At operation 412, price risk of service cost is estimated (e.g., for calculation of terms of a contractual service agreement). At operation 414, forecasts pertaining to the optimizations are included in a discrete event and agent-based simulation, as described herein. In example embodiments, various models are employed in identifying the optimizations and performing the joint optimizations, including customer key performance indicator model, customer operations model, customer financial model, service-provider contractual model, service-provider risk/return model, and design and operations co-optimization models, as described herein.

Figure 5:
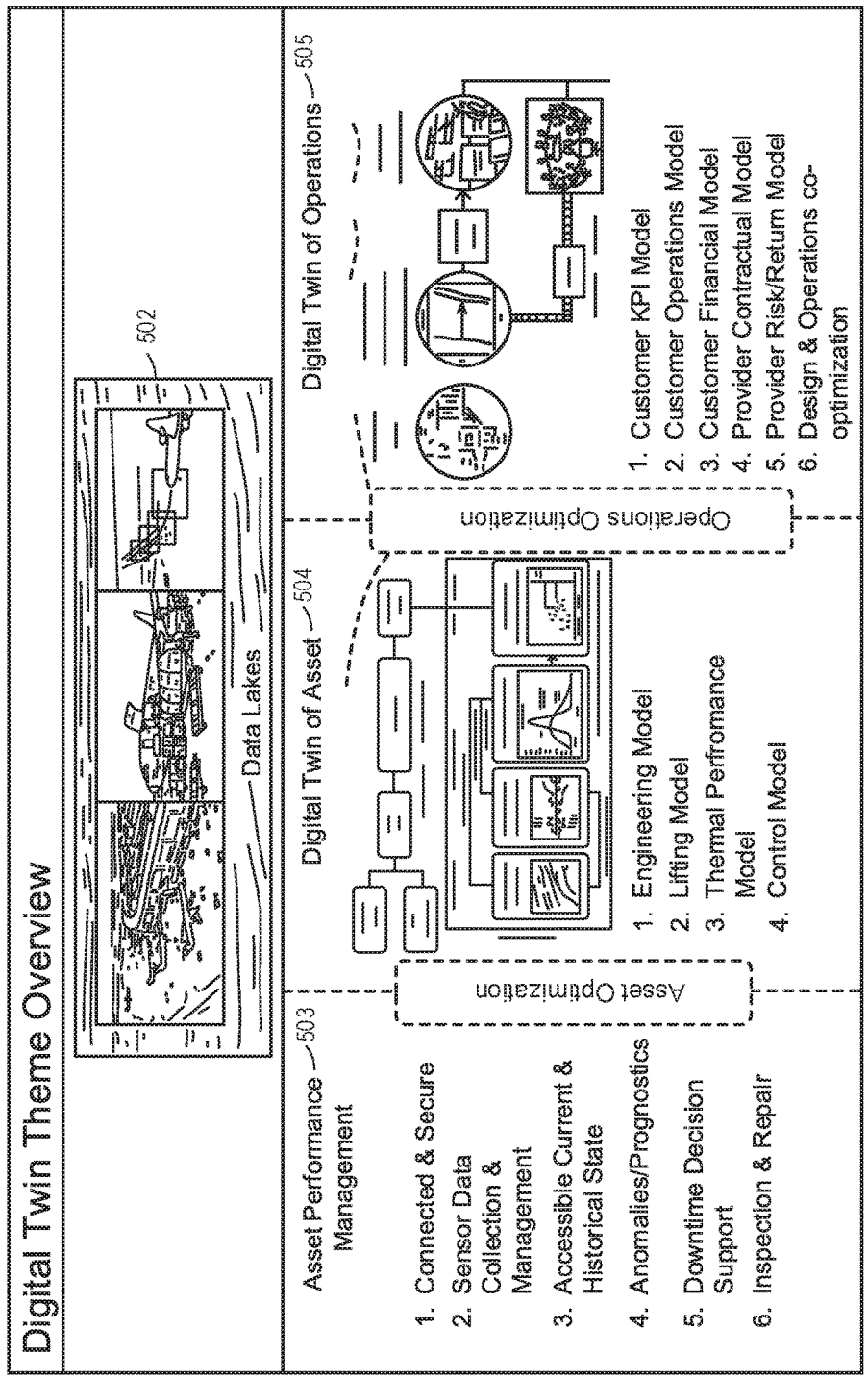
FIG. 5 is a block diagram depicting data and analytical system relationships for asset and operations state control.

FIG. 5 is a block diagram depicting data and analytical system relationships for asset and operations state control. As depicted, digital twins are created and maintained within the system corresponding to state estimation 504, operations 505 and prognostics or anomaly detection 503. Through simulation of operations of assets over time periods using the digital twins, as described herein, asset optimizations and operations optimizations may be identified. Where the states of assets 504 are purposefully controlled by and for the benefit of operations 505.

Figure 6:
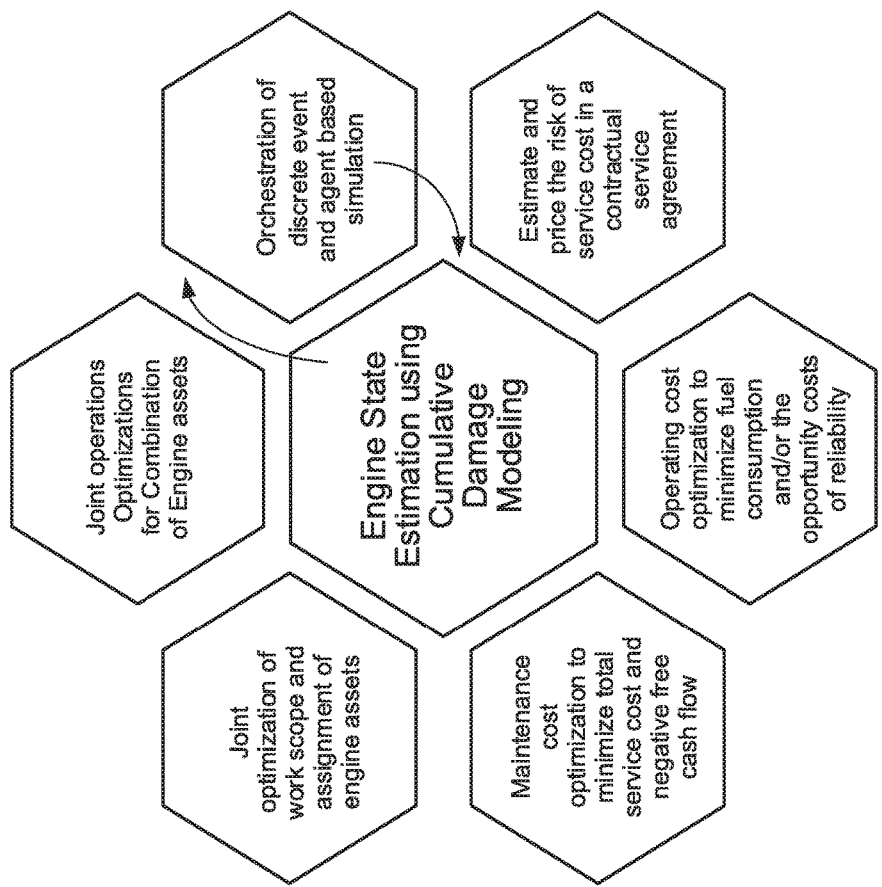
FIG. 6 is a block diagram depicting one or more concurrent physical and business system stale control optimizations and centralized simulation based orchestration.

FIG. 6 is a block diagram depicting one or more concurrent physical and business system state control optimizations and centralized simulation based orchestration.

Figure 7:
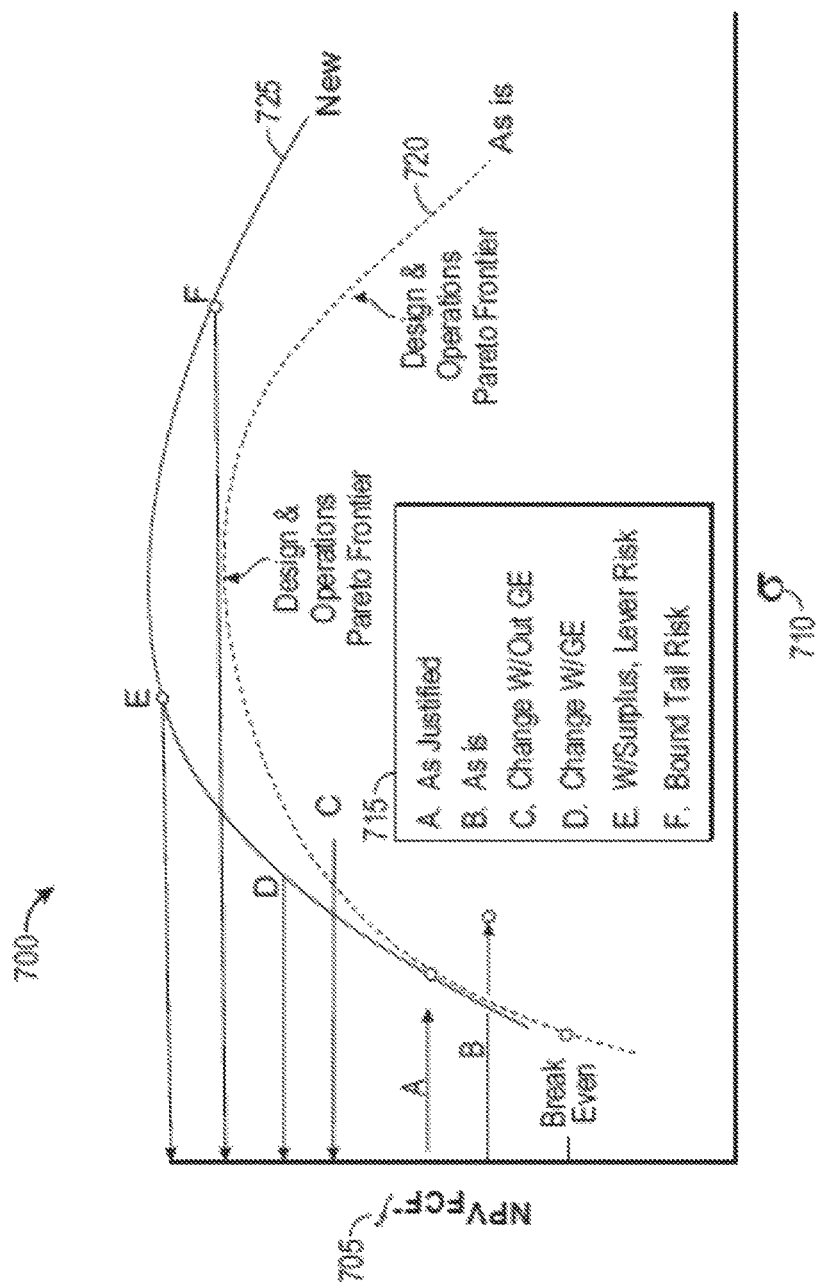
FIG. 7 is a graph depicting stakeholder risk and return preference and an available pareto frontier at one or more intervals of time.

FIG. 7 is a stakeholder risk and return preference and an available pareto frontier at one or more intervals of time to which the control system is optimally causing state changes of physical assets to achieve. It includes a framework illustrating the performance of an industrial system relative to system one or more stakeholder preferences with respect to the ratio of financial or operational risk and return relationships or other relationships such as an operations result with respect to the system's variance of that performance indicator. The risk and value management framework displays aspects of the performance of an industrial system relative to the preferences of the system owners and the entitlement of those industrial systems to change their risk and return relationships. Two dimensions are displayed in the graph 700. A first dimension represents the net present value (NPV) 705 of the free cash flows (FCFs) discounted at a risk-free interest rate over the economic optimization forecast interval. This NPV 705 is calculated via a pro forma whose assumptions are being provided by the system of systems simulation. The second dimension is variation 710. This variation 710 represents the periodic differences of the free cash flows of the industrial system.

In the graph 700, two curves are depicted that describe or frame the financial entitlement that may be enabled by aspects of the disclosed inventive subject matter. A first curve describes the "as-is" or base case 720 Pareto frontier of risk and return relationships for the given industrial system as it is currently designed, operated, or constrained. The second curve signifies the "could be" or "to be" 725 Pareto frontier, whose improved capacity to generate higher economic returns at a given level of risk than the base case 720 is enabled with new design and operations capability, as determined by the simulation and optimization operations described above, such as those associated with the simulator/optimizer 200 of FIG. 2. Generally, a Pareto frontier may identify a set or range of parameter values representing an optimized result (e.g., in this case, NPV 705) for a given set of constraints.

Overall, six different risk-and-return relationships are plotted in FIG. 7, although more or fewer such relationships may be plotted m other examples. These relationships are significant indicator points with respect to achieving the financial objectives and risk tolerances of the owners of the industrial assets. Point A is the economic return, and the risk to achieving that return, of the original industrial system justification. Point B denotes a current state of the system which, in the example illustrated has a lower NPV than the justified, system and incurs more variation or risk associated with this state, and thus is not as economically vital as the system is capable of being. Such higher risk and/or lower return may be a result of an exogenous condition, such as a competitor or a technology substitute or perhaps as a result of its design and operation in the current or forecasted exogenous conditions or as a result of the operators of the industrial system not running the industrial system to its designated policy. This diminished state may also exist because the industrial system has not been beneficially re-engineered and optimized, as is possible via the simulator/optimizer 200 of FIG. 2. Point C is a new economic operating point that is perhaps achievable without the disclosed system, if there were manual co-optimization. Point D represents a beneficial change to the system that is compatible with the owner's risk/return preference that may be achievable via the ability of the simulator/optimizer 200 to find optimal design and operating policy points. Point E is a point of risk and return available for owners that are willing to experience periodic cash flow swings resulting from taking on more operational risk. The incremental resulting NPV creation may be a means to create a surplus that may then be invested, into the system in a given operating period or over a sequence of operating periods spanning years. Alternatively, financing or cash outlay may be employed to migrate the system to higher returns for a given level of risk. Point F is a theoretical point which is established as a cap to loss. The simulator/optimizer 200 may enable this point's Put Option value to be calculated. A beneficial aspect of the simulator/optimizer 200 may be that a single customer may experience excessive risk and is willing to hedge that risk, while the OEM offering services solutions and controlling for their contracted performance outcome using the disclosed method and system may pool this risk amongst a portfolio of assets, thus providing a real option value to up-rate the assets in some way to reduce risk.

Figure 8A:
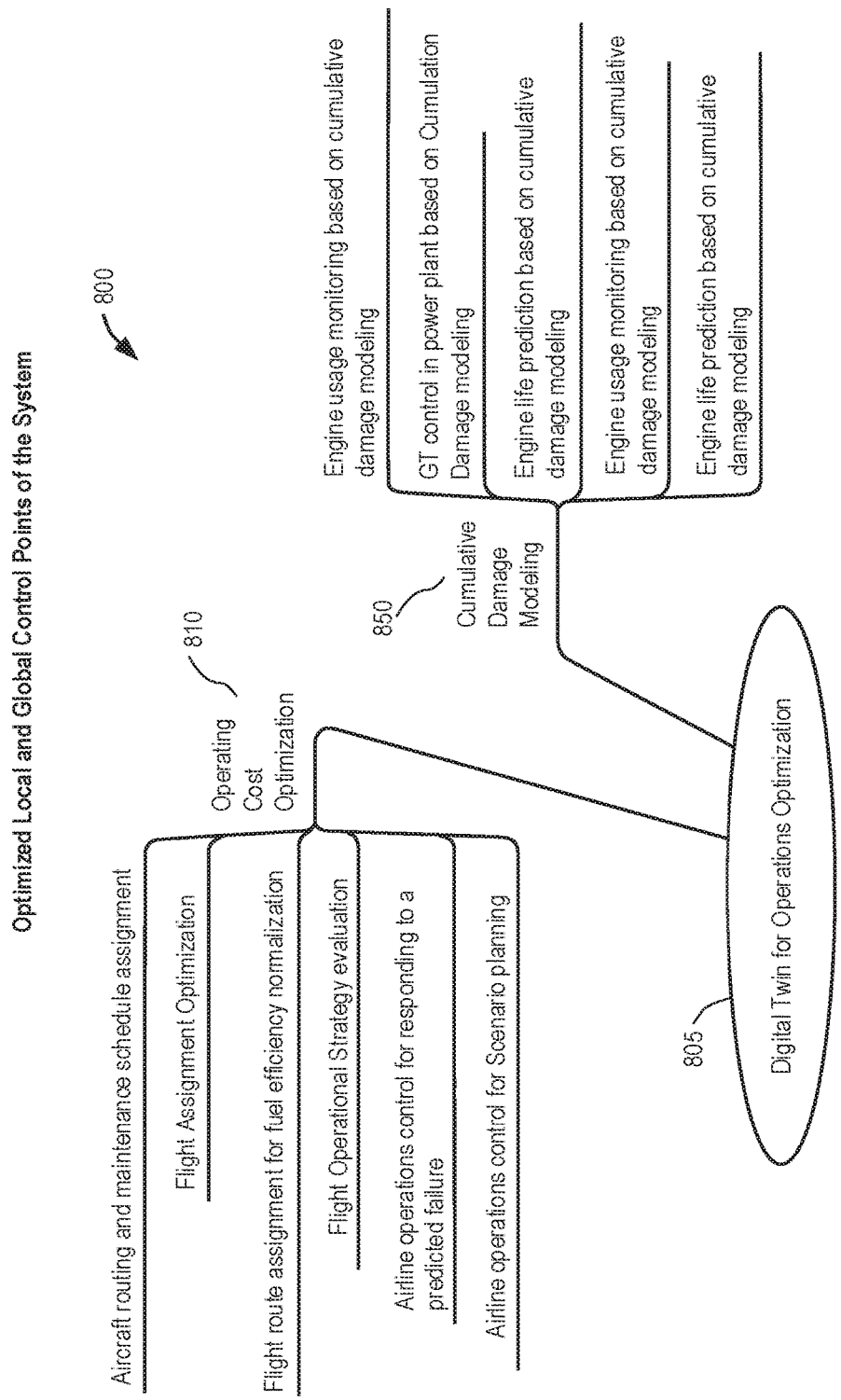
FIGS. 8A-8C are flow diagrams of local and global control points of an example industrial system.

FIG. 8A provides a local and global control point representation 800 of the Digital Twin Operations Optimization system, depicted in its industrial state control computing system 805 embodiment, using exemplars in the Aviation and Power domains. Local asset assignment and scheduling operating decisions 810 are optimally calculated 805 by the disclosed system. The physical states of the industrial system components that are being measured, automatically estimated, and adaptively controlled through time 850 by assigning their operations will enable the achievement of desired life, reliability, maintenance workscope that is a function of life or as a function of higher level KPIs that are optimized for objectives such as shop and production control, fulfilment, used serviceable inventory repair and stocking. The interaction effects of the system 805 reach into the thousands and cannot be computed or traded off by humans or current analytical methods of the prior art such as spreadsheets, mathematical packages, Enterprise Resource Planners.

Figure 8B:
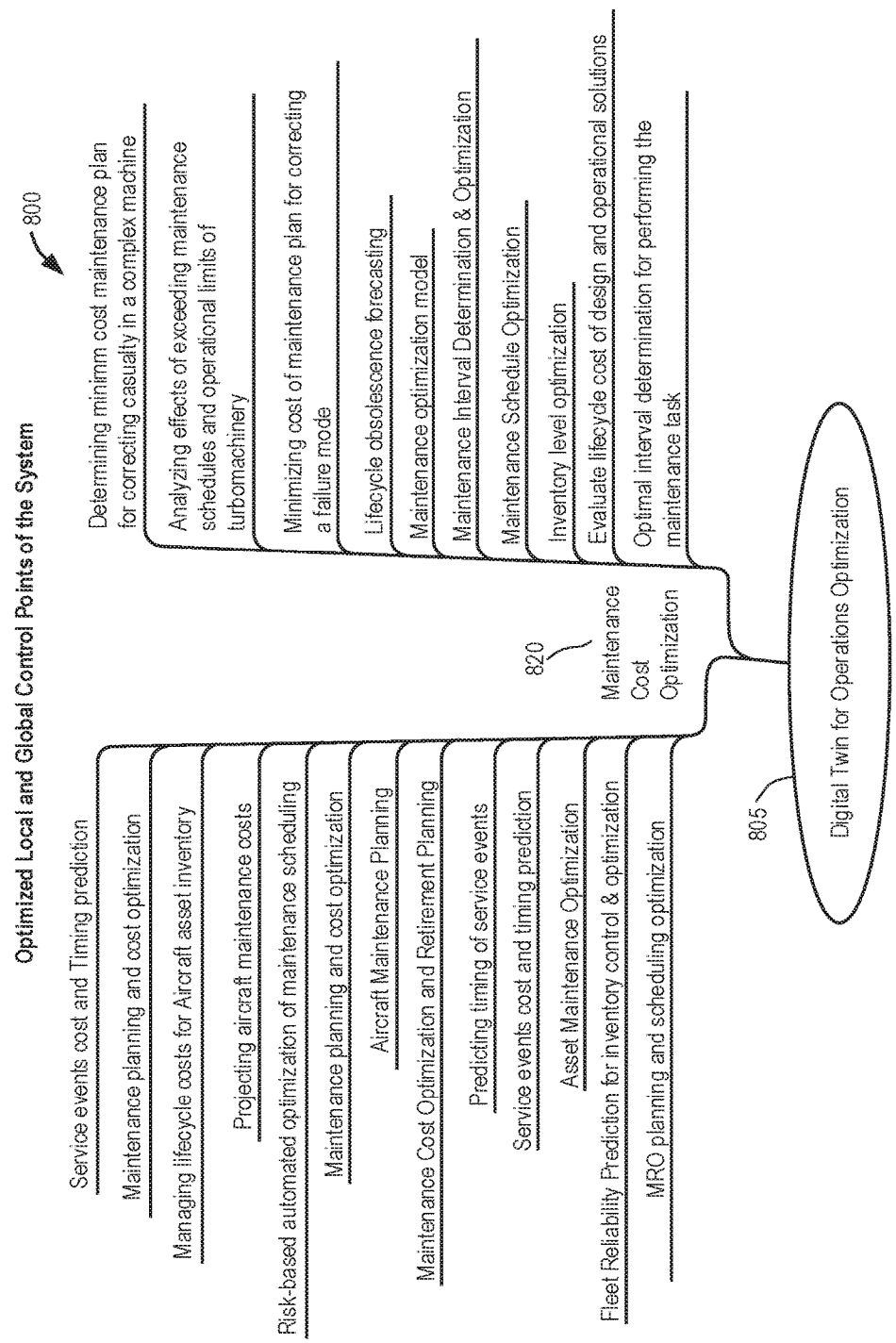

FIG. 8B is a representation 800 of optimized maintenance factors 820 which are enabled by controlling the states of the industrial system with the disclosed system 805. These planning and optimized aspects are individually and jointly simulated to calculate the interaction effects and then optimized over with replications by the Digital Twin Operations Optimization computing control system. These planning and optimizations have dynamic and temporal interdependencies which are now computed 805. For example, the tradeoffs through time of certain duty assignments in the present against a combination of service scope, timing, environmental operating limits, local and central inventory stocking by type or remaining useful life in a givers part or system. The combinations of factors and interactions are not calculable by humans or the business tools of the prior art.

Figure 8C:
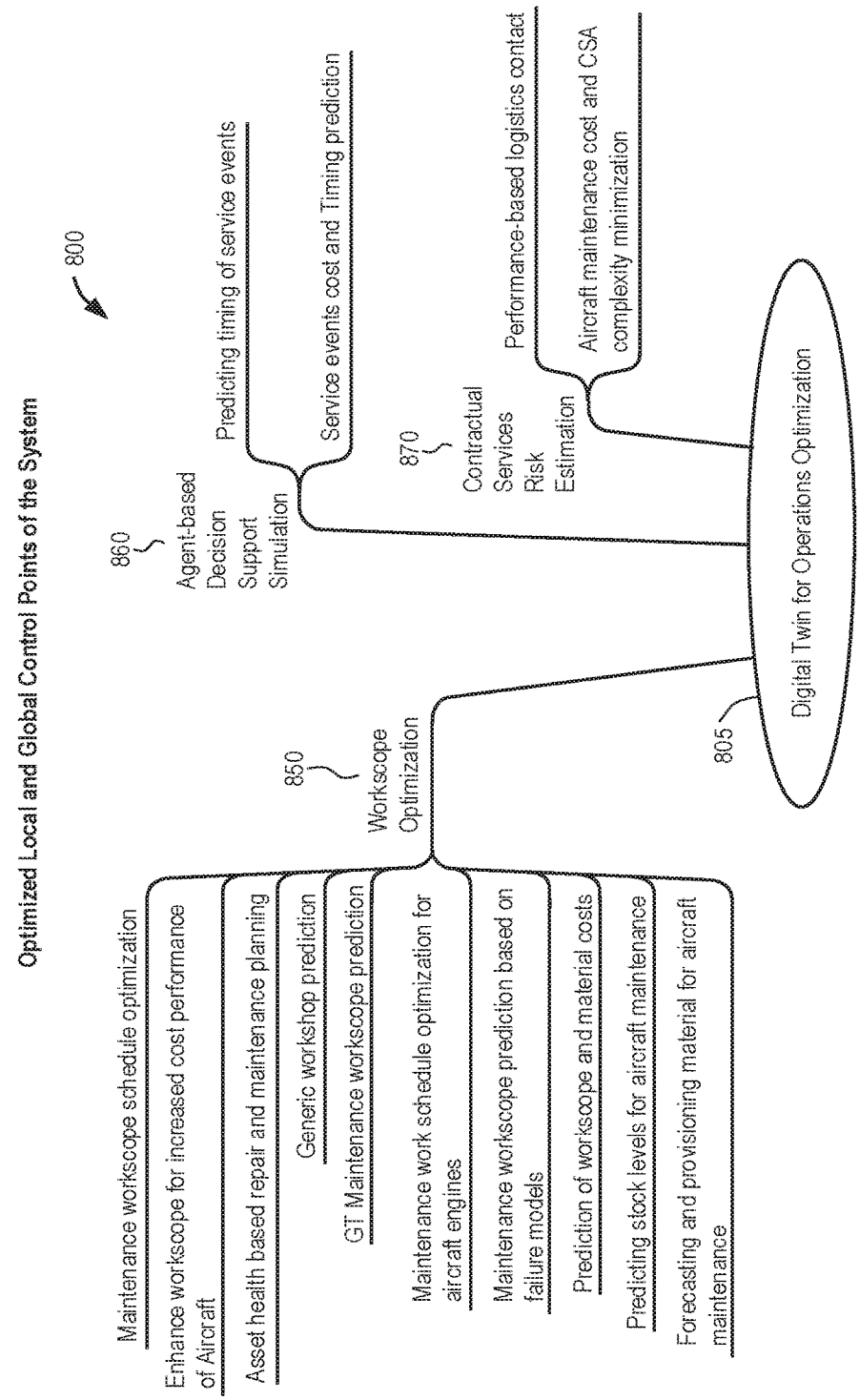

FIG. 8C is a representation 800 of local and global control points in the computing control system 805. Interacting dynamical workscope specification 850 calculated with discrete event simulation controlled automated decision support interacts with agent based simulation 860 and performance risked based contract terms.

In some examples, the human-machine interaction tiles of the system 805 may be configurable so that particular key process indicators of the industrial system and its operating and service processes may be presented and easily understood. In some instances, the changes which are available to be made in the industrial system result in no change to the key process indicators from the base case to the optimal new case. Along other dimensions, the industrial system may be improved wherein the base case is dominated by a new case or scenario that the simulator/optimizer 805 has discovered via simulating a virtual version of the industrial system physics based and data derived models and its many sub-processes and their decision support.

Figure 9:
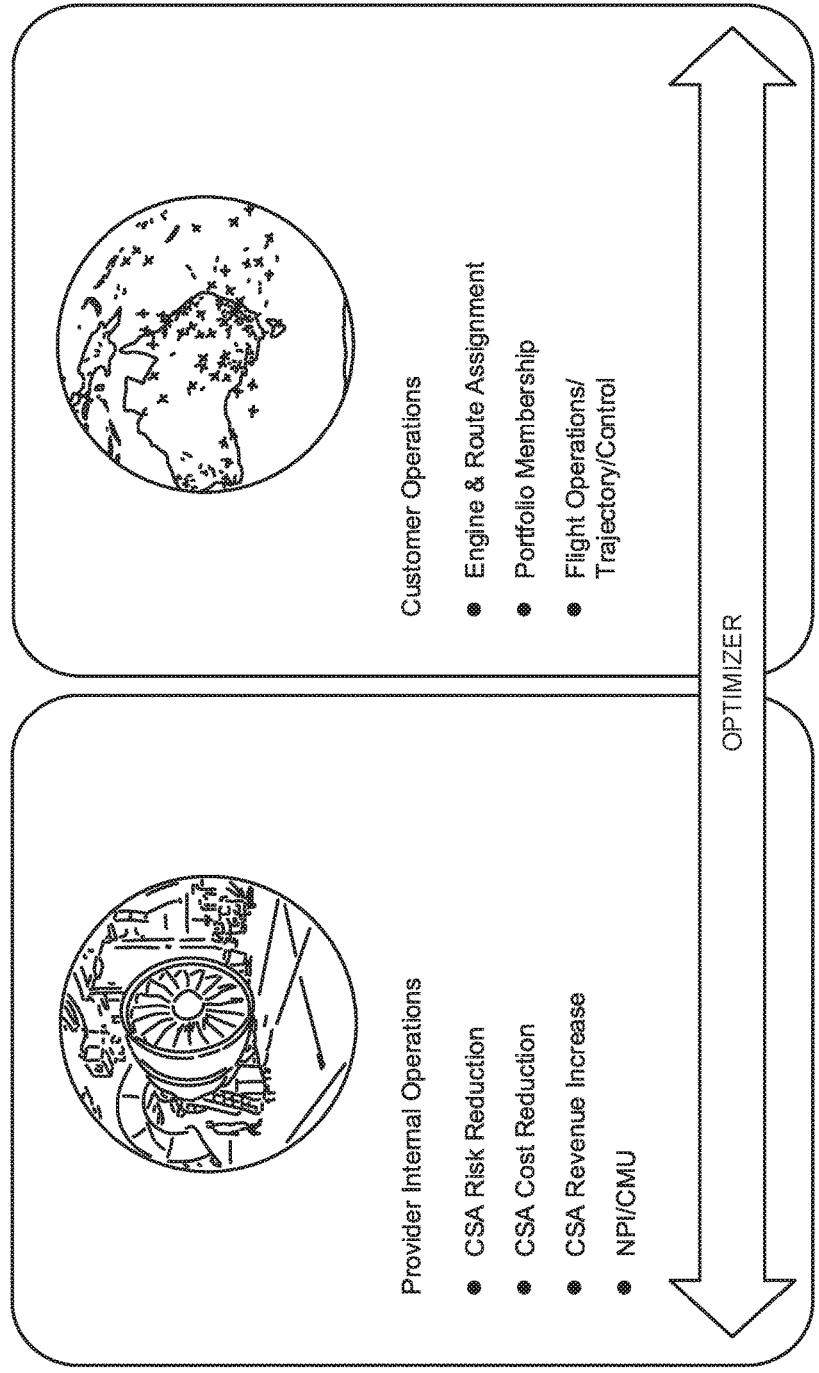
FIG. 9 is a relationship diagram depicting physical and business optimization of an example industrial system.

FIG. 9 is relationship diagram depicting physical and business optimization of an example industrial system. In example embodiments, the optimizations may relate to one or more of a physical design, an operational policy, and a control. Operations simulations using digital twins may identify operations optimizations that benefit both the service provider and the customer. The disclosed simulation based computing control jointly seeks both provider and customer benefits.

FIG. 10 is a graphical representation of the computing control engine for co-optimization of design and operations. An "as-is" estimation of the example embodiment in the aviation domain calculates fuel consumption. A work output is sensed or empirically observed or simulated to achieve, for example, a certain routing schedule or operate in a weather condition which is exogenous to the system's ability to directly control. A virtualized efficiency is calculated for a set of flight and maintenance events and prospective policies that are promulgated by the disclosed system. It can be appreciated that thousands of combinations of schedules, policies, events and contingencies are computed for the purpose of determining the dominant design and operation set points. In the example embodiment, factors being calculated and sought by the system or to which the system must be limited by or achieved are called bisectionally by the computing control system 805, such as, for example variable feel, fuel cost, service agreement cost, maintenance planning and the like. An actual 1001 may be compared to a calculated "entitlement" (eg, best possible or other operating objective) 1003 for a ratio of realized vs potential possible. The state of life or damage is informed to and dynamically controlled 1002 by the system. Asset scheduling and assignment activities 1004 are controlled by the system 805 to achieve a certain physical state or an operational objective. One mode is an automated control. Another is a means to assure a minimum performance threshold is met. Part and inventory 1005 stocking location, time and remaining useful life are calculated by the system 805 as a function of damage estimation 1002 in one mode and in another mode, the available parts and capacity limits inform the on-wing maintenance or flight policy control points. Financial calculations determine service revenue, risk, price and billing or other cash management means 1006. These are a component of system level optimization transfer functions or are themselves an objective that the state control system dynamically seeks with operating and maintenance assignments and policies.

Shop schedules by aircraft engine and scope 1007 are calculated by the system 805 to control cashflows 1006, operating factors 1004, flight and maintenance factors 1020 and schedules (severity and duration) in one embodiment. Alternatively, the operations and maintenance schedules may be automatically constrained by available capacity 1005 or parts or performance Routes (duty through time) may be assigned 1008 to achieve fuel consumption and rate of degradation. System level tradeoffs 1009 are calculated to shape service demand to optimally use shop capacity, schedules, inventory trade off, for example.

Figure 11:
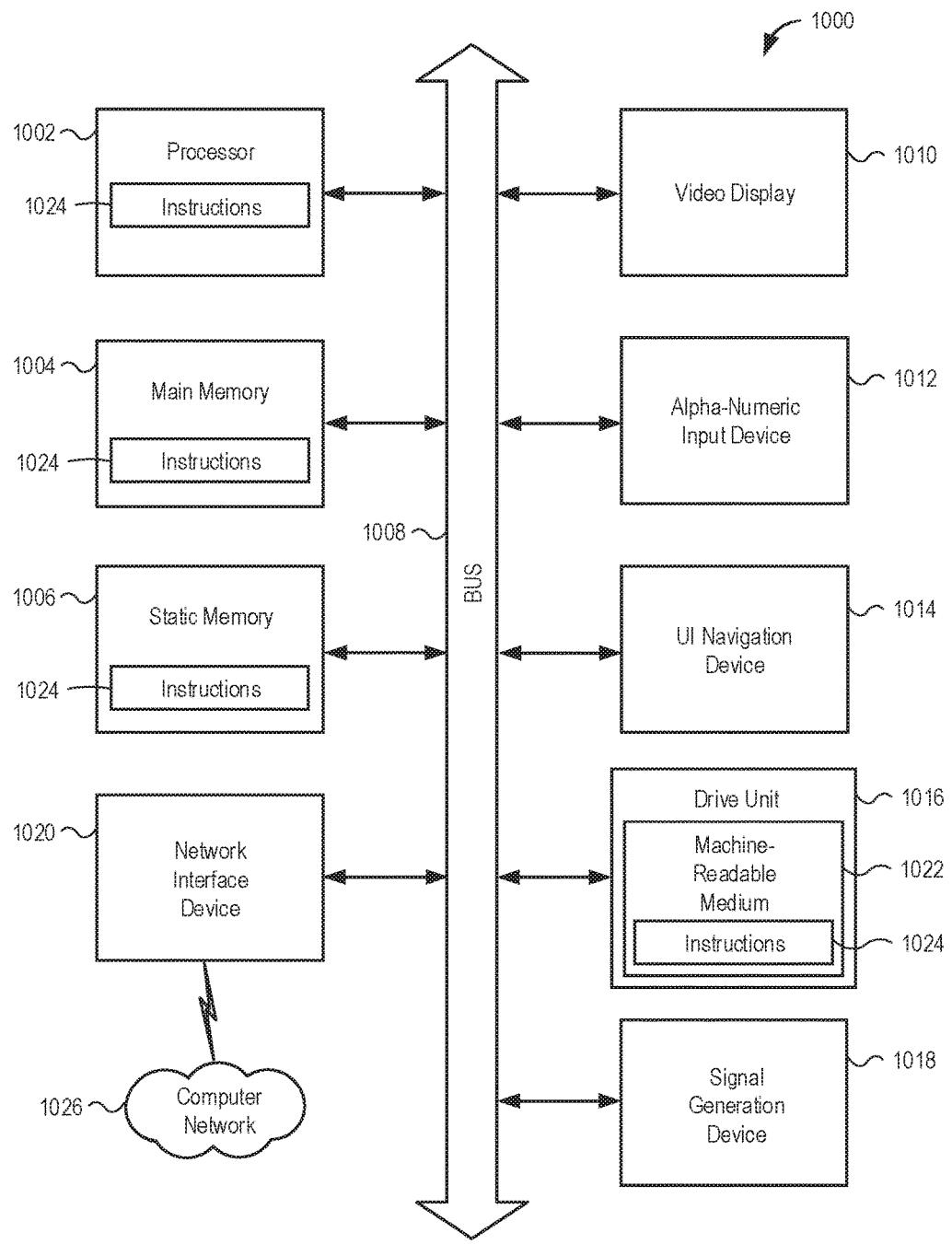
FIG. 11 is a block diagram of a machine in the example form of a processing system within which may be executed a set of instructions for causing the machine to perform any one or more of the methodologies discussed herein.

FIG. 11 depicts a block diagram of a machine in the example form of a processing system 1000 within which may be executed a set of instructions 1024 for causing the machine to perform any one or more of the methodologies discussed herein. In alternative embodiments, the machine operates as a standalone device or may be connected (e.g., networked) to other machines (e.g., in a cluster). In a networked deployment, the machine may operate in the capacity of a server or a client machine in a server-client network environment, or as a peer machine in a peer-to-peer (or distributed) network environment.

The machine is capable of executing a set of instructions 1024 (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1000 includes a processor 1002 (e.g., a central processing unit (CPU), a graphics processing unit (GPU), or both), a main memory 1004 (e.g., random access memory), and static memory 1006 (e.g., static random-access memory), which communicate with each other via bus 1008. The processing system 1000 may further include video display unit 1010 (e.g., a plasma display, a liquid crystal display (LCD), or a cathode ray tube (CRT)). The processing system 1000 also includes an alphanumeric input device 1012 (e.g., a keyboard), a user interface (UI) navigation device 1014 (e.g., a mouse), a disk drive unit 1016, a signal generation device 1018 (e.g., a speaker), and a network interface device 1020.

The disk drive unit 1016 (a type of non-volable memory storage) includes a machine-readable medium 1022 on which is stored one or more sets of data structures and instructions 1024 (e.g., software) embodying or utilized by any one or more of the methodologies or functions described herein. The data structures and instructions 1024 may also reside, completely or at least partially, within the main memory 1004, the static memory 1006, and/or the processor 1002 during execution thereof by processing system 1000, with the main memory 1004, the static memory 1006, and the processor 1002 also constituting machine-readable, tangible media.

The data structures and instructions 1024 may further be transmitted or received over a computer network 1050 via network interface device 1020 utilizing any one of a number of well-known transfer protocols (e.g., Hypertext Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner in example embodiments, one or more computer systems (e.g., the processing system 1000) or one or more hardware modules of a computer system (e.g., a processor 1002 or a group of processors) may be configured by software (e.g., an application or application portion) as a hardware module that operates to perform certain operations as described, herein.

In various embodiments, a hardware module may be implemented mechanically or electronically. For example, a hardware module may include dedicated circuitry or logic that is permanently configured (for example, as a special-purpose processor such as a field-programmable gate array (FPGA) or an application-specific integrated circuit (ASIC)) to perform certain operations. A hardware module may also include programmable logic or circuitry (for example, as encompassed within a general-purpose processor 1002 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be under-stood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time, for example, where the hardware modules include a general-purpose processor 1002 that is configured using software, the general-purpose processor 1002 may be configured as respective different hardware modules at different times. Software may accordingly configure the processor 1002, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output Modules may also initiate communications with input or output devices, and can operate on a resource (for example, a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1002 or processor-implemented modules. The performance of certain of the operations may be distributed among the one or more processors 1002, not only residing within a single machine but deployed across a number of machines. in some example embodiments, the processors 1002 may be located in a single location (e.g., within a home environment, within an office environment, or as a server farm), while m other embodiments, the processors 1002 may be distributed across a number of locations.

Figure 12:
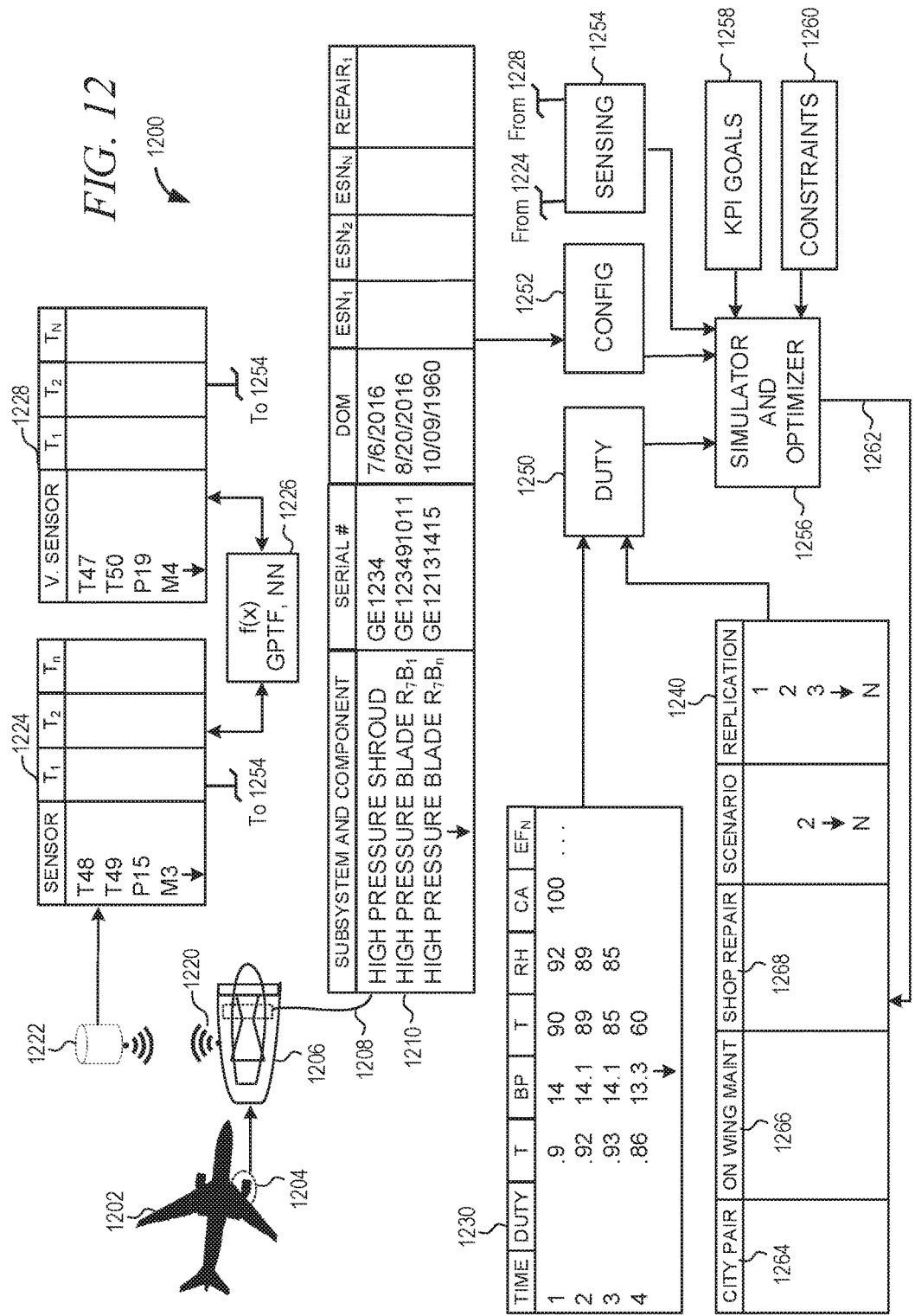
FIG. 12 is a block diagram of an assumptions schema for the constrained computational system.

FIG. 12 is a block diagram of an assumptions schema for the constrained computational system. The computing control system, which receives certain physical system sensing, simulates configurations, duty, assignments and schedules is outlined 1200 in a format to expand upon the data related to the control of the computing system with respect to the required specificity of control and the time constants for action. A second view 1300 will provide the logical control schema for the system computing.

An industrial system, such as a fleet of aircraft or an aircraft 1202 are comprised of subsystems such as its engines 1204 which in turn is comprised 1206 of sub systems such as components of the turbine 1208, for example combustors, stage 1 compressor blades, shrouds and other key components of the engine that most affect thermodynamic performance and asset availability and reliability. These components themselves may have subcomponents such as blades. A section of the engine 1208 is detailed 1210 with respect to specific bill of materials, serial numbers, manufacturing record, operating life configuration data such as what engine a given serial numbered part was flown in as a part of the engines from its original manufacture date to a first engine, to repair, to a second engine, to the next repair and so on. Related to those engine serial numbers (ESN), will be the actual realized flight data and quantitative damage. As the engine 1206 is operated, certain instrumented readings are communicated 1220 from the engine to a data store 1222 for processing in near real time and for longer cycle analysis.

Sensor data 1224 is time series in nature. Some engine component temperatures and pressures are not directly measured, but instead are reconciled using a model that represents the thermodynamic or operational physics of the industrial apparatus 1226. These models may be first principles in nature such as a heat balance or may be a surrogate model such as a neural net. The actual sensed data 1224 is used in conjunction with the model 1226 to determine what the non-directly sensed temperatures and pressures must be in order for the observed signals to be realized. Those calculated "virtual sensed" data 1228 is recorded for the purposes of physics based state estimation, for example, oxidation and degradation of a metal part at a certain temperature and atmospheric condition for a certain duration and load. The time steps of data acquisition or virtual sensing are configurable and are limited by communications rate 1220 or setting of the system, such as to record only changes in sensed values or to record at a time interval as a function of the rate of change of the sensed signals (record at shorter time differentials in the presence of dynamical transients). The record interval is set by the change in decision variable change which is meaningful for a given operation control change (where more precision or decision point sensitivity, more data at lower time intervals is needed). A heuristic may be used to set the data capture rates or a ROC with respect to a decision, as will be disclosed by 1300.

The ambient conditions that the assets and their subcomponents are exposed to are recorded 1230. For example, the temperatures and pressures that the engine and its parts have been exposed to. These data are used for duty cycle analysis 1250 and state change estimation.

Event data of actual realized observations and simulated future dispositions 1240 is recorded for the purposes of assumptions accuracy and for control point settings that the computing control provides. An example of a control point setting is one which is computed that, optimizes one or more key process indicators, the optimized setting being computed from an enumeration of scenarios (apparatus design and operation) and replication of scenarios so as to determine the KPIs and confidence interval which is most robust to changing exogenous factors such as the weather at a given airport or airline schedule for a given set of assets.

The duty cycle of the physical assets 1250, in the presently disclosed control system are comprised of observed and simulated forward ambient conditions, settings such as thrust and calculated parameters such as efficiency and events. The assets whose states are being controlled by the disclosed computing control system are exposed to this historical single profile that was realized as well as scenarios and replications of those scenarios for future potential operations. A most optimal future will be selected. The configuration 1252 of what component and part serial numbers are in what engines at a point in time is used in conjunction with a duty cycle scenario by the simulator and optimizer 1255 to compute candidate future duty assignments, service scopes, parts needs, contract management, airline performance with respect to asset utilization and variable expense such as fuel. The optimization seeks to achieve the operating goals 1258 as set forth by the user of the computing control system and the solutions are limited by the constraints imposed 1260 such as capital expense, schedule fulfillment, regulations and repair or operations policy. The operations simulation model and the state estimation models are compared with the sensed 1254 data and variation from the expected level vs actual (A/E Ratio or A/E) and the rate of change of those A/E cause control logic to alarm a drift or error in one embodiment and in another embodiment, are used to specify specific inspections to make on specific assets so as to true up the forecasted states and models with actual results. In this way, the computing control system does not propagate error and learns.

Ultimately the system provides an assignment 1262 control point to which the actual physical world then implements and thus consumes life and variable costs such as fuel. The then future physical system response to the state control is compared, an error signal is derived and the system adapts to achieve the KPI goals for that point in time.

The computing control system may sense and derive operational optimization however, the computing time or computing resources may not be unlimited, and thus, at times, a beneficial feature of the system is to match the time requirements and accuracy of the control action by dynamically managing the computing processes of the control system.

Figure 13:
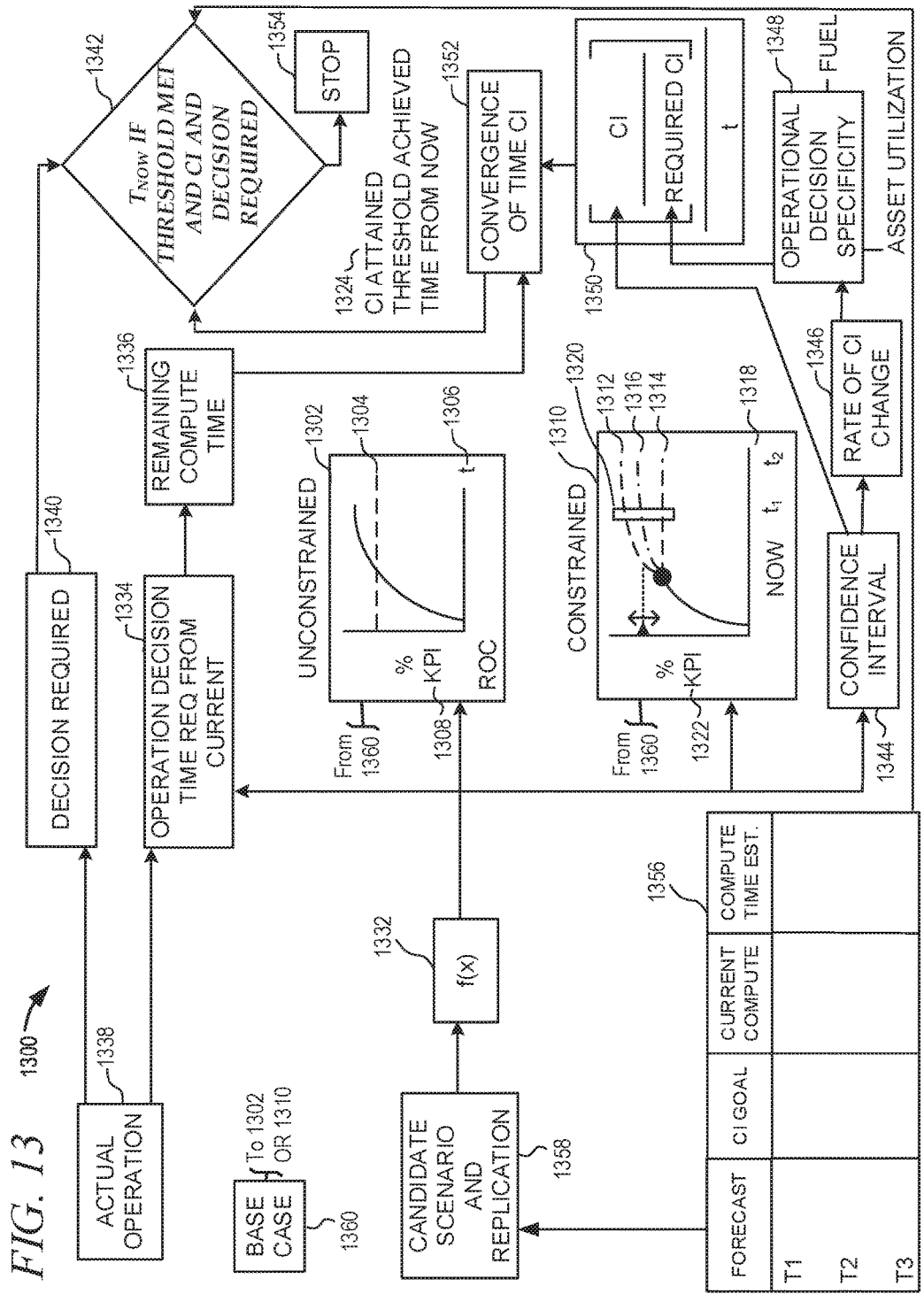
FIG. 13 is a block diagram of a constrained and unconstrained computational control system schema for estimation of thermodynamic performance and asset utilization.

FIG. 13 is a block diagram of a constrained and unconstrained computational control system schema for estimation of thermodynamic performance and asset utilization. The system to manage time and specificity for the operational decision optimization 1300 is disclosed. Two modes of computation are enabled—an unconstrained 1302 method and a constrained mechanism 1310. An unconstrained compute of scenarios and their replication has no time or computing resource limits on attaining specificity in a confidence interval over one or more future times. A KPI threshold 1304 is met for a given time fixture 1306 by running scenarios and replications 1332 until the return on the next computed scenario provides no added analytical value. There are few actual operations that benefit from a marginal specificity past some point, in which the decision or control provided by the system would not change with that added accuracy.

A beneficial feature of example embodiments is to automatically control the number of scenarios and confidence intervals for the range of operational decisions to be effected over one or more time horizons. The constraints imposed by time to effect the control action from the current time so that states of assets of the industrial system or the KPIs those states influence can be caused to occur within the time interval needed to make the change in the system. For example—if a schedule of a fleet of aircraft must be changed so as to assign certain aircraft (and their engines) to certain routes so that certain wear or life consumption patterns occur that benefit aspects of the industrial system such as maintenance or fuel consumption, spares level or asset utilization occur—and the window of effecting those assignments is, for example, 17 minutes from the present, the control points must be computed by that time interval. Scenarios evaluated and/or the confidence intervals at one or more future times of the apparatus states or the KPI outcomes may be constrained.

Consider a Relative Operating Characteristic (Receiver Operating Characteristic) ROC curve which is building as compute cycles occur for the system simulation and optimization. At a present time "now" 1318, the desired performance threshold of the system 1322 has not yet been attained. The threshold system performance is adjustable 1322 by the computing control system or the analyst using it. Forward time estimates of the one or more KPIs have an upper value 1320 and lower value 1314 forecast at a given probability, and an expected value 1316 at time T1, T2 or another time 1318. The probability density function of the forecasts may or may not be a normal distribution, and, given the nature of the coupled dynamic system being controlled, uses a simulation based approach for forecasting. A confidence interval 1320 is derived for times t. Adjustable parameters 1324 of CI attainment, threshold ROC achieved and compute time duration from now from which the decision is required 1338 do control the number and granularity of the scenarios and their replications for a decision or control 1340.

The computing control algorithms and processor(s) 1332, 1256 feed the operation decision time required from current 1334 and confidence interval 1334 for given time(s) 1318 future. The ROC improvement is comparative to a base case 1360. The simulation and optimization 1332, 1256 computing result from candidate scenarios and replications 1358 whose confidence interval goal, current compute time for a scenario replication, and compute time estimate for a set of scenarios and replications is stored in memory 1356. Presented scenarios for a forecast interval are provided to the simulation and optimization engine 1322. These are conditional and may be specified by the control logic 1342, according to the probability of meeting specificity, time duration and threshold set points.

The available time from the current by which a control action is required 1334 is compared to the remaining compute time 1336 (which is set by the time to compute a scenario and replication 1356) is compared. The compute must converge on both threshold and confidence in this time interval 1352.

The rate of change of the KPI outcome and state estimation confidence interval 1344 must meet the remaining available time 1352. A rate of change in CI 1346, derived by the change in KPI or state change rate 1310, is compared with the operational decision specificity 1348 for KPI outcomes such as fuel consumption and asset utilization assignment control. The rate of change of CI over the required CI 1350 is compared to the required convergence time 1352 and if adequate, additional scenarios and replications are released to the simulator—optimizer 1342, 1356. If the rate of thresholding is met 1322, 1310, then the compute resources are focused on reducing the CI 1320 at the specified time intervals 1318. Similarly, should the rate of threshold attainment not meet the convergence time allocated 1352, then replications are reduced and scenarios are evaluated instead. It can be appreciated that the sample durations and time steps of the simulation are similarly controlled.

Thus, in example embodiments, fuel consumption and asset lifting state changes are computed in response to a candidate duty cycle that differentially degrades engine performance according to those duty cycles. A flight schedule of an aircraft may be beneficially changed to reduce fuel costs and increase asset utilization associated with operating the aircraft, the recommendation based upon the disclosed computing state control system and comparisons of operations data collected from databases of multiple external computer systems corresponding to multiple fleets of aircraft associated with one or multiple customers. A computing control system beneficially simulates a set of physical apparatus through one or more time intervals and interacts with the service systems that interface with them, providing the historical duty cycles, routes, sensor signals, component and configuration identification, maintenance works cope, and other parameters of the system that result m enhanced operations for the owner or operator.

Operationally, in revenue service, it may be desirable to have a sufficient number of assets reliably available so that missions for which those assets exist to achieve can be fulfilled for the available demand. For example, it may be desirable for an airline to have sufficient aircraft available to serve its schedule. Yet these complicated industrial systems require maintenance and repair. And, in the case of machines with tight physical tolerances, high performance metals, a large number of parts and ancillary systems—maintenance and repair can require extensive shop activity with exacting and time consuming processes to bring complicated parts back into the desired physical state. For example, high performance metal parts may be cleaned, inspected and, if damage is found, either repaired or replaced. If these parts, which may be comprised of high performance alloys, do require repair, exacting and time consuming techniques may be used for metal addition, machining and testing. While these complex industrial systems are being maintained, they are not in service and spare assets must be used in order to keep the rest of the ecosystem in service. For example, spare engines can replace an engine being serviced. These spares may be capital intensive and thus may be limited in number for the enterprise to attain its profitability.

A beneficial aspect of the computing control system is to manage the states of the in-service and repair apparatuses that comprise the industrial systems such that; a balance between available spare parts, subsystems, primary systems, and ecosystems is achieved.

Figure 14:
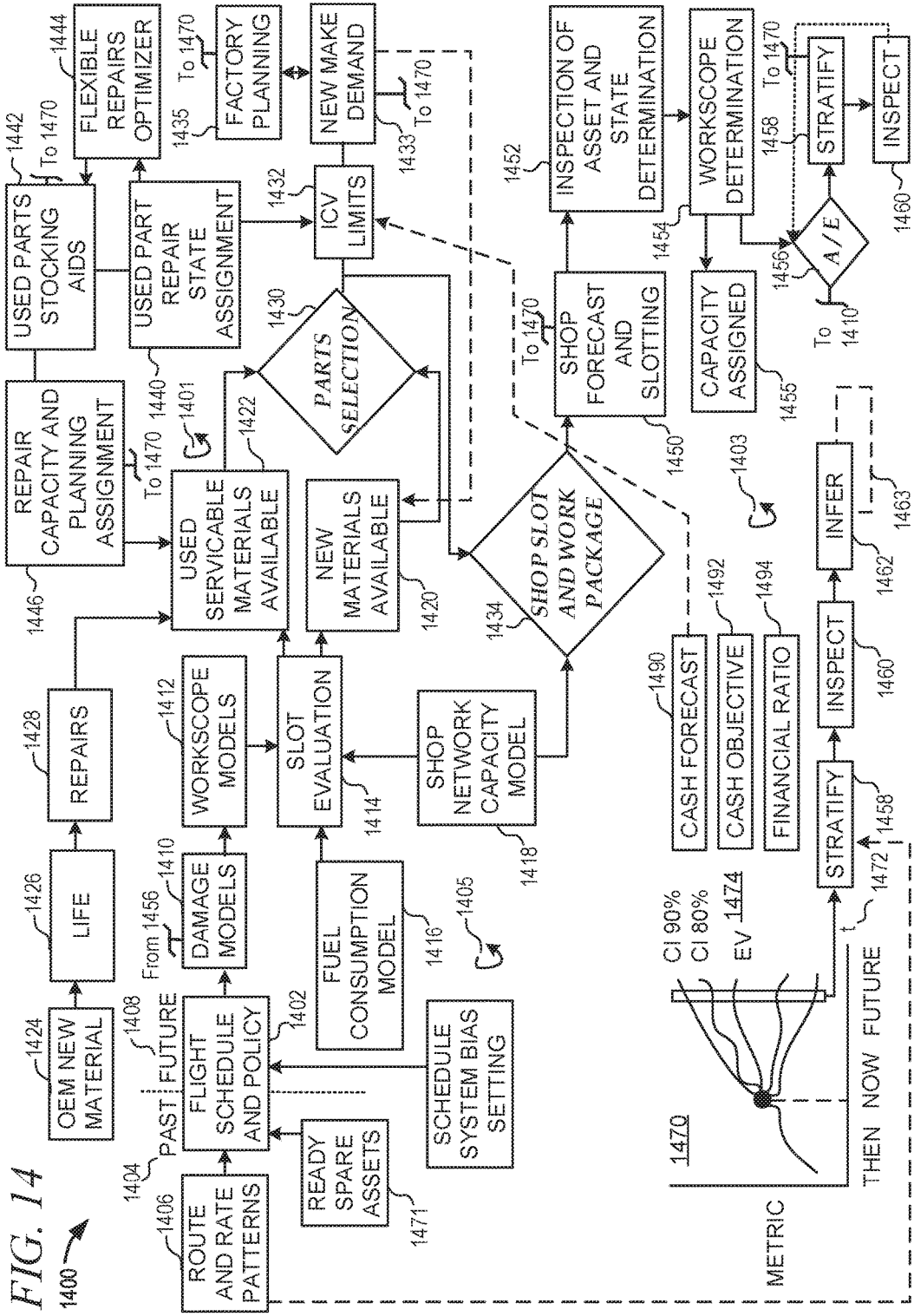
FIG. 14 is a block diagram of a constrained cash service system with inner optimizing feedback loops for repair parts stocking, state estimation feedback precision attainment and flight schedule assignment.

The computing control system determines when its forecast error exceeds a threshold that is insufficient to schedule repair parts and achieve the financial objectives of the maintenance and repair operations or contracted performance level in one or more time intervals. Upon detecting an indeterminate operating regime, specific physical inspections are identified that reduce the forecast error of asset damage in one or more time intervals. An example embodiment of this is depicted as control loops in FIG. 14 and FIG. 15.

The computing control system 1400 computes life consumption 1410 as a function of both 1402 actual past operating history 1404 and candidate future operations 1408. In the example embodiment of an aircraft engine asset as a component of an aircraft asset, the routes 1406 have city pairs, which, due to their different ambient conditions and characteristics of operations, such as the load on the aircraft or length of runway or ability to do on-wing activities, thus create differential life consumption of the engine subsystems. For example a hot and sandy environment consumes more life than cooler airports with particulate free air and lower passenger and/or feel loads or longer runways. The allocation of aircraft to routes 1405 can be made in such a way as to cause the wear or remaining life of the engine to take a certain duration with respect to other engines in a fleet in such a way as to change the service work scope 1412 at one or more points in time so that available capacity 1418 (as computed by a shop scheduling module) in the service operations can be slotted or reserved 1414. The lack of engine performance with respect to its efficiency as calculated by a fuel consumption model 1416 may also create the need for repair. Whether the repairs are for one or both of physical damage or thermodynamic efficiency, the engines and their work scopes are evaluated 1414 singularly and amongst the other engines for assigning to a service opening or slot. Alternatively, to achieve a KPI such as having engine spares 1471, the work scopes 1412 may be modified so that shop network capacity 1418 is configured for a shorter repair turnaround time, stocking certain inventory 1420, 1422 to avoid delay and thus placing more engines into the spares pool.

Associated with a given work scope and shop slot are requisite repair parts and shop work station repair resources that; must be consumed to affect a repair. On one extreme, with no inventory held in advance of the repair, a complicated and lengthy process of materials ordering would ensue and the engine would not be available for revenue service by nature of it being in the shop. On another extreme is holding every possible repair component such that, no matter the repair, parts are available and repair resources are at the ready, on demand. The former instance has a high opportunity cost for assets not being in service. The latter is expensive to support the inventory carrying value of. In example embodiments, the control system computes work scope, time, parts assignments in advance of the repair so as to balance out turnaround time and inventory carrying cost.

For each candidate engine and engine repair, an estimate of used serviceable spares 1422 and new materials 1420 is made. Typically a repaired part or used part is lower cost than a new part. For each time interval of potential service demand 1414, the inventory of used and new parts is assessed. A used part was once a new part 1424 which was exposed to operating service 1426 that in turn experienced repairs 1428. The level of available repaired parts 1422 is a decision choice in the control system. The state of the available repaired parts is likewise a choice. For example an unrepaired or refurbished part may be stocked or a fully restored part may be stocked. The parts selection 1430 is a function of the existing damage, contracted work scope and duty cycle between the current shop visit and a future shop visit. The amount of capital tied up in inventory, be it new or repaired, is compared to a limit 1432.

According to the parts required 1430, and subject to the carrying cost limits 1432, used parts and their state of repair requirements 1440 are made. Used parts may be stocked 'as-is' or repaired 1442 so as to have a portfolio of materials that have been computed to be robust to the range of inbound work scopes 1412 for one or more time periods. The rationalization of that mix is achieved with a flexible repairs optimizer 1444 which balances the mix of states and their quantity with a carrying cost constraint. A common outcome is that used parts are repaired to a state suitable for most prospective duty cycles 1408, 1410 as the marginal cost of holding fewer, highly flexible parts is lower than holding an exactly matching portfolio of different states. The flexible repairs optimizer is run on an ongoing basis with changes in forecast confidence interval 1470 or parts selection changes 1430. The parts are placed into the most likely to be assigned repair operation 1446; said repair location being one location in a network of shops. The used parts are stocked for the proposed demand and if demand is satisfied, no new parts are required. If there are not sufficient used parts available, new parts 1420 are assigned. These new make parts 1433 are scheduled into the new make production system controller 1435. The calculation loop 1401 iterates until the lowest cost, feasible stocking mix is attained.

A conundrum for enterprises which operate expensive capital assets and those that service those assets may be balancing the number of in service units, spares and service shop inventory and capacity to reduce turnaround time (and thus reduce the number of operating spare assets). In example embodiments, the control system is able to optimally control the shop repair capacity for one or multiple intervals of time as a function of constraints and objectives related to cash forecast 1490, cash requirements 1492, financial ratios 1494, ready operating spares 1471, revenue service 1402 and confidence intervals related to life consumption 1470, which are actively controlled. Where the system computes a confidence interval broad enough 1400-1 as to make the assignment of repair parts, part type 1440, 1442, 1446, 1422, 1420, 1433 and capacity 1418, 1446 at one or more time intervals 1472 indeterminate or where the financial objectives or limits cannot be met, a targeted physical inspection 1452 is scheduled to establish the state of the assets in the system and their forecast accuracy.

As the computing control system causes the reduction of forecast confidence interval, other constraints may be activated by the system, such as the cash limits or objectives in the current 1492 or through time 1490. A useful benefit of the system is the capability to calculate free cash flows through time with replications and thus a financial ratio such as risk (variation in NPV from the replication) vs. return is calculable and may be used as a system objective to which the parts stocking and revenue asset count is controlled to attain. Other ratios 1494 may include return on equity, real option value of added service capacity or number of ready spare assets, the value of turn around time and inspection cost for precision improvement.

A method of computing the confidence interval begins with a realized and candidate revenue asset schedule 1402 that damage models 1410 estimate remaining life from and work scope models 1412 then estimate parts and repair requirements from. This can be thought of as the service demand 1413 to which the available repair capacity (parts, people and tooling) is scheduled against. The service capacity is computed as parts 1420, 1422 and physical capacity 1450. Physical capacity is the machinery needed, to effect a specified repair. A candidate shop slot and work package 1434, which is a set of repairs and the parts required, is simulated against the repair network's prior scheduled demand 1418, 1414 to determine where the candidate asset can be scheduled or slotted 1450. The computing control system will iterate until the service demand is satisfied by the parts stocking and shop capacity, subject to constraints and goals such as financial risk and return preferences.

The computing system controls the state estimation accuracy of the models used in the scheduling optimizations. Once an engine is inducted into a shop for repairs, an inspection of the asset is made 1452 with, for example, dye penetrant, x-ray, eddie current, electronic tests, thermal performance tests—according to the determined work scope 1414 for that service event. A refinement in work scope is made 1454 with the results of the now extremely accurate state determination and the service assets are optimally assigned 1455. The actual states of the asset and its subsystems are compared to the expected 1456 inbound forecasted work scope 1434. The damage models 1410 are updated with learnings 1457 from the actual vs expected error so as to create a learning and adaptive system over time and many observations.

Upon detection of an actual vs expected error that is sufficient to make the work scope or parts stocking drive the financial variation 1490 above a threshold, such as a ratio of preferred risk vs return 1494, the computing system executes a fleet of asset stratification 1458 that clusters 1458 the assets according to their labeled descriptive attributes, last state determination and duty cycle and asset configuration so that similarly degrading assets are fitted into a cohort from which randomized inspections 1460 are made to determine state. As the inspection results no longer add precision to the state determination, the state estimate is inferred onto the other assets in the cohort 1462. The computing control orchestrates the clustering and inspection state inference on one or more cluster definitions which can be configured with labels such as city pairs, flight duration, operator operating policy or any other such factor and the system will iterate on the stratification/clustering/inspect process 1460, 1403 through different cohorts until the rate of change of the confidence intervals 1470 with respect to the expected value diminishes and is reflected in objective satisfaction 1432, and decision support stability 1456, 1433, 1435, 1446, 1470, 1458 in one or multiple time horizons 1472.

State estimation 1410 forecast error 1456 will propagate 1400-1 in the computing control system such that part quantity and type, maintenance and repair operational capacity assignment, part production planning and state estimation cohort change with each replication of a simulation scenario that the system is computing. This error is detected at the actual vs. expected 1456 step and in the system's monitoring of the stocking and assignment decisions being controlled by the disclosed computing control. Upon detection, for each level of confidence 1474 for each time horizon 1472, inspections 1460 are called and the stale estimations of other assets and their subsystems in like cohorts are updated 1462. The update 1462 may alternatively be in a shadow mode 1463, different than the primary state estimation 1410 and the asset assignments, stocking levels and work scopes may also likewise be in a shadow mode where the primary assignment is made with alternative possibilities derived from the shadow results.

Figure 15:
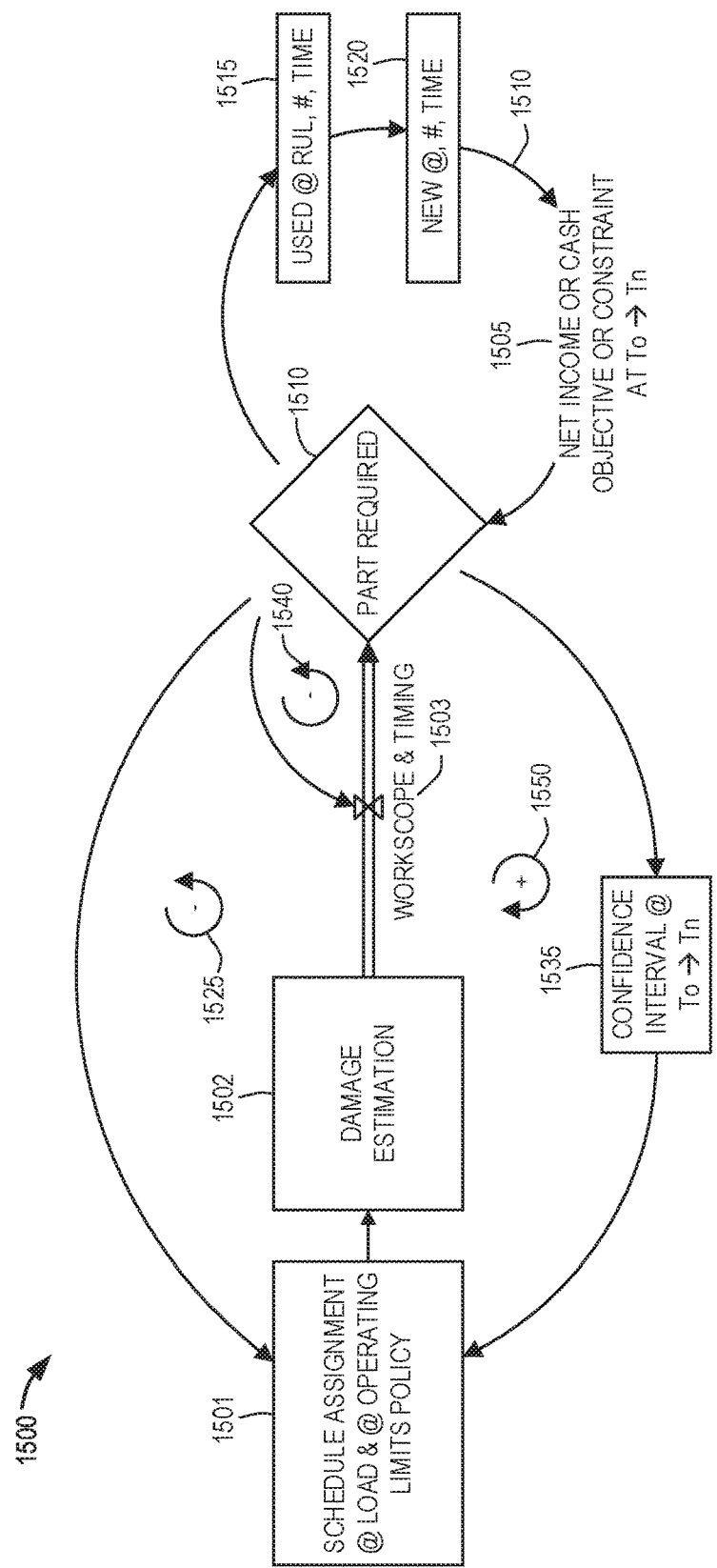
FIG. 15 is a block diagram of a computational control system's feedback loop structure.

Referring to FIG. 15, consider an example embodiment of an airline operation 1500 comprised of flying assets (aircraft and its engines) 1501 that are scheduled for revenue service and a network of one or more repair operations 1510 such as a service shop(s) with stocked repair components 1515, 1520 (which may also consume considerable capital) and machinery. A minimal turnaround time in the repair activity will increase the number of assets in revenue service or said differently, capital expense tied up in protective capacity may be avoided if the shop repair cycle is shorter. It is therefore desirable that the cycle time of repairs is low and that the cost to serve, such as the inventory carrying value ICV is also low.

A coupled dynamic business-physical system 1500 is thus formed, that if purposefully controlled, can optimally minimize the number of assets to serve the primary revenue demand service (aircraft and its engines scheduled to fly passengers), and stock the repair parts required for service so that delays are avoided waiting for components in the repair process, but minimize all other spare components and systems. As the accuracy of repair work scope increases, such as measured by the confidence interval 1535 for state estimation that leads to work scope and parts forecasting operational decisions, the coupled system approaches its entitlement with respect to primary assets, spare assets and repair components. The coupled system's limiting cycle times and ICV for repairs and the variation of scheduled service with respect to life consumption theoretically limit the system's performance with respect to asset count.

In example embodiments, the control system optimally assigns repair assets such as parts 1510 to a given repair operation for the services of a fleet 1501, subject to capital constraints or cash flow or net income objectives 1505, to the limits of forecasting confidence intervals over one or more time horizons 1535—which the system is actively both controlling the accuracy of by virtue of physical state estimation inspections on certain assets that are then used to true up the confidence on other state estimation models and by assigning assets to duty cycles that consume life in such a way as to make the service event timing and work scope more certain so that the right repair parts and services can be scheduled, which thus lowers ICV and shop cost.

The computing control system has at least three control loops implemented in the example embodiment: a negative feedback loop computed 1525 to limit the rate of life consumption in a set of given in-service assets 1501 according to the pattern of work scope/parts requirements that may be constrained in their count by a limit m inventory as imposed by a financial constraint 1505: a second computed loop 1540 which feeds back the available work scopes that are possible for a given set of stocked repaired parts or shop costs, which may be limited by a capital constraint 1505 or physical availability of a part such as, from a production capacity limit; and a third loop is computed 1550 that increases the precision of damage estimation over one or more time horizons 1535 such that the assigned schedule of the revenue generating assets is met (or modified to meet) and the ICV limit vs repair parts on hand is satisfied. The simulation—optimization system is instructed to compute these loops at least as fast as a change in the revenue service physical states changes sufficient to change the repair parts stocking and shop capacity allocation.

An additional benefit is achieved by the disclosed to further reduce the capital consumption and relax the new-make production requirements of parts—such as when new part production processes are assigned to produce other components. The type of part which is stocked in one or more of the repair network locations may be a newly produced part 1520 or a restored used part 1515. For a restored used part, various levels of restoration may be specified by the disclosed system that span from "do nothing, just stock this used serviceable repair part" to specifying a specific set of repairs to said part.

The system computes the damage estimation f 502 from a given schedule assignment at given loads and exposures and operating policies 1501 and calculates the one or more work scopes 1503 for one or more removal dates for the one or more desired repaired physical states of a complete apparatus (e.g., an aircraft engine certified to have a certain thermodynamic performance and operating life until the next service event). Against that array of demand for service work scopes 1503 is a requisite level of parts required 1510 through time. The required parts are specified by a bill of material BOM designator. The states of the required parts, even though the same part number, may be one or more stales (e.g., surface finish, tolerance, fatigue, repair type, etc.) and these stocking requirements may change over time when more than one time interval is considered in the optimization computation. Should the ICV and repair expense of a used serviceable spare 1515 part be less than the cost and ICV of a newly manufactured part 1520, and meet the requirements of the scheduled service 1501, the system assigns the repair of and stocking of a used spare. If the quantity of spare stock is not available, per the time horizon considered, a new part is scheduled. The parts 1515, 1520 schedule thus includes quantity, timing and state of repair and location such that financial constraints or objectives 1505 are met, at a given confidence interval 1535, for a one or more set of operating scenarios 1501.

The cash objective 1505 for one or more time periods can be, in one embodiment, the free cash flow of one or more of the stakeholders (e.g., service provider/shop, financial risk holder/service contract, operating entity/airline). The capital structure for said stakeholder is reflected in their financial statements and a financial model computes the multiple period free cash flow of revenues and operating costs for the derivation of present value PV against which the costs of repair components are applied to calculate net present value NPV. One or more discount factors may be used. A marginal cost of capital discount may be used for the purposes of calculating a range of NPVs and the shift between scenarios of one or more decision choices calculated is used to calculate the real option value of the choice being considered. Or a traditional pro-forma NPV analysis is enabled. No matter the financial valuation technique deployed, which the present system enables the computation of the dynamic links are accurately attained in the computing control system by the coupling of asset assignment, work scope, parts and confidence interval management.

A financial estimate of one or more periods may be accompanied by a confidence interval which is attained by computing replications of a given scenario with the computing control system. The span of the confidence interval may be so great at one or more time horizons that the system cannot converge on an optimal stocking schedule for parts. One source of the forecast error will be the state estimation models which compute life consumption for a given duty, the said duty being an actually flown route or a simulated future route, subject to one or more operating policies, in the case of a fleet of assets, such as an airline's fleet, there is a mix of flights that have been flown and a schedule for future operations and thus the state estimations for fuel efficiency and reliability are a mix of actually flown flights and simulated future flights. The system, when the confidence interval 1535 cannot discriminate the parts stocking assignments 1510, 1515, 1520, beneficially alerts the operationally responsible persons that the computing control system is in an indeterminate state and informs a schedule of on-wing/in-situ physical inspections into the operating fleet 1501 for the purposes of maximally decreasing the forecast error leading to high confidence intervals at the cause of the indeterminism of the computing control. The partial differential of confidence interval with respect to wort scope change is in one example embodiment, the mechanism by which the targeted assets are identified to receive the physical inspection for the purposes of trueing up the actual physical state with the estimated state. The trued up state(s) are inferred to other assets which have experienced similar schedule assignments. The stratification of the in service assets is thus made by similarity to past or simulated future duty assignment for the purposes of reducing the confidence interval so that the assigned parts schedule is determined and the resulting cash flow variation (from simulated replications) is reduced.

In example embodiments, physical state estimation orchestrates control, which attains the specific configuration and inspection inputs for controlling the accuracy of simulation based state estimation in one or more future time intervals. Image, chemical, sensor and virtually sensed data is specified by the computing control system, using a physical state characterization model of the assets, subsystems and parts with an inspection system that organizes the requisite configuration, historical measures and past estimation results.

While the embodiments are described with reference to various implementations and exploitations, it will be understood that these embodiments are illustrative and that the scope of claims provided below is not limited to the embodiments described herein. In general the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

This written description uses examples to disclose various embodiments, including the best mode thereof and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if those examples include structural elements that do not differ from the literal language of the claims, or if the examples include equivalent structural elements with insubstantial differences from the literal language of the claims.

What is claimed is:

1. A method comprising:
at a first set of computer systems, the first set of computer system deployed in an aircraft service provider cluster, the first set of computer systems communicatively coupled to a second set of computer systems, the second set of computer systems deployed in each of a plurality of aircraft services customer clusters, incorporating one or more optimization modules, the one or more optimization modules configuring one or more processors of the first set of computer systems to perform control operations, the control operations including:
collecting operations data and inspection data pertaining to the operating asset states of one or more fleets of aircraft over a time period, the operations data and the inspection data stored in one or more databases of the second set of computer systems, the operations data and the inspection data including values corresponding to fields in the one or more databases, the fields representing at least one of policy data pertaining to one or more operations policies, flight schedule data pertaining to one or more flight schedules, and operating cost data pertaining to operating costs associated with the one or more fleets of aircraft and dates of inspections, types of inspections, and results of inspections conducted with respect to the one or more fleets of aircraft;
deriving assumptions of control input values for use by the first set of computer systems based on the operations data and the inspection data;
performing a financial objective and constraints analysis with a simulation system for one or more assets of the one or more fleets of aircraft, the cost savings analysis including identifying a modification of at least one of a set of the control input values;
computing an estimated reduction of forecast error related to operating and service costs for the one or more assets over one or more time periods, the identifying based on comparisons of a first subset of the operations data and the inspection data with a second subset of the operations data and the inspection data; and
providing the first set of computer systems with access to a recommendation pertaining to operation of the one or more assets based on the one or more assets being in revenue service or in repair;
wherein the recommendation is physically implemented at or concerning a selected one of the one or more assets, the physical implementation of the recommendation causing one or more of: a change of operational state or condition of the selected asset, a timing of a repair of the selected asset at a repair facility, or a change in a timing of operational movement of the asset.

2. The method of claim 1, wherein the recommendation pertains to at least one of schedule, parts stocking quantity, part type, and inspection capability corresponding to a service shop.

3. The method of claim 1, wherein the one or more operations policies include a plurality of flight operations policies, the plurality of flight operations policies including a maximum percentage of engine thrust to be used at takeoff, climbing, or cruising for each aircraft in each fleet of aircraft, computed through simulated future time and replicated, said replications being at least one of a specified quantity of computing cycles through the simulated future events or set to replicate until such time as the rate of statistical confidence increases to a designated level.

4. The method of claim 1, wherein a computing capability is dynamically allocated to more than one processor according to an estimate of an attainment of a specific confidence for the recommendation so as to complete the computing in a specified duration.

5. The method of claim 1, wherein the operating costs include at least one of fuel costs and maintenance costs and the cost savings analysis includes associating the one or more flight schedules and the one or more operations policies with the at least one of the fuel costs and maintenance costs, comparing said fuel and maintenance costs to one or more system control goal and dynamically reducing or increasing the granularity of simulated time step, input assumption value or number of processors.

6. The method of claim 1, wherein the providing of the at least one of the aircraft customer computer systems with access to the recommendation is based on an aircraft service customer entering into a maintenance contract with an aircraft service provider with respect to maintenance of the one aircraft.

7. The method of claim 1, wherein the performing of the cost savings analysis further includes identifying the modification based on a reduction of maintenance costs for the aircraft over the time period.

8. The method of claim 5, wherein the maintenance costs include inventory costs to be borne solely by an aircraft services provider pursuant to a maintenance contract between the aircraft service provider and the aircraft service customer and the operations costs include costs that are to be borne solely by the aircraft service customer pursuant to the maintenance contract.

9. The method of claim 1, wherein the providing of the at least one of the aircraft service customer computer system with access to the recommendation does not include providing the aircraft service customer computer system with access to a subset of the operations data that was collected from fleets of aircraft for which the aircraft service customer does not have an ownership interest.

10. The method of claim 1, wherein:
the identifying of the modification includes calculating an estimated state of one or more subsystems of the one aircraft as a function of a subset of the operations data and a subset of maintenance data corresponding to the one aircraft over the time period; and
the recommendation pertains to changing at least one of a sequence of duty, a maintenance scope, or an operating policy to achieve a probability of a future state of the one or more subsystems.

11. A system comprising:
a first set of computer systems, the first set of computer system deployed in an aircraft service provider cluster, the first set of computer systems communicatively coupled to a second set of computer systems, the second set of computer systems deployed in each of a plurality of aircraft services customer clusters
one or more optimization modules incorporated into the first set of computer systems, the one or more optimization modules configuring one or more processors of the first set of computer systems to perform control operations, the control operations including:
collecting operations data and inspection data pertaining to the operating asset states of one or more fleets of aircraft over a time period, the operations data and the inspection data stored in one or more databases of the second set of computer systems, the operations data and the inspection data including values corresponding to fields in the one or more databases, the fields representing at least one of policy data pertaining to one or more operations policies, flight schedule data pertaining to one or more flight schedules, and operating cost data pertaining to operating costs associated with the one or more fleets of aircraft and dates of inspections, types of inspections, and results of inspections conducted with respect to the one or more fleets of aircraft;
deriving assumptions of control input values for use by the first set of computer systems based on the operations data and the inspection data;
performing a financial objective and constraints analysis with a simulation system for one or more assets of the one or more fleets of aircraft, the cost savings analysis including identifying a modification of at least one of a set of the control input values;
computing an estimated reduction of forecast error related to operating and service costs for the one or more assets over one or more time periods, the identifying based on comparisons of a first subset of the operations data and the inspection data with a second subset of the operations data and the inspection data; and
providing the first set of computer systems with access to a recommendation pertaining to operation of the one or more assets based on the one or more assets being in revenue service or in repair;
wherein the recommendation is physically implemented at or concerning a selected one of the one or more assets, the physical implementation of the recommendation causing one or more of: a change of operational state or condition of the selected asset, a timing of a repair of the selected asset at a repair facility, or a change in a timing of operational movement of the asset.

12. The system of claim 11, wherein the recommendation pertains to at least one of schedule, parts stocking quantity, part type, and inspection capability corresponding to a service shop.

13. The system of claim 11, wherein the one or more operations policies include a plurality of flight operations policies, the plurality of flight operations policies including a maximum percentage of engine thrust to be used at takeoff, climbing, or cruising for each aircraft in each fleet of aircraft, computed through simulated future time and replicated, said replications being at least one of a specified quantity of computing cycles through the simulated future events or set to replicate until such time as the rate of statistical confidence increases to a designated level.

14. The system of claim 13, wherein a computing capability is dynamically allocated to more than one processor according to an estimate of an attainment of a specific confidence for the recommendation so as to complete the computing in a specified duration.

15. The system of claim 11, wherein the operating costs include at least one of fuel costs and maintenance costs and the cost savings analysis includes associating the one or more flight schedules and the one or more operations policies with the at least one of the fuel costs and maintenance costs, comparing said fuel and maintenance costs to one or more system control goal and dynamically reducing or increasing the granularity of simulated time step, input assumption value or number of processors.

16. The system of claim 11, wherein the providing of the at least one of the aircraft customer computer systems with access to the recommendation is based on an aircraft service customer entering into a maintenance contract with an aircraft service provider with respect to maintenance of the one aircraft.

17. The system of claim 11, wherein the performing of the cost savings analysis further includes identifying the modification based on a reduction of maintenance costs for the aircraft over the time period.

18. The system of claim 17, wherein the maintenance costs include inventory costs to be borne solely by an aircraft services provider pursuant to a maintenance contract between the aircraft service provider and the aircraft service customer and the operations costs include costs that are to be borne solely by the aircraft service customer pursuant to the maintenance contract.

19. A non-transitory machine readable medium embodying a set of instructions that, when executed by one or more processors, cause the processors to perform operations, the operations comprising:
collecting operations data and inspection data at a first set of computer system, the operations data and inspection data pertaining to operating asset states of one or more fleets of aircraft over a time period, the operations data and the inspection data stored in one or more databases of a second set of computer systems, the operations data and the inspection data including values corresponding to fields in the one or more databases, the fields representing at least one of policy data pertaining to one or more operations policies, flight schedule data pertaining to one or more flight schedules, and operating cost data pertaining to operating costs associated with the one or more fleets of aircraft and dates of inspections, types of inspections, and results of inspections conducted with respect to the one or more fleets of aircraft;
deriving assumptions of control input values for use by the first set of computer systems based on the operations data and the inspection data;
performing a financial objective and constraints analysis with a simulation system for one or more assets of the one or more fleets of aircraft, the cost savings analysis including identifying a modification of at least one of a set of the control input values;
computing an estimated reduction of forecast error related to operating and service costs for the one or more assets over one or more time periods, the identifying based on comparisons of a first subset of the operations data and the inspection data with a second subset of the operations data and the inspection data; and providing the first set of computer systems with access to a recommendation pertaining to operation of the one or more assets based on the one or more assets being in revenue service or in repair;

wherein the recommendation is physically implemented at or concerning a selected one of the one or more assets, the physical implementation of the recommendation causing one or more of: a change of operational state or condition of the selected asset, a timing of a repair of the selected asset at a repair facility, or a change in a timing of operational movement of the asset.

20. The non-transitory machine readable medium of claim 19, wherein:

the identifying of the modification includes calculating an estimated state of one or more subsystems of the one aircraft as a function of a subset of the operations data and a subset of maintenance data corresponding to the one aircraft over the time period; and the recommendation pertains to changing at least one of a sequence of duty, a maintenance scope, or an operating policy to achieve a probability of a future state of the one or more subsystems.

* * * * *